United States Patent
Takeuchi et al.

(10) Patent No.: US 10,907,735 B2
(45) Date of Patent: Feb. 2, 2021

(54) GASKET AND FLANGE CONNECTION STRUCTURE FOR PLUMBING INSTRUMENT USING THE SAME

(71) Applicant: SHIMIZU ALLOY MFG. CO., LTD., Shiga (JP)

(72) Inventors: Ryosuke Takeuchi, Shiga (JP); Kazuhiro Chino, Shiga (JP)

(73) Assignee: SHIMIZU ALLOY MFG. CO., LTD., Shiga (JP)

( * ) Notice: Subject to any disclaimer, the term of this patent is extended or adjusted under 35 U.S.C. 154(b) by 127 days.

(21) Appl. No.: 16/079,441

(22) PCT Filed: Mar. 21, 2017

(86) PCT No.: PCT/JP2017/011152
§ 371 (c)(1),
(2) Date: Nov. 1, 2018

(87) PCT Pub. No.: WO2017/159881
PCT Pub. Date: Sep. 21, 2017

(65) Prior Publication Data
US 2019/0078687 A1    Mar. 14, 2019

(30) Foreign Application Priority Data

Mar. 18, 2016  (JP) ................................. 2016-055208
Mar. 18, 2016  (JP) ................................. 2016-055209
(Continued)

(51) Int. Cl.
*F16J 15/12*    (2006.01)
*F16L 23/024*   (2006.01)
(Continued)

(52) U.S. Cl.
CPC ......... *F16J 15/122* (2013.01); *F16J 15/0818* (2013.01); *F16J 15/104* (2013.01);
(Continued)

(58) Field of Classification Search
CPC .......... F16J 15/122; F16J 15/12; F16J 15/121; F16J 15/0818; F16J 15/0806;
(Continued)

(56) References Cited

U.S. PATENT DOCUMENTS 1,821,866 A * 9/1931 Wilson .................... F16L 23/20
                                                    277/614
4,095,809 A * 6/1978 Smith .................. F16L 23/003
                                                    277/611
(Continued)

FOREIGN PATENT DOCUMENTS

| JP | 58-79167 | 5/1983 |
| JP | 2-15329  | 1/1990 |

(Continued)

OTHER PUBLICATIONS

International Search Report dated Jun. 27, 2017 in International (PCT) Application No. PCT/JP2017/011152.

*Primary Examiner* — Nathan Cumar
(74) *Attorney, Agent, or Firm* — Wenderoth, Lind & Ponack, L.L.P.

(57) ABSTRACT

A gasket and flange connection structure for a plumbing instrument including a substantially annular core (30) coated with a coating part (31) and formed with annular seal surfaces (32) on both surfaces. These annular seal surfaces (32) are provided so as to be capable of making sealed contact with any of flange surfaces (20, 21, and 22) of a flat seat shape flange, a full-flat seat shape flange, and a grooved-shape flange for allowing shared use. Configured on outer peripheral sides of the annular seal surfaces (32) are (Continued)

A PORTION extended mounting parts (33) having a plurality of different diameters in accordance with the outer diameters of the various flange surfaces.

19 Claims, 36 Drawing Sheets

(30) Foreign Application Priority Data

Aug. 31, 2016 (JP) .................. 2016-170360
Feb. 7, 2017 (JP) .................. 2017-020206

(51) Int. Cl.
*F16K 27/00* (2006.01)
*F16J 15/10* (2006.01)
*F16J 15/08* (2006.01)
*F16L 23/18* (2006.01)

(52) U.S. Cl.
CPC .......... *F16K 27/003* (2013.01); *F16L 23/024* (2013.01); *F16L 23/18* (2013.01); *F16J 2015/085* (2013.01); *F16J 2015/0856* (2013.01); *F16J 2015/0868* (2013.01); *F16L 2201/60* (2013.01)

(58) Field of Classification Search
CPC ......... F16J 2015/0856; F16J 2015/0868; F16J 2015/085; F16K 27/003; F16L 23/024; F16L 23/00; F16L 23/02; F16L 23/12; F16L 23/18; F16L 23/20; F16L 23/22; F16L 2201/60; F16L 2201/00; F16L 2201/10
USPC .......................................... 277/650
See application file for complete search history.

(56) References Cited

U.S. PATENT DOCUMENTS

| 4,202,457 | A  | * | 5/1980 | Tansi ............ | H02G 3/081 |
| | | | | | 174/53 |
| 6,869,081 | B1 | * | 3/2005 | Jenco ............ | F16L 23/003 |
| | | | | | 277/611 |
| 2005/0120732 | A1 | * | 6/2005 | Matsuoka ........ | F16L 25/026 |
| | | | | | 62/298 |
| 2006/0145429 | A1 | * | 7/2006 | Casler .......... | F16J 15/0818 |
| | | | | | 277/627 |
| 2010/0013220 | A1 | * | 1/2010 | Rao ............. | F16J 15/104 |
| | | | | | 285/368 |
| 2011/0031704 | A1 | * | 2/2011 | Lehr ............ | F16J 15/061 |
| | | | | | 277/630 |

FOREIGN PATENT DOCUMENTS

| JP | 2002-31241 | 1/2002 |
| JP | 2004-52817 | 2/2004 |
| JP | 2011-017392 | 1/2011 |
| WO | 2014/192442 | 12/2014 |

* cited by examiner

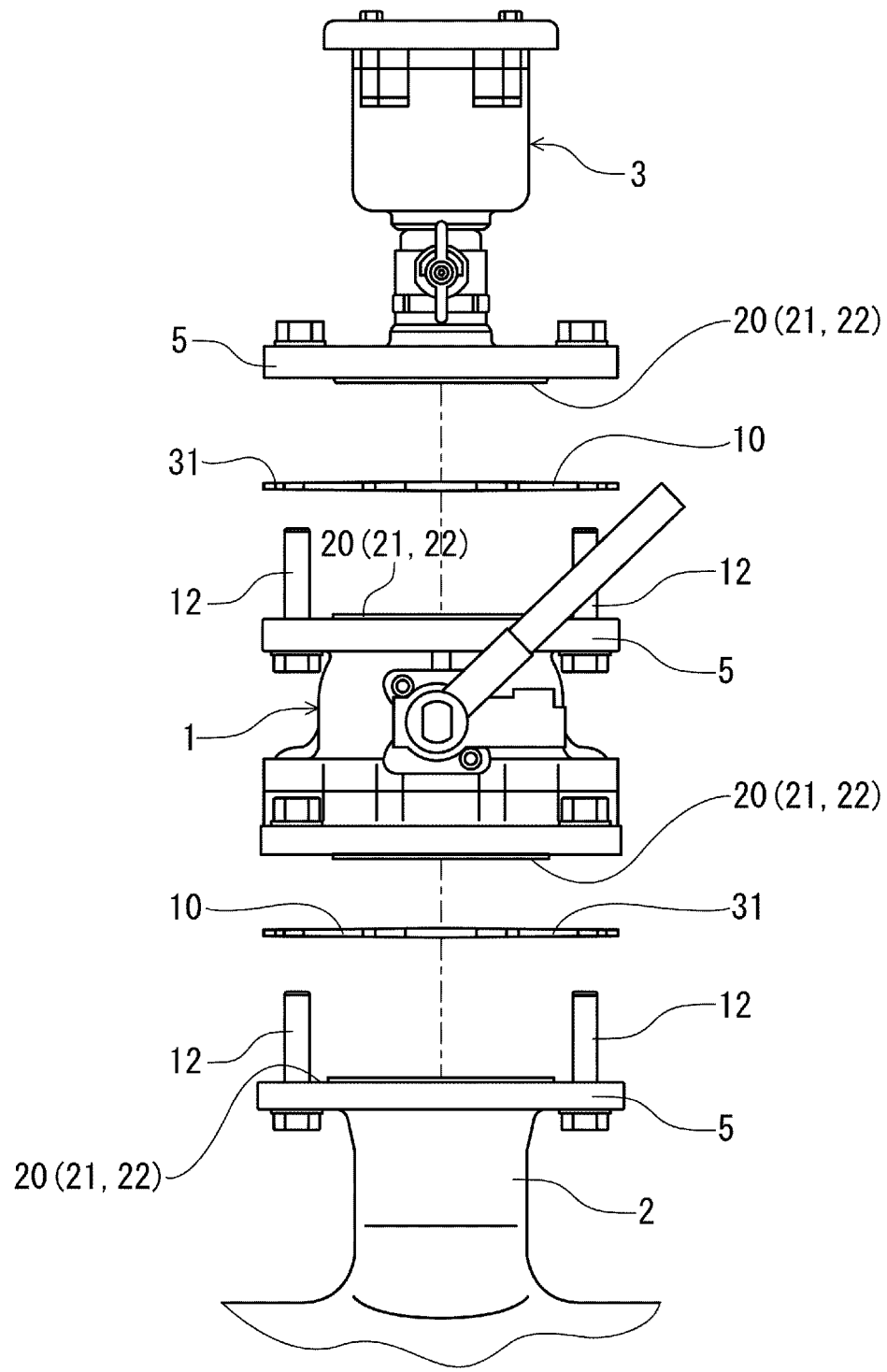

A PORTION

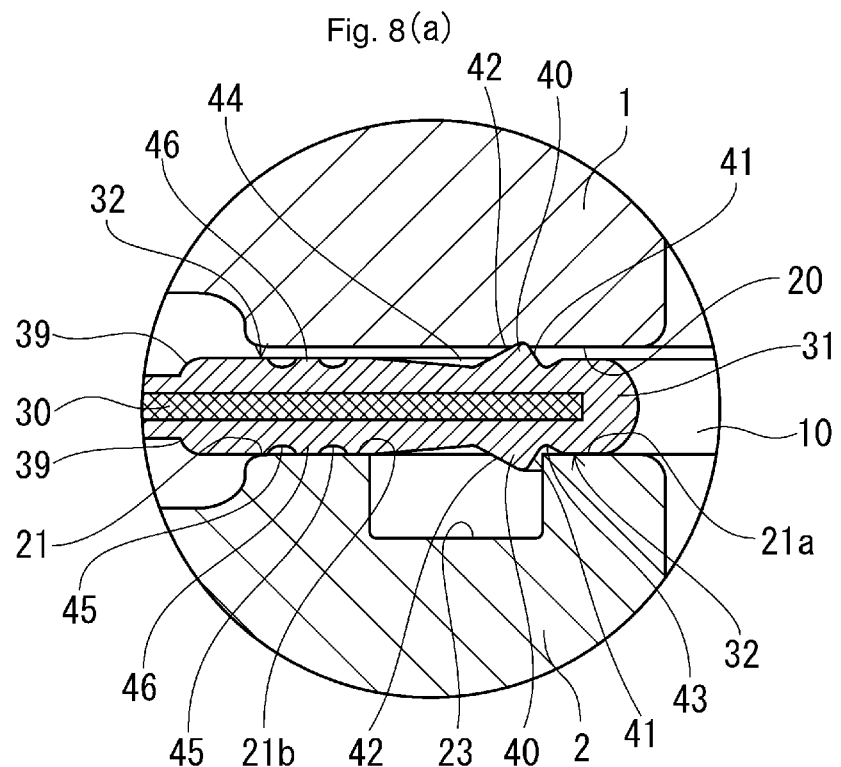
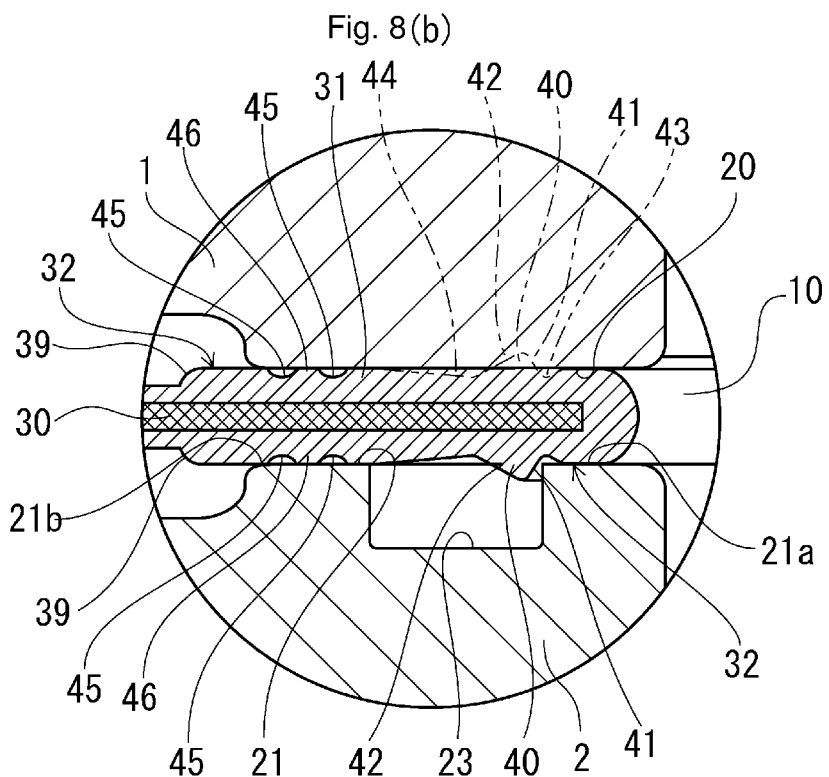

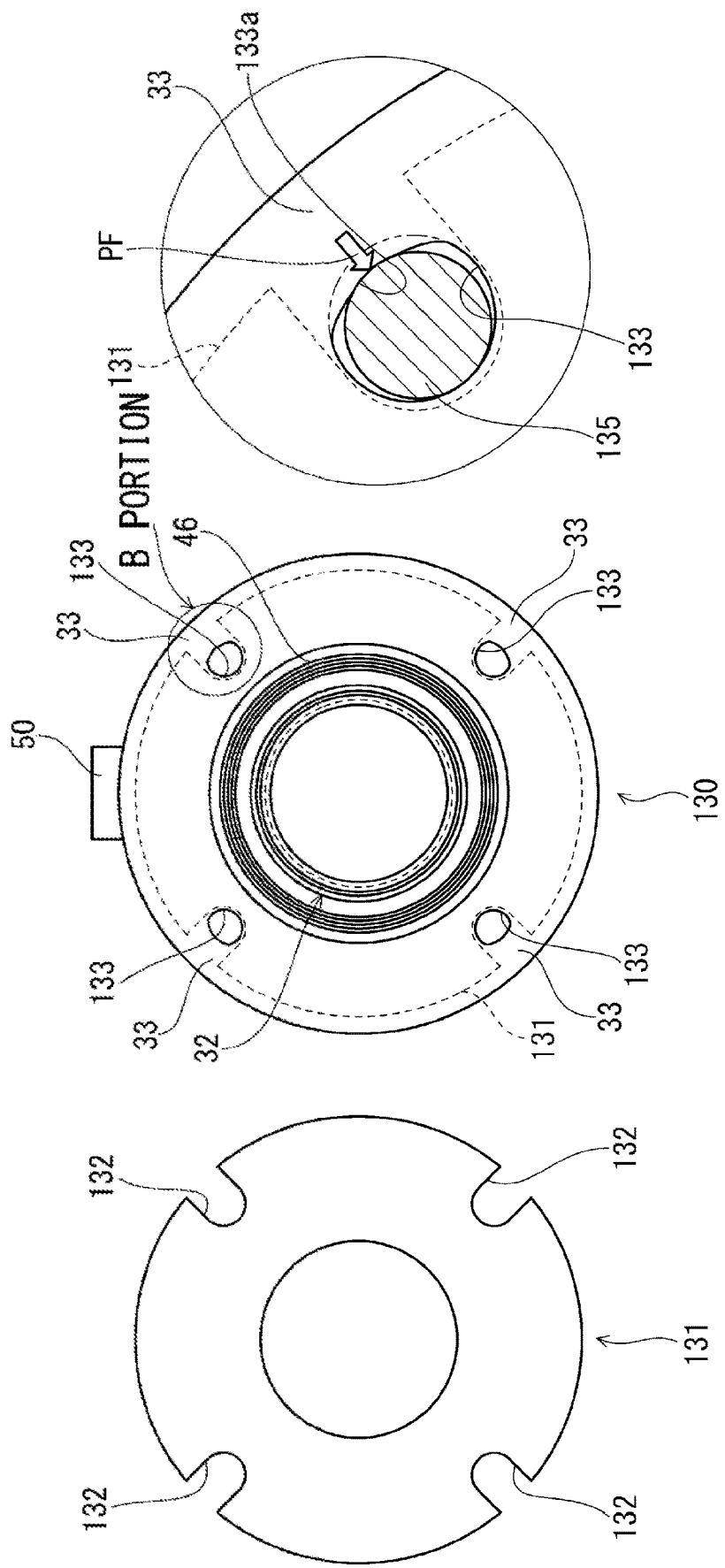

Fig. 19(a)
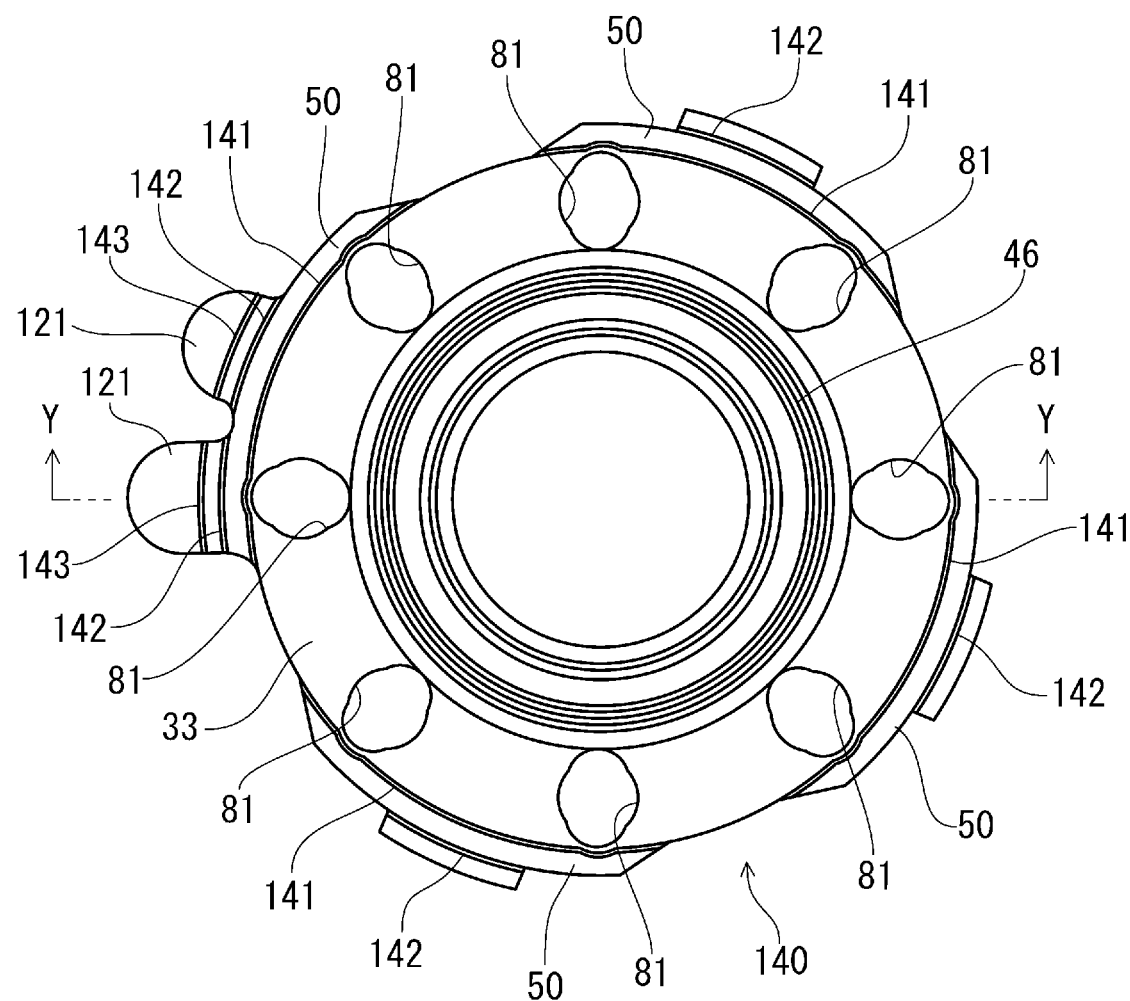
Fig. 19(b) C PORTION
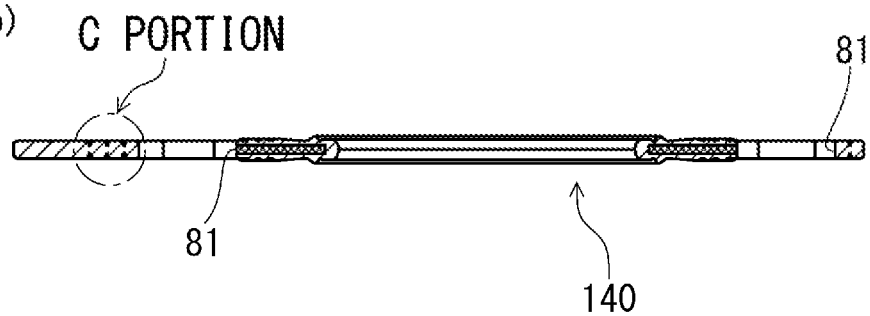

GASKET AND FLANGE CONNECTION STRUCTURE FOR PLUMBING INSTRUMENT USING THE SAME

BACKGROUND OF THE INVENTION

1. Technical Field

The present invention relates to gaskets for use in connection of a plumbing instrument such as a valve, straight pipe, deformed pipe, faucet, or the like, and a flange connection structure using the same.

2. Description of the Related Art

Conventionally, when a plumbing instrument such as a valve or faucet is connected with flange couplings, a rubber-made annular gasket for sealing is generally attached between connection surfaces of flanges. As a flange surface to which this gasket is attached, an RF shape (Raised Face: flat seat shape) is widely used. When this RF-shape flange coupling is piped and connected, RF-shape-RF-shape in which RF-shape flanges are connected together and RF-shape-GF-shape in which an RF shape and a GF shape (Grooved Face: grooved shape) are connected are defined in standards such as JIS G 5527. These are used normally depending on the use pressure (nominal pressure). RF-shape-RF-shape is used at relatively low pressure, and RF-shape-GF-shape with higher water tightness is used at high pressure.

Furthermore, as a flange having a flange surface other than those of the RF shape and the GF shape, an FF shape (Flat Face: full-flat seat shape) is often used. In this case, FF-shape flange surfaces are connected together by FF-shape-FF-shape or the like.

The gasket for sealing for use is varied depending on the difference in shape among these flange surfaces. For connection between RF-shape-RF-shape or FF-shape-FF-shape flange surfaces, an RF-shape gasket as a flat packing is used. For RF-shape-GF-shape, a half-round-shaped GF-shape gasket is normally used. For RF-shape-RF-shape and FF-shape-FF-shape, a ring gasket mountable inside a bolt for flange fixing or a full-flat-shape gasket that can be positioned and fixed with the bolt for flange fixing via a bolt hole is also used.

On the other hand, as a gasket for flange connection of this type, for example, a a packing is disclosed in Japanese Utility Model Application Laid-Open Publication No. 58-79167. In this packing, an annular protrusion is formed on one pressure-receiving surface of a ring-shaped elastic body, and this annular protrusion is provided so as to be able to fit in an annular recessed groove formed in a flange seat surface. In this case, fitting of the annular protrusion in the annular recessed groove allows temporary fixing and attachment to the flanges. After fastening connection of the flanges, the annular protrusion is compressedly fit, and is prevented from slipping outside by water pressure.

Also, for example, a flange packing is disclosed in Japanese Patent Application Laid-Open Publication No. 2004-52817. In this flange packing, an annular metal member is buried along and inside an annular packing main body formed of a rubber member. A flat-packing-shaped gasket of this type is called an RF-shape gasket, and is normally used when the use pressure (nominal pressure) is a relatively low pressure in standards such as JIS G 5527. On the other hand, when the use pressure is a high pressure, one called a GF-shape gasket is used.

Other than the above, WO 2014/192442 discloses a gasket provided with eight through holes in a seal body for use in connection and fastening of many types, such as for fastening for four and for fastening for eight.

SUMMARY OF THE INVENTION

1. Technical Problem

As described above, when flange couplings are connected together, for connection of RF-shape-RF-shape, RF-shape-GF-shape, or FF-shape-FF-shape flange surfaces, a different gasket is required depending on the difference between the flange surfaces, and the gasket cannot be used in a shared manner.

If the GF-shape gasket is tried to be used for RF-shape-RF-shape flange connection or FF-shape-FF-shape flange connection, the GF-shape gasket is in a half round shape, and therefore cannot be attached to an RF-shape flange or FF-shape flange having a flat seal surface. On the other hand, if an RF-shape gasket or FF-shape gasket is tried to be used for RF-shape-GF-shape flange connection, attachment by positioning in a groove in a seal surface is difficult, and there is a possibility that sealability cannot be ensured.

For this reason, gaskets of many types are required to be prepared in advance, depending on the combination of flange surfaces of flanges to be connected. This increases gasket inventories, and an installation failure may occur due to an error in selecting a gasket by a worker at the time of installation. In addition to this, if bolt fastening is in a nonuniform state, a so-called uneven clamping state at the time of fastening the gasket, it is difficult to maintain sealability.

As for the packing of JP 58-79167, it is difficult to use the packing for RF-shape-RF-shape or FF-shape-FF-shape connection because the annular protrusion is provided to one side, and this packing cannot be used in a shared manner for these connections.

Moreover, if the full-flat-shape gasket as in JP 58-79167 is used, bolt holes allow matching with the center of the flanges. In this case, however, the number of bolts/nuts, the bolt hole diameter, and its pitch circle are varied depending on the use pressure, and it is therefore required to prepare, in advance, a gasket provided with bolt holes in accordance with each use pressure.

By contrast, for example, if bolt holes corresponding to pressure flanges of various types are provided to a gasket for plumbing having different nominal diameters such as a nominal diameter of 150 and a nominal diameter 200, the number of bolt holes is increased to make the arrangement of the holes complex, and there is a possibility that the worker at the time of working may erroneously fasten a bolt/nut to a bolt hole different from a bolt hole to be originally used. In this case, sealability is not sufficient, leading to an occurrence of leakage.

Moreover, the RF-shape gasket of JP 2004-52817 or the ring gasket for FF-shape-FF-shape connection cannot be used in a shared manner as one for a GF-shape gasket. Among RF-shape gaskets, there is a gasket called an RF-shape full-flat gasket for connection with bolts and nuts on flanges. However, this RF-shape full-flat gasket or a full-flat-shape gasket for FF-shape-FF-shape is tried to be used for each of the above-described connections, the size of the flange is varied depending on the hole diameter of the bolt holes and the use pressure, and attachment in a centered state is therefore difficult.

On the other hand, even if the GF-shape gasket is tried to be used in a shared manner for RF-shape-RF-shape or FF-shape-FF-shape, the GF-shape gasket is in a half round shape, and thus cannot be attached to the RF-shape flange or the FF-shape flange having a flat seal surface.

For this reason, gaskets of many types are required to be prepared in advance, depending on the difference in the type and size of the flanges to be connected. This increases gasket inventories, and an installation failure may occur due to an error in selecting a gasket by a worker at the time of installation.

Still further, the gasket described in WO 2014/192442 can be used for connection and fastening of many types, but cannot be used in a shared manner in the case of different nominal pressures, different pitch circles and hole diameters of the bolt holes, and different types (RF shape, GF shape) of flanges.

The present invention was developed to solve the above-described problems, and has an object of providing a gasket and flange connection structure for a plumbing instrument using the same, in which the gasket can be used in a shared manner also when connecting flanges of different sizes and flanges having different flange surfaces, can provide high sealability by preventing uneven clamping, can provide high sealability when attached as being centered in accordance with the flanges to be connected, can also be attached as being centered to flanges of plumbing in a vertical direction as well as plumbing arranged in a horizontal direction, and can be used in a shared manner for a plurality of different use pressures while preventing an error about a fastening position.

2. Solution to the Problem

To achieve the object described above, the invention is directed to a gasket being a gasket main body having a substantially annular core coated with a coating part and formed with annular seal surfaces on both surfaces, these annular seal surfaces being provided so as to be capable of making sealed contact with a flange surface of any of a flat seat shape flange, a full-flat seat shape flange, and a grooved-shape flange for allowing shared use, annular seal surfaces and annular protrusions protruding from the annular seal surfaces being provided on both surfaces of the gasket main body, the annular protrusions being fit-in portions that are fit in an annular groove as making contact with at least either one of an inner edge and an outer edge of the annular groove formed in a flange surface of the grooved-shape flange and being a seal portion making pressure contact with a flange surface of a flat seat shape flange or a full-flat seat shape flange.

The invention according to another aspect is directed to the gasket in which recessed parts are provided on both sides of the annular protrusions.

The invention according to another aspect is directed to the gasket in which a plurality of groove parts are concentrically formed on an outer peripheral side with respect to the recessed parts provided on an outer peripheral side of the annular protrusions, and an annular seal part capable of making pressure contact with the flange surface of the flat seat shape flange, the full-flat seat shape flange, or the grooved-shape flange is provided between these groove parts.

The invention according to another aspect is directed to the gasket in which an extended mounting part to the flange surface is integrally provided on the outer peripheral side of the annular seal surface, and a step part is formed between this extended mounting part and the annular seal surface, and the extended mounting part is provided to be thinner than the annular seal surface.

The invention according to another aspect is directed to the gasket in which the gasket main body has a substantially annular core and a coating part which coats this core.

The invention according to another aspect is directed to the gasket in which the both surfaces of the gasket main body are provided in a symmetrical shape.

The invention according to another aspect is directed to a flange connection structure for a plumbing instrument in which connection is made with a gasket main body attached between opposing flange surfaces of coupling parts of the plumbing instrument; the gasket main body has provided on both surfaces annular seal surfaces and annular protrusions protruding from these annular seal surfaces, with a substantially annular core coated with a coating part; and flange connection is made, with either one or both of these annular protrusions being fit in an annular groove as making contact with at least either one of an inner edge and an outer edge of the annular groove formed in a flange surface of a grooved-shape flange, or making pressure contact with a flange surface of a flat seat shape flange or a full-flat seat shape flange.

The invention according to another aspect is directed to a gasket having annular seal surfaces provided on both surfaces of a substantially annular gasket main body and being configured of extended mounting parts having a plurality of different diameters in accordance with outer diameters of various flange surfaces on an outer peripheral side of these annular seal surfaces.

The invention according to another aspect is directed to the gasket in which the core has an outer diameter that matches a minimum outer diameter of a flange surface.

The invention according to another aspect is directed to the gasket in which the extended mounting parts are provided with bolt holes with different pitch circles in accordance with a plurality of use pressures.

The invention according to another aspect is directed to the gasket in which bolt holes with different pitch circles in accordance with the plurality of use pressures are arranged so as to be overlapped on a same center line, and the respective bolt holes can be used in a shared manner.

The invention according to another aspect is directed to the gasket in which hole shapes with one of bolt holes with a different pitch circle and number of holes in accordance with the plurality of use pressures overlapped on a same center line are arranged in a rotationally symmetrical manner, and the respective bolt holes can be used in a shared manner.

The invention according to another aspect is directed to the gasket in which portions of the core corresponding to the bolt holes of the gasket main body are each provided with a notched part having an outer peripheral side of the core being open.

The invention according to another aspect is directed to the gasket in which the bolt holes formed in the notched parts are such that the bolt holes are subjected to rubber lining with a coating part which coats the core.

The invention according to another aspect is directed to the gasket in which a step-shaped lug part in a state of being extended from the extended mounting part is provided, and indicating parts indicating positions of outer diameters of flange surfaces for a plurality of use pressures are provided on a surface of the extended mounting part including this lug part.

The invention according to another aspect is directed to the gasket in which a tab part is provided as extended from the lug part and, when the gasket main body is attached to the flange surfaces horizontally piped, in a state in which the tab part is pinched to sag the gasket main body, bolt holes formed in the flange surface as a mounting target surface and the bolt holes are matched in position.

The invention according to another aspect is directed to the gasket in which as for the tab part provided as extended from the lug part, a plurality of the tab parts in accordance with the use pressures are provided and, in a state in which the gasket main body is sagged to the horizontally-piped flange surfaces, the bolt holes formed in the flange surface as the mounting target surface in accordance with the use pressures and the bolt holes of the gasket are matched in position.

The invention according to another aspect is directed to the gasket in which the extended mounting part of the gasket includes a recessed slit part, and an unwanted outer peripheral portion of the gasket is removed by being pulled and torn away along this slit part.

The invention according to another aspect is directed to a flange connection structure for a plumbing instrument in which connection is made with a gasket main body attached between opposing flange surfaces of coupling parts of the plumbing instrument; the gasket main body has provided on both surfaces symmetrically-shaped annular seal surfaces and extended mounting parts as extended in accordance with outer diameters of flange surfaces for a plurality of use pressures on an outer peripheral side of these annular seal surfaces, with a substantially annular core coated with a coating part; and flange connection is made, with the annular seal surfaces making sealed contact with any flange surfaces of a flat seat shape flange, a full-flat seat shape flange, and a grooved-shape flange and with the extended mounting parts being fastened between the flange surfaces via bolts and nuts.

The invention according to another aspect is directed to a gasket having annular seal surfaces provided on both surfaces of a substantially annular gasket main body and having a plurality of bolt holes corresponding to flange surfaces for a plurality of use pressures disposed on an outer peripheral side of these annular seal surfaces, bolt holes at at least two locations among the bolt holes being provided at positions as a reference for the gasket main body and, with reference to these bolt holes, the bolt holes being disposed at positions corresponding to the flange surfaces for the plurality of use pressures.

The invention according to another aspect is the gasket in which the gasket main body has a plurality of knobs for hanging, and these knobs are provided on an extended line of a center line of the gasket main body and at positions where the bolt holes are assigned to support the flange surfaces for different use pressures.

The invention according to another aspect is directed to the gasket in which bolt holes other than the bolt holes as reference positions are coated with a thin-film shielding part, and slit parts for bolt insertion are formed in this shielding part.

2. Advantageous Effects of the Invention

From the invention, the annular seal surface is provided so as to be capable of making sealed contact with the flange surface of any of the flat seat shape flange, the full-flat seat shape flange, and the grooved-shape flange, and can thereby be used in a shared manner when different flange surfaces such as flat-seat-shape-flat-seat-shape, flat-seat-shape-grooved-shape, and full-flat-seat-shape-full-flat-seat-shape are connected. It can be easily attached when any flange surfaces are connected and fastened while preventing uneven clamping, and can thereby provide high sealability and reliably prevent water leakage.

Also, when the gasket main body is attached to the flange surface of the grooved-shaped flange, the annular protrusions can be arranged at predetermined positions as being guided along the inner edge or the outer edge of the annular groove. After attachment of the gasket main body, the annular protrusions are fit in the annular groove as making contact with at least either one of the inner edge and the outer edge of the annular groove, thereby allowing the flange surface to be connected while preventing a positional shift of the gasket main body. Thus, in addition to connection of the flange surface piped in the vertical direction, also when a flange surface piped in the horizontal direction is connected, the annular protrusions are fit in the annular groove to make the gasket main body to the grooved-shape flange as being centered, and high sealability for flange connection can be ensured.

When the gasket main body is attached to the flange surface of the flat seat flange or the full-flat seat flange, the annular protruding parts make sealed pressure contact with each flange surface. Thus, sealing performance can be intensively enhanced, and water leakage can be reliably prevented.

Also, recessed parts are provided on both sides of the annular protrusions. Thus, when the gasket main body is attached to the flange surface of the grooved-shape flange, a space is provided by the recessed parts between the annular protrusion and the inner edge or the outer edge of the annular protrusions to let a corner part of the inner edge or the outer edge reliably make contact with the annular protrusions to allow a positional shift to be prevented. On the other hand, when the gasket main body is attached to the flange surface of the flat-seat flange or the full-flat-seat flange, the recessed parts serve as relief margins for the annular protrusions crushed by the flat-shaped flange surface, and the annular protrusions are elastically deformed so as to be relieved to the recessed parts on both sides. Thus, excessive volume compression to the flange surface side of these annular protrusions, can be avoided, and the elastic force can be maintained for a long period of time. Thus, the annular protrusions can be deformed without difficulty to make pressure contact with the flange surface to improve sealing performance.

Also, the annular seal part makes pressure contact with the flange surface of the flat seat shape flange, the full-flat seat shape flange, and the grooved flange with a small contact area. Thus, the surface pressure force can be locally increased on the outer peripheral side of each flange surface to improve sealing performance.

Also, with the step part, the mounting part is provided to be thinner than the annular seal surface. Thus, when the gasket main body is attached to the flange surface of the full-flat seat shape, the annular seal surface can make contact with the seal surface of the flange surface via the step part, and the mounting part side can be separated from the flange surface. This can restricts the contact area between the annular seal surface and the seal surface of the flange surface and allow a sealed contact with a small seal area and a strong surface pressure force.

Also, a core is provided inside, thereby providing the gasket main body with appropriate stiffness for each attachment. By this core, a displacement of the flange is prevented to improve aseismic performance, a relief of the gasket due to internal pressure is prevented, and durability is also improved. Reinforcement of the core prevents deformation of the annular protrusions to the opposite surface side and deforms these annular protrusions along the flange surface to contribute to an improvement in water cutoff performance. If water leakage occurs due to deterioration, additional fastening can be easily performed as the core prevents extreme deformation of the annular seal surface and the annular protrusions. Furthermore, if ridge parts are formed at the seal position of the core, the ridge parts restrict a crush margin of a covering part of the gasket main body at the time of flange connection to reduce more-than-necessary compression. This prevents uneven clamping at the time of fastening with bolts and nuts and provides sealability with uniform pressure over the entire circumference.

Also, attachment can be made to the flange surface of any of the flat seat shape flange, the full-flat seat shape flange, and the grooved-shape flange irrespectively of the front/back orientation of the gasket main body, and high sealability can be ensured on the annular seal surface side on both surfaces.

Also, the gasket main body having the annular seal surface provided with the annular protrusions can be attached to the flange surface of any of the flat seat shape flange, the full-flat seat shape flange, and the grooved-shape flange, and this gasket main body can be used in a shared manner when different flange surfaces such as flat-seat-shape-flat-seat-shape, flat-seat-shape-grooved-shape, and full-flat-seat-shape-full-flat-seat-shape are connected.

When the gasket main body is attached to the flange surface of the grooved-shaped flange, the annular protrusions can be arranged at predetermined positions as being guided along the inner edge or the outer edge of the annular groove. After attachment of the gasket main body, the annular protrusions are fit in the annular groove as making contact with at least either one of the inner edge and the outer edge of the annular groove, thereby allowing the flange surface to be connected while preventing a positional shift of the gasket main body. Thus, in addition to connection of the flange surface piped in the vertical direction, also when a flange surface piped in the horizontal direction is connected, the annular protrusions are fit in the annular groove to make the gasket main body to the grooved-shape flange as being centered, and high sealability for flange connection can be ensured.

When the gasket main body is attached to the flange surface of the flat seat flange or the full-flat seat flange, the annular protruding parts make sealed pressure contact with each flange surface. Thus, sealing performance can be intensively enhanced, and water leakage can be reliably prevented.

For any flange surface, the gasket can be easily attached and connected, and can be fastened as preventing uneven clamping. Thus, high sealability can be provided to allow reliable water cutoff.

Also, the annular seal surfaces are provided at symmetrical positions on both surfaces of the gasket main body, the extended mounting parts are provided on the outer peripheral side of this annular seal surfaces, and these appropriate extended mounting parts can support the outer diameter of the flange surface. Thus, the gasket main body can be used in a shared manner for flanges of different types and sizes due to the difference in use pressure or the like, and can be attached as being centered in accordance with the outer diameter of the flange to be connected via the extended mounting parts to provide high sealability.

Also, the outer diameter of the core is set equal to or slightly smaller than the outer diameter of the minimum flange surface. Thus, the gasket main body extending off the outer diameter of the flange surfaces can be cut off after flange connection. This allows a heat insulator and a fixture can be installed around the flanges.

Also, the gasket main body can be used in a shared manner for fastening for different hole diameters and positions of the flange outer diameter and the bolt holes. Furthermore, if bolt holes with different pitch circles are formed as the same bolt hole at the same pitch angle, the number of bolt holes can be decreased.

Also, the respective bolt holes can be used in a shared manner. Thus, the gasket main body can be attached to the flange surface without making a mistake about the positions of the bolt holes and also support a plurality of use pressures. Since different use pressures can be supported while the number of bolt holes are decreased to minimum, a decrease in strength of the gasket main body is reduced, and manufacture is also facilitated.

Also, portions of the core corresponding to the bolt holes of the gasket main body are each provided with a notched part having an outer peripheral side of the core being open, and a bolt is inserted into this notched part. Thus, a core in a different shape is not required to be prepared for each flange with a different pitch circle and number of holes in accordance with the use pressure, and the shape of the core can be consolidated into one type.

Also, the notched part is provided to the core for bolt insertion, and no bolt hole is provided. Thus, unlike the case in which a bolt hole is provided to the core, there is no fear that the width of the core is thin at a portion outside the bolt holes to decrease the strength and this portion is deformed when added with external force if the gasket is erroneously dropped or the like.

Also, the bolt holes formed in the notched parts are such that the bolt holes are subjected to rubber lining with a coating part which coats the core, and no core penetrates through the portion outside the bolt holes. Thus, even if the bolt holes are formed to be small, the bolt holes can be widened by contraction and expansion properties of the rubber to ensure an insertion space. In addition, with the bolt pressed toward the center of the flange by the contractive force of rubber, the position of the bolt can be fixed to the bolt hole of the flange and, as a result, the center of the gasket and the center of the flange can match with each other.

Also, with the indicating parts of the lug part matching the outer diameters of the flanges, flange connection to flange surfaces with different outer diameters can be made while the gasket main body is centered. After flange connection, a portion extending off the outer diameter of the flange surface are cut off, and the size of the extended mounting parts can thus be matched with the outer diameter of the flange to support flanges with outer diameters of a plurality of types.

Also, with the tab part being pinched to sag the gasket main body, the bolt holes can be matched with the positions of the bolt holes in the horizontally-piped flange surface, and the gasket main body can be mounted in an appropriate attachment state. With this, even if the number of bolts/nuts is different with different use pressures, fastening and fixing can be made in an appropriate state by easily matching the bolt holes, and thus sealing performance of the gasket can be ensured for reliable water cutoff.

Also, a tab part in accordance with the use pressured is pinched among the plurality of tab parts to sag the gasket main body, which can be thereby used for different use pressures. Even if the number of bolts/nuts is different with different use pressures, fastening and fixing can be made in an appropriate state by easily matching the bolt holes, and thus sealing performance of the gasket can be ensured for reliable water cutoff.

Also, an unwanted outer peripheral portion of the gasket extending off around the flange can be easily removed by being pulled and torn away along the slit part without using a tool scissors or a cutter.

Also, the annular seal surfaces provided at symmetrical positions on both surfaces make sealed contact with the flange surface of any of the flat seat shape flange, the full-flat seat shape flange, and the grooved-shape flange and, with the extended mounting parts matching with the outer diameter of the flange surface, connection can be made by fastening with bolts and nuts. Thus, the gasket main body can be used in a shared manner for flanges of different types and sizes due to the difference in use pressure or the like, and can be attached as being centered in accordance with the outer diameter of the flange to be connected via the extended mounting parts to provide high seal ability.

Also, the plurality of bolt holes provided on the outer peripheral side of the annular seal surfaces match the flange. Thus, attachment can be made to flanges of not only plumbing in the vertical direction but also plumbing arranged in the horizontal direction as being centered, and shared use can be made for a plurality of different use pressures while making a mistake about fastening positions is prevented. In this case, by forming bolt holes for each type on a different bolt pitch circle depending on the use pressure, the bolt holes suitable for the bolt pitch and the hole diameter of the flange can be matched.

Furthermore, the bolt holes at at least two locations among the bolt holes are arranged as reference positions so that bolts for flanges of various types can be inserted. Thus, for use in flanges for different use pressures, these bolt holes at at least two locations match the bolt holes of each flange, thereby making it possible to match the bolt holes of the gasket main body with other bolt holes of the flange part. By guiding the worker to the reference bolt holes, flange piping operation can be smoothly performed without being aware of the difference in nominal pressure.

Also, when a knob in accordance with each use pressure is held at the time of horizontal piping to insert the gasket main body between the flanges from the vertical direction, appropriate bolt holes of the gasket main body can match the bolt holes of the flanges, and fastening can be easily made with bolts and nuts.

Also, the bolt holes other than the bolt holes at the reference positions are coated with the thin-film part. Thus, the bolt holes at the reference positions can be easily recognized, and bolts can be inserted into the thin-film parts after the bolt holes of the flanges and the bolt hole of the gasket main body are matched. Thus, positioning of the bolt holes are facilitated. With the bolt interposed in the slit part and its position retained, a bolt falling prevention function can be provided. In particular, falling of bolts that are easy to fall at the time of vertical piping can be reliably prevented.

Also, the gasket can be used for flanges of any of modes of the flat seat shape flange and the full-flat seat shape flange. With the annular seal surfaces making sealed contact with the flange surfaces, the bolt holes can be disposed at positions corresponding to bolt holes of the flanges for different use pressures. Thus, the gasket main body can be used in a shared manner, and this gasket main body being centered is attached between the flange surfaces to ensure high sealability.

Furthermore, a repair valve with a different flange surface can be connected between the riser pipe and the air valve, the fire hydrant, or the short pipe via the gasket main body. After connection, this repair valve can be operated to be open and closed while preventing water leakage from a connecting portion with the repair valve.

BRIEF DESCRIPTION OF THE DRAWINGS

FIG. 2 is an external view depicting a state before flange connection of FIG. 1.

FIG. 8(a) is an enlarged sectional view of main parts depicting a state before of RF-shape-GF-shape flange connection, and FIG. 8(b) is an enlarged sectional view of main parts depicting a state after flange connection of FIG. 8(a).

FIG. 17(a) is a descriptive diagram depicting a core of a ninth embodiment of the gasket, FIG. 17(b) is a descriptive diagram depicting a gasket with the core of FIG. 17(a) coated, and FIG. 17(c) is a diagram depicting a state in which a B portion of FIG. 17(b) is enlarged to have a bolt inserted therein.

FIG. 19(a) is a descriptive diagram depicting a tenth embodiment of the gasket, and FIG. 19(b) is a sectional view along a Y-Y line of FIG. 19(a).

FIGS. 27(a) and 27(b) are external views depicting a thirteenth embodiment of the gasket, in which FIG. 27(a) is a plan view of the gasket and FIG. 27(b) is a sectional view along D-D of FIG. 27(a).

FIGS. 33(a) and 33(b) are external views depicting a nineteenth embodiment of the gasket, in which FIG. 33(a) is a plan view of the gasket and FIG. 33(b) is a sectional view along E-E of FIG. 33(a).

FIGS. 34(a) and 34(b) depict a twentieth embodiment of the gasket, in which FIG. 34(a) is a plan view of the gasket and FIG. 34(b) is a sectional view along F-F of FIG. 34(a).

DETAILED DESCRIPTION OF EMBODIMENTS OF THE INVENTION

Figure 1:
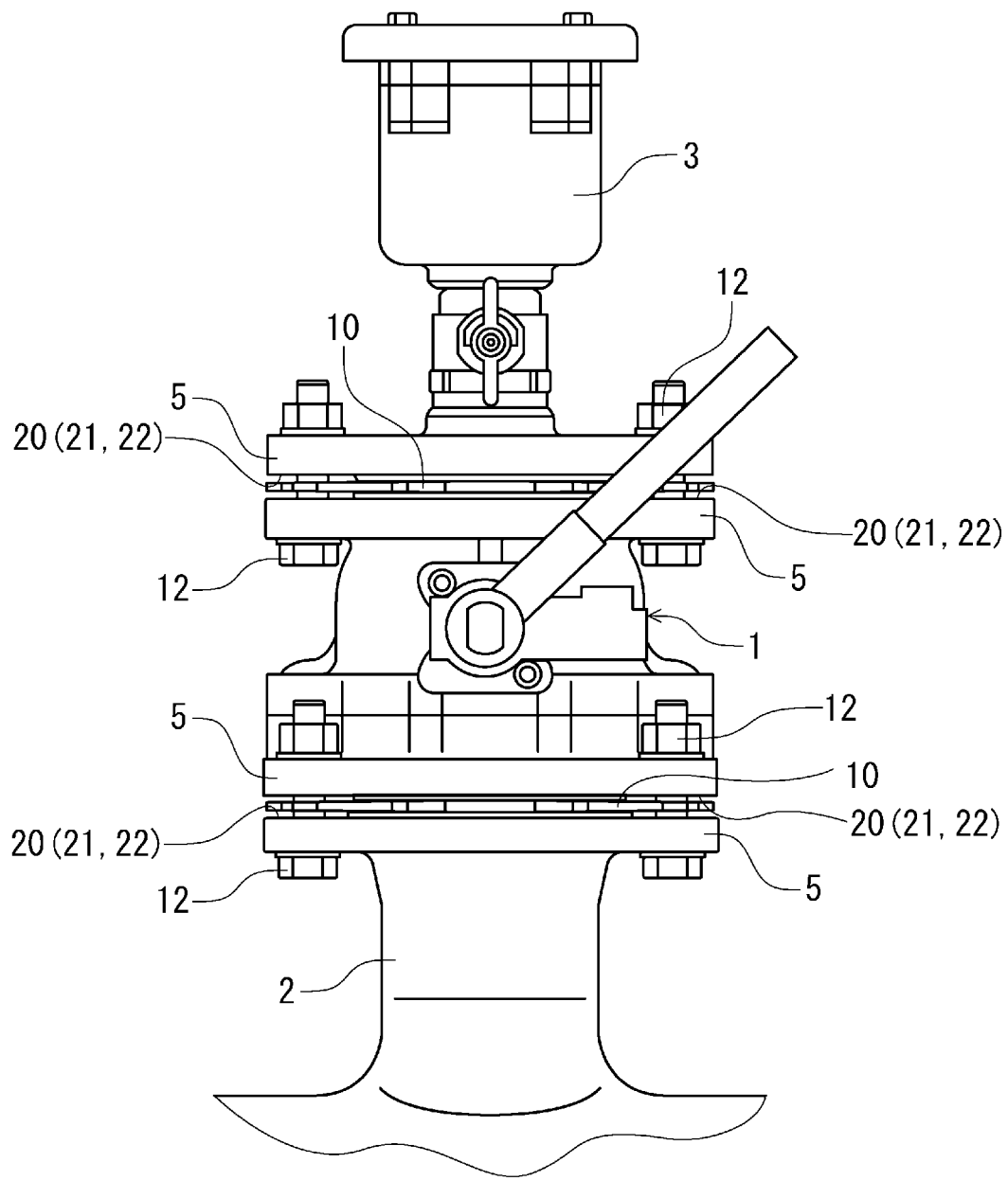
FIG. 1 is an external view depicting a state in which a repair valve is flange-connected.
Figure 3A:
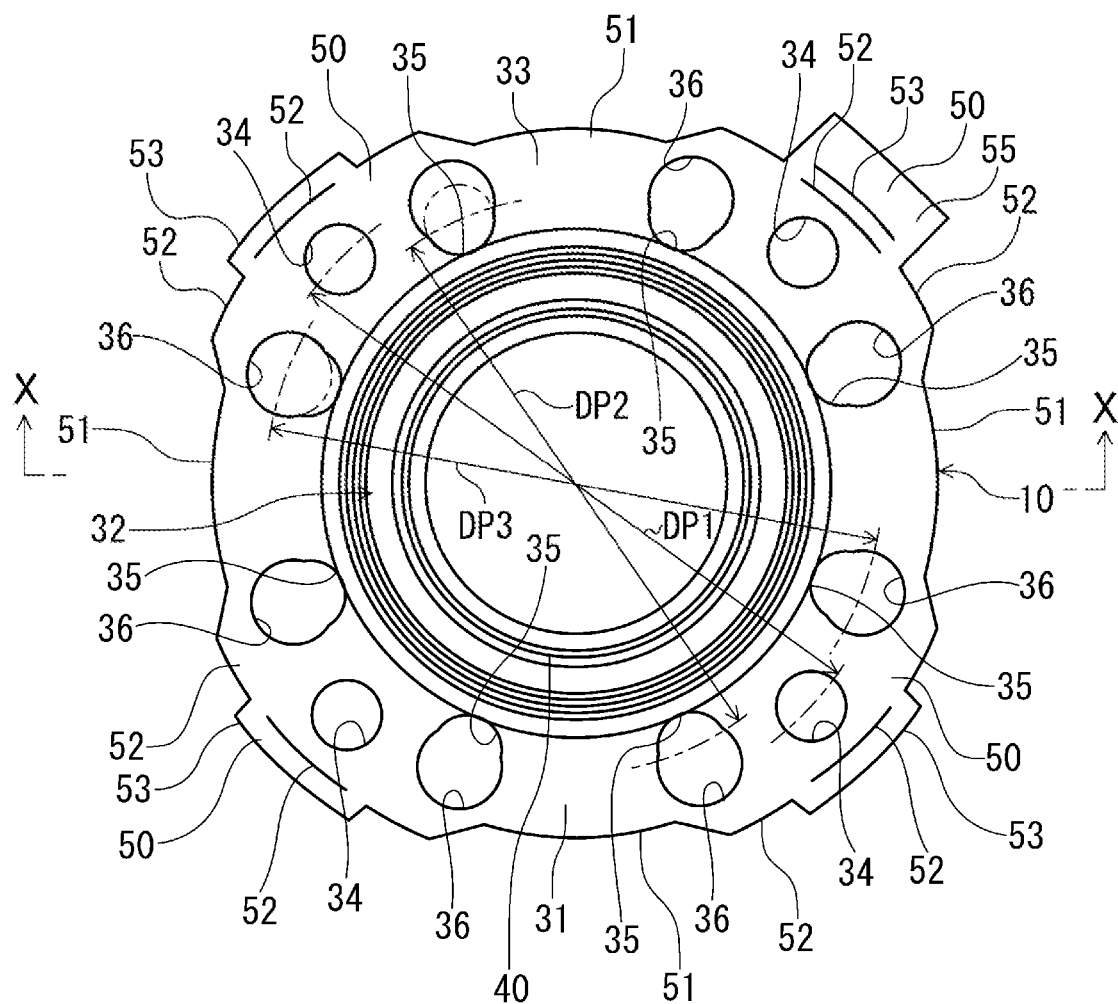
FIG. 3(a) is a plan view depicting a first embodiment of a gasket in the present invention.
Figure 3B:
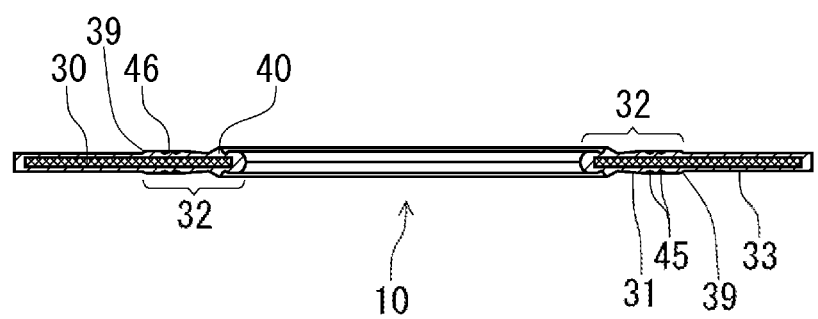
FIG. 3(b) is a sectional view taken along line X-X of FIG. 3(a).
Figure 5:
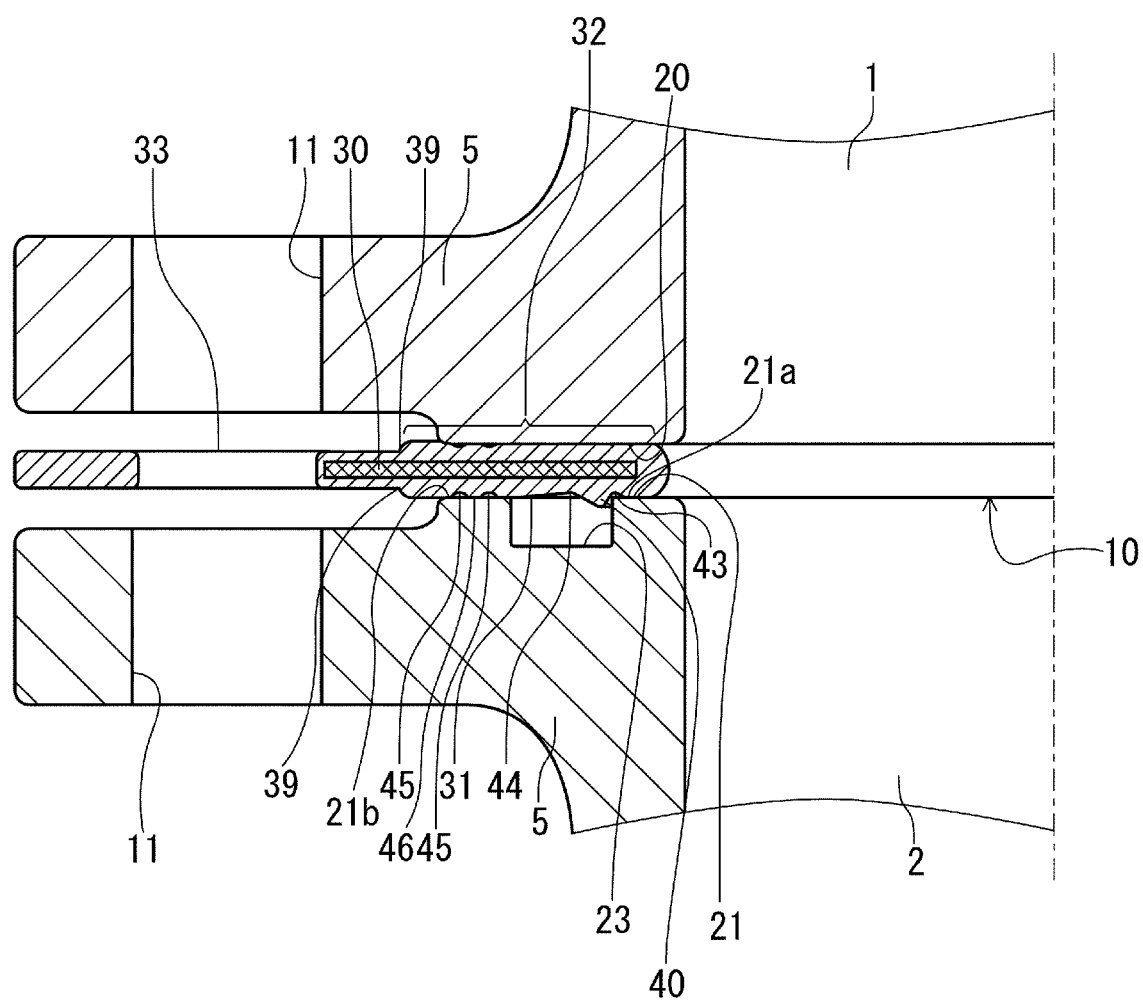
FIG. 5 is an enlarged sectional view depicting an attachment state of the gasket of FIG. 3.

In the following, embodiments of the gasket and the flange connection structure for the plumbing instrument using the same in the present invention are described based on the drawings. Depicted in FIG. 1 is a state in which a repair valve is flange-connected via the gasket of the present invention. Depicted in FIGS. 3(a)-3(b) is a first embodiment of the gasket of the present invention. Depicted in FIG. 5 is an attachment state of the gasket of FIGS. 3(a)-3(b). Note that this example depicts the case of a nominal diameter of plumbing is 75.

The repair valve depicted in FIG. 1 (hereinafter referred to as a repair valve main body 1) is a type of plumbing instrument, and the gaskets of the present invention (hereinafter referred to as gasket main bodies 10) are provided to connect a primary side of this repair valve main body 1 to a riser pipe 2 and connect a secondary side of the repair valve main body 1 to an air valve (or fire hydrant and short pipe, not depicted) 3. Each of the primary and secondary sides of the repair valve main body 1 is provided with a coupling part 5, and this coupling part 5 is provided with any of flange surfaces 20 to 22 for fastening the gasket main body 10 having any of various outer diameters described further below. On the other hand, each of a secondary side of the riser pipe 2 and a primary side of the air valve 3 is also provided with the coupling part 5, and this coupling part 5 is provided similarly with any of the flange surfaces 20 to 22.

As depicted in FIG. 2, the gasket main bodies 10 are respectively attached between the primary-side coupling part 5 of the repair valve main body 1 and the secondary-side coupling part 5 of the riser pipe 2 and between the secondary-side coupling part 5 of the repair valve main body 1 and the primary-side coupling part 5 of the air valve 3.

Note that the plumbing instrument is a valve, straight pipe, or deformed pipe having a flange coupling and the flange surface in the present embodiment is a surface which the gasket main body 10 makes sealed contact with.

The gasket main body 10 is attachably provided to the flange surface of the above-described external coupling 5, that is, the flange surface 20 in a flat seat shape (Raised Face: RF-shape), the flange surface 22 of a full-flat seat shape (Flat Face: FF-shape), or the flange surface 21 of a grooved shape (Grooved Face: GF shape) and, more specifically, is used for RF-shape-RF-shape connection between the RF-shape flange surfaces 20, RF-shape-GF-shape connection between the RF-shape flange surface 20 and the GF-shape flange surface 21, or FF-shape-FF-shape connection between the FF-shape flange surfaces 22. These combinations are selected depending on the use pressure (nominal pressure) of a fluid. Generally, RF-shape-RF-shape is used when the use pressure is 7.5 K (for 0.75 MPa), RF-shape-GF-shape is used when the use pressure is 7.5 K, 10 K (for 1.0 MPa), 16 K (for 1.6 MPa), or 20 K (2.0 MPa). In the flange surfaces 20 to 22 as attachment target surfaces, bolt holes 11 for flange connection are formed equidistantly with pitches in accordance with the use pressure. Via these bolt holes 11, the respective flange surfaces are connected with bolt nuts 12.

In FIG. 5, the state is depicted in which one of the coupling parts 5 is the RF-shape flange surface 20, the other is the GF-shape flange surface 21, and the gasket main body 10 is attached therebetween for connection. In the RF-shape flange surface 20, a seal surface with respect to the gasket main body 10 is provided as an annular flat surface. On the other hand, in the GF-shape flange surface 21, an annular groove 23 is formed at a substantially center position on an annular flat surface, and the flat surface having this annular groove 23 is a seal surface with respect to the gasket main body 10. In the annular groove 23, a general GF-shape gasket not depicted can fit for attachment.

As depicted in FIG. 3, FIG. 5, FIG. 6(a), and FIG. 6(b), the gasket main body 10 has a core 30 and a coating part 31, is provided therein with the metal-made core 30 for reinforcement, and this core 30 is coated with the coating part 31 made of an elastic material such as rubber and is provided to have a thin plate shape.

Both surfaces of the gasket main body 10 are provided in a symmetrical shape, and both surfaces of the coating part 31 are each provided with an annular seal surface 32. On an outer peripheral side of the annular seal surface 32, an extended mounting part 33 for mounting to the flange surface 20 (, flange surface 22), 21 is integrally provided. In this extended mounting part 33, bolt holes 34, 35, 36 for mounting to the flange surface 20, 21 are provided at a plurality of locations. In this manner, the gasket main bodies 10 are provided so as to have both surfaces in a symmetrical shape. Note that the annular seal surface 32 is a surface in contact with the flange surface 20.

Figure 4:
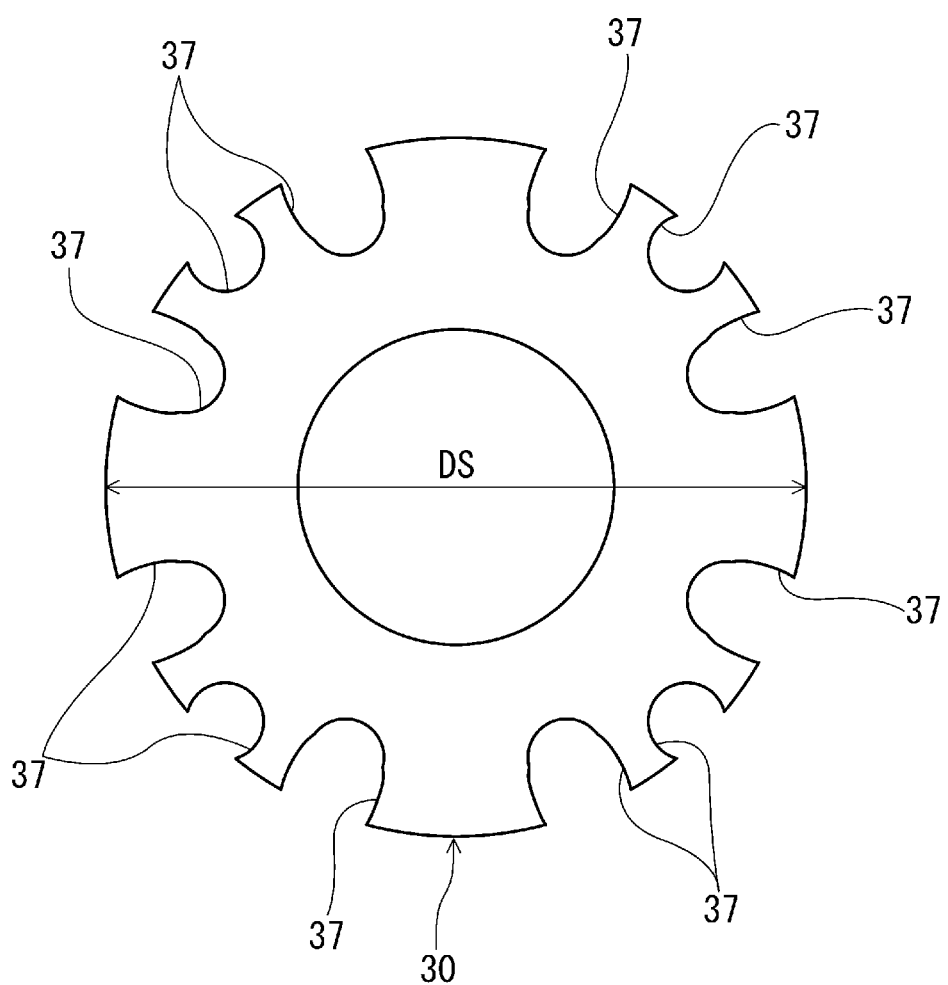
FIG. 4 is a plan view of a core.

In FIG. 4, the core 30 is substantially annularly provided, and notched parts 37 are formed at the positions where the bolt holes 34 to 36 are provided on the outer edge of this core 30. The notched parts 37 (bolt holes 34 to 36) are equidistantly disposed with the same pitch circles as pitch circles DP1, DP2, and DP3 of the bolt holes 11 described further below.

The core 30 has an outer diameter DS provided so as to match a minimum outer diameter of a flange surface among the RF-shape flange surface 20 (, the FF-shape flange surface 22) and the GF-shape flange surface 21, the outer diameter of the flange surface 20, 21 with a use pressure of 1.0 MPa in the present embodiment. The core 30 can be omitted and, in this case, the gasket main body is integrally formed by using an elastic material (not depicted).

Figure 6A:
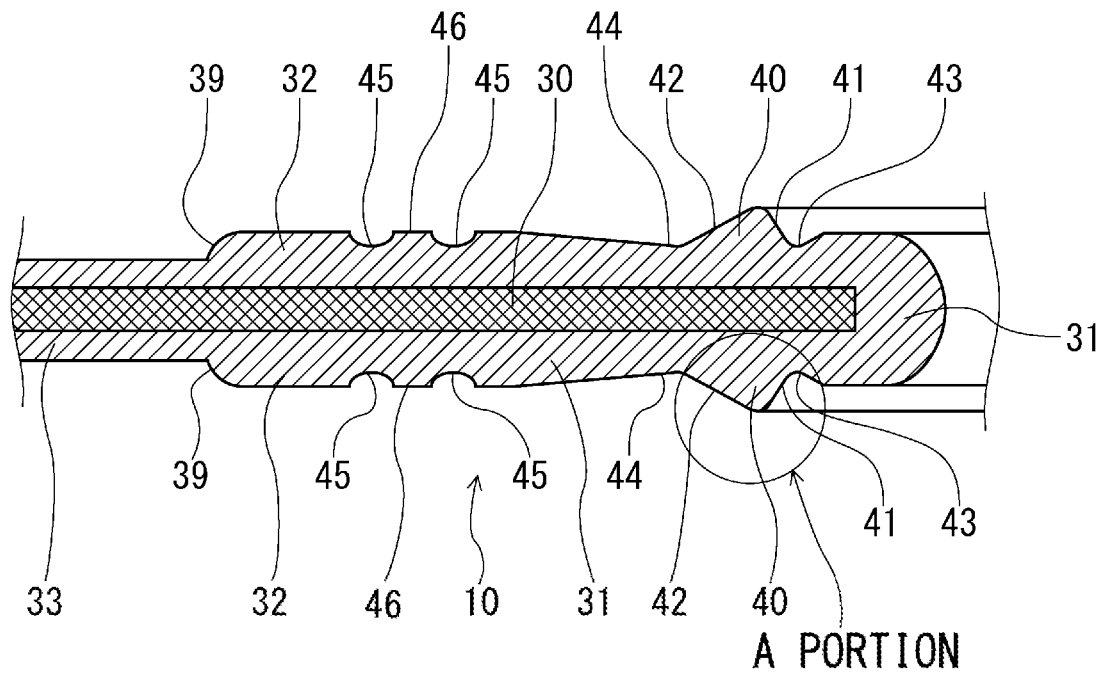
FIG. 6(a) is a partially enlarged sectional view of the gasket.
Figure 6B:
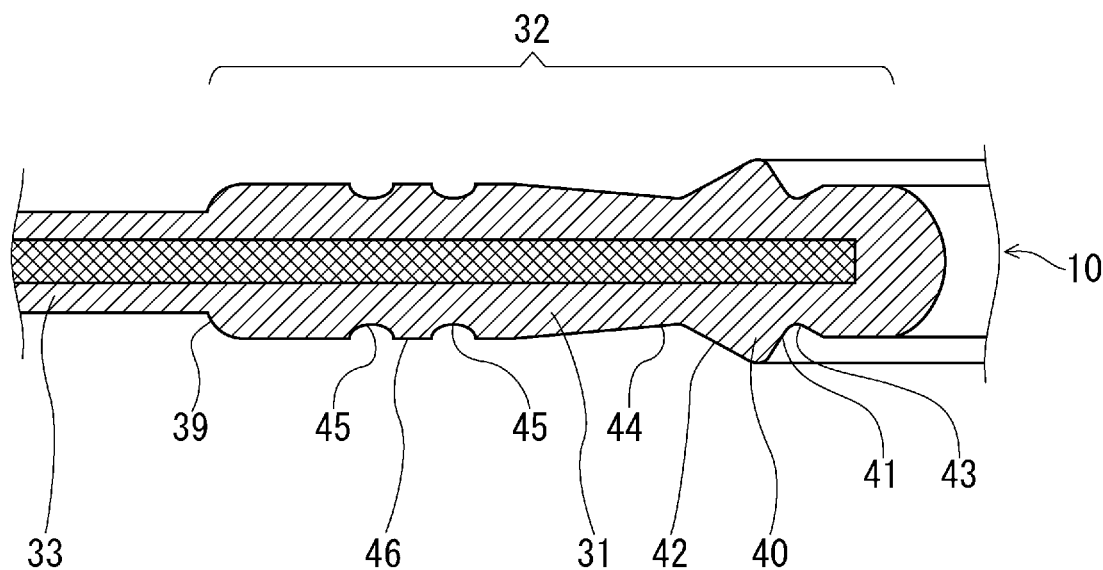
FIG. 6(b) is a partially-enlarged schematic sectional view of the gasket.

In FIG. 5 and FIG. 6(b), the annular seal surface 32 is provided to have a diameter larger than that of the flange surface 20, 21, thereby allowing the gasket main body 10 to be provided so as to make contact with any of the RF-shape flange surface 20 (, the FF-shape flange surface 22) and the GF-shape flange surface 21 and to be used in a shared manner.

Between the extended mounting part 33 and the annular seal surface 32, a step part 39 is formed. Via this step part 39, the extended mounting part 33 is provided thinly than the annular seal surface 32.

Both surfaces of the gasket main body 10 are each provided with an annular protrusion 40 concentrically so as to protrude from the annular seal surface 32, 32. The annular protrusion 40 has a substantially triangular sectional shape, and is a fit-in portion which makes contact with at least either one of an inner edge 23a or an outer edge 23b of the annular groove 23 of the GF-shape flange surface 21 and fits in this annular groove 23. In the present embodiment, the protrusion is provided so as to be able to make contact with the inner edge 23a and fit in the annular groove 23, and this allows the gasket main body 10 to be attached in a positioned state when the gasket main body 10 is attached to the GF-shape flange surface 21.

Together with this, the annular protrusions 40 are seal portions for pressure contact with the RF-shape flange surface 20 and the FF-shape flange surface 22 described further below. With this, when the gasket main body 10 is attached to the RF-shape flange surface 20 and the FF-shape flange surface 22, sealability is provided by these flange surfaces 20 and 22 and the annular protrusions 40.

Figure 7:
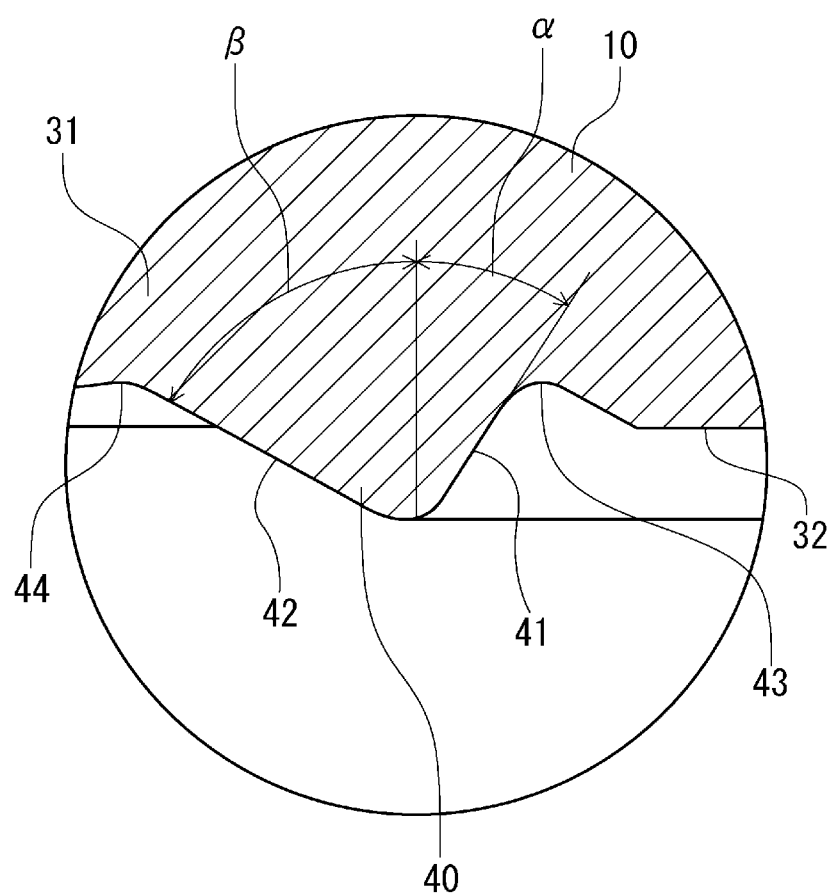
FIG. 7 is an enlarged sectional view of a A portion of FIG. 6(a).

As depicted in FIG. 7, on the inner diameter side and the outer peripheral side of the annular protrusion 40, tapered surfaces 41 and 42 are provided, respectively. These tapered surfaces 41 and 42 are formed with different gradients at an angle α and an angle β from a vertical plane. The angle α and the angle β have a relation of the angle α≤the angle β. With this, the tapered surface 41 on the inner peripheral side is provided with a gradient steeper than that of the tapered surface 42 on the outer peripheral side.

In FIG. 5 and FIG. 6(a), on both sides of the annular protrusion 40, recessed parts 43 and 44 are provided, respectively. As for these recessed parts 43 and 44, in accordance with the relation of the angle α≤the angle β of the annular protrusion 40, the recessed part 43 on the inner peripheral side has a narrow groove width, and the recessed part 44 on the outer peripheral side has a groove width wider than that of the recessed part 43. The annular protrusion 40 is crushed by the RF-shape flange surface 20 and, in this case, the recessed parts 43 and 44 serve as relief margins for the annular protrusion 40 with the crushed recessed parts 43 and 44. With the annular protrusion 40 elastically deformed so as to be relieved to the recessed parts 43 and 44, swelling deformation of this annular protrusion 40 to the flange surface 20 side is prevented.

On the outer peripheral side with respect to the recessed parts 44, a plurality of groove parts 45, 45 are formed concentrically in surfaces opposing to the flange surfaces 20 and 21. Between these groove parts 45, a narrow-width annular seal part 46 is provided. The annular seal part 46 can make pressure contact with the RF-shape flange surface 20 (, the FF-shape flange surface 22) or the GF-shape flange surface 21 at the time of attachment of the gasket main body 10. While the number of groove parts 45 is two in the present embodiment, three or more groove parts 45 may be provided.

In this case, a plurality of annular seal parts 46 are formed.

Figure 9:
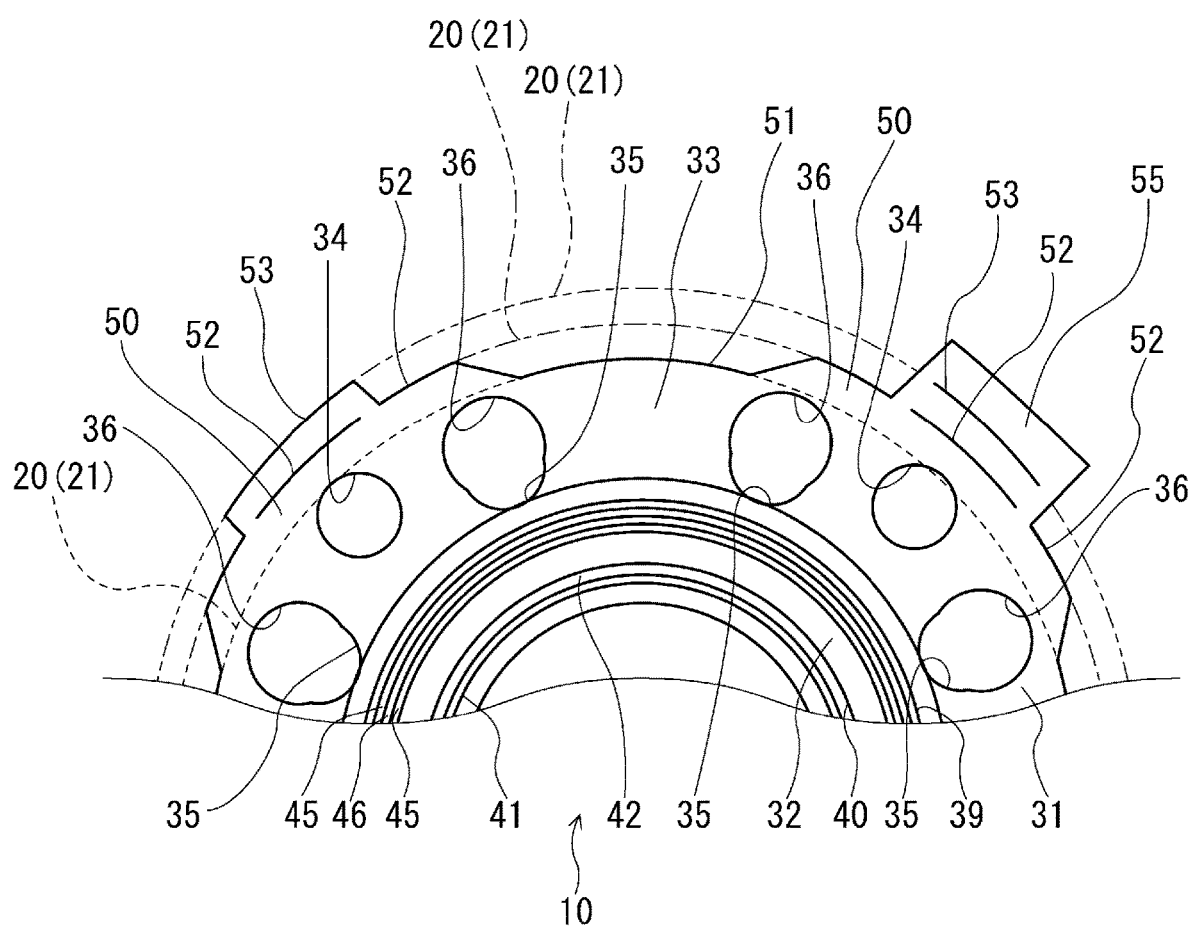
FIG. 9 is a partially enlarged plan view of the gasket.

In FIG. 3 and FIG. 9, the extended mounting part 33 is configured to have a plurality of different diameters in accordance with the outer diameters of the flange surfaces 20 to 22 for a plurality of use pressures and, in the present embodiment, is provided so as to extend in accordance with the outer diameters of the RF-shape flange surface 20 (FF-shape flange surface 22) and the GF-shape flange surface 21. The extended mounting part 33 is provided to a position which achieves a dimeter at least larger than a distance from the annular seal surface 32 to the bolt holes 34 to 36. This extended mounting part 33 makes the gasket main body 10 attached via the bolts and the nuts 12 between the flange surfaces 20 and 21.

In the extended mounting part 33, the bolt holes 34 to 36 are formed at a plurality of locations on the same center line in accordance with the position of the notched parts 37 of the core 30. These bolt holes 34 to 36 are provided by different pitch circles in accordance with a plurality of use pressures. For example, the bolt holes 34 are provided by a pitch circle for bolts/nuts for a use pressure of 0.75 MPa, the bolt holes 35 are provided by a pitch circle for bolts/nuts for a use pressure of 1.0 MPa, and the bolt holes 36 are provided by a pitch circle for bolts/nuts for a use pressure of 1.6 MPa. The bolt holes 35 and 36 for the use pressures of 1.0 MPa and 1.6 MPa are arranged to be superposed on the same center line at the same pitch angle and, in these cases, fastening and fixing are performed with eight sets of bolts/nuts 12. In the case of the use pressure of 0.75 MPa, fastening and fixing are performed with four sets of bolts/nuts 12.

Also, since the notched parts 37 of FIG. 4 are formed by opening the outer peripheral side of the core 30, the core 30 does not penetrate through the extended mounting part on the outer peripheral side with respect to the bolt holes 34 to 36 of FIG. 3. Therefore, for the bolt holes 34 to 36 in an opening direction of the notched parts 37, the extended mounting part 33 made of an elastic material such as rubber configuring hole parts is stretched out to increase the diameter to allow insertion of bolts.

On the extended mounting part 33 in the outer peripheral direction, arc-shaped lug parts 50 are formed by extension. This lug parts 50 are provided in a step-like shape in accordance with the difference among the plurality of use pressures so that the outer edges of the lug parts 50 match different flange outer diameters. On the surface of the extended mounting part 33 including the lug parts 50, indicating parts 51, 52, and 53 are provided. These indicating parts 51 to 53 are provided at positions indicating the positions of the outer diameters in accordance with the use pressures of the RF-shape flange surface 20 (FF-shape flange surface 22), and the GF-shape flange surface 21 for the plurality of use pressures.

In the present embodiment, the outer edge of the extended mounting part 33 forms the indicating parts 51 for a flange diameter for the use pressure of 1.0 MPa, and these indicating parts 51 match the flange surface for the use pressure of 1.0 MPa. Portions with their diameter increased by one step more than the extended mounting part 33 at the lug parts 50 are provided with the indicating parts 52 for a flange diameter for the use pressure of 1.6 MPa, and these indicating parts 52 match the flange surface for the use pressure of 1.6 MPa indicated by one-dot-chain lines. The outer edge of the lug parts 50 on the diameter-increased side with respect to the indicating parts 52 is provided with the indicating parts 53 for a flange diameter for the use pressure of 0.75 MPa, and these indicating parts 53 match the flange surface for the use pressure of 0.75 MPa indicated by two-dot-chain lines. Among these, for example, on the indicating parts 51 for the use pressure of 1.0 MPa, numerical values of pressure are indicated not depicted. The indicating parts 53 and 52 for the use pressures of 0.75 MPa and 1.6 MPa are each indicated by a numerical value of pressure not depicted and an arc representing the outer diameter of the flange surface.

The lug parts 50 are formed at four locations of the gasket main body 10. With these lug parts 50 and portions interposed between the lug parts 50, four sets of the indicating parts 53, 51, and 52 for the use pressures of 0.75 MPa, 1.0 MPa, and 1.6 MPa, respectively, are provided at four locations.

Furthermore, as depicted in the drawings, a tab part 55 is formed by extending from at least the lug part 50 at one location, and attachment can be made by pinching this tab part 55. In this embodiment, when the tab part 55 of the gasket main body 10 is pinched for sagging to the horizontally-piped flange surface, the bolt holes 35 and 36 for the use pressures 10 K and 16 K match the positions of the bolt holes 11 of the flange surface.

Note that while the gasket main body 10 supports the flange surfaces for the use pressures of 0.75 MPa, 1.0 MPa, and 1.6 MPa in this embodiment, the gasket main body 10 can be provided in a manner similar to the above for other pressures and foreign standards other than standards such as JIS and JWWA.

Next, the flange connection structure for the plumbing instrument using the above-described gasket main body and its operation are described.

The repair valve main body 1 as a plumbing instrument depicted in FIG. 1 and FIG. 2 is connected via any of the RF-shape flange surface 20, the FF-shape flange surface 22, and the GF-shape flange surface 21 between the riser pipe 2 and the air valve 3, the above-described gasket main body 10 is connected as being attached between the flange surfaces of the facing coupling parts 5 of this plumbing instrument.

In this case, either one or both of the annular protrusions 40 fit in the annular groove 23 as being in contact with at least either the inner edge 23a or the outer edge 23b of the annular groove 23 of the GF-shape flange surface 21 or either one or both of the annular protrusions 40 is flange-connected as making pressure contact with the RF-shape flange surface 20 or the FF-shape flange surface 22.

In FIG. 5, a state is depicted in which an RF-shape-GF-shape flange connection is performed by using the gasket main body 10.

In this case, when the gasket main body 10 is placed on the GF-shape flange surface 21, the annular protrusion 40 is in a state of fitting in the annular groove 23 as being in contact with the inner edge 23a of the annular groove 23. This makes the gasket main body 10 arranged at a predetermined position of the GF-shape flange surface 21. Moreover, as depicted in FIG. 7, since the relation of the angle α≤the angle β provides the tapered surface 41 on the inner peripheral side with a steep gradient, if the tapered surface 41 makes contact with the inner edge 23a, the annular protrusion 40 slides into the annular groove 23 as the tapered surface 41 is guided by the inner edge 23a in FIG. 5. This allows the gasket main body 10 to be easily attached at a predetermined position on the GF-shape flange surface 21. After attachment, with the tapered surface 41 with the steep gradient in contact with the inner edge 23a, the annular protrusion 40 is less prone to being positionally shifted with respect to the annular groove 23, and the attachment state of the gasket main body 10 can be maintained.

Furthermore, here, since the inner edge 23a of the annular groove 23 serves as a dimensional reference, attachment to the flange surface 21 can be made in an appropriate state while the flange main body 10 is being centered via the contact of the annular protrusion 40.

From this, in the case of the vertical plumbing depicted in FIG. 1, FIG. 2, and FIG. 5, the gasket main body 10 can be easily positioned and attached to the GF-shape flange surface 21 piped generally on a lower side as depicted in FIG. 8(*a*). Moreover, since both surfaces of the gasket main body 10 are provided in a symmetrical shape, an attached state can be achieved similarly if either surface is faced down.

In this state, flange connection can be made by fastening with the bolts/nuts 12 via the bolt holes 11 and the bolt holes 34 to 36 of the extended mounting part 33.

At that occasion, even if the outer diameter of the flange surface is varied depending on the type of the flange surface or the difference in use pressure, the extended mounting part 33 in accordance with the outer diameter of each flange surface is provided, and the appropriate extended mounting part 33 supports the outer diameter of each of various flange surfaces and thus can be used in a shared manner for various flange surface. Although not depicted, also in the case of horizontal plumbing, if the gasket main body 10 is attached as the annular protrusion 40 fits in the annular groove 23, positioning and attachment are made in a manner similar to that of the vertical plumbing, and flange connection can be made by fastening with the bolts/nuts 12.

As depicted in FIG. 8(*b*), on the GF-shape flange surface 21 side after flange connection, the inner diameter side across the annular groove 23 serves as a diameter-decreased seal surface 21a, and the inner diameter side of the gasket main body 10 with respect to the annular protrusion 40 makes pressure contact with this diameter-decreased seal surface 21a to provide water cutoff. Also, the outer diameter side of the flange surface 21 across the annular groove 23 serves as a diameter-increased seal surface 21b, and the outer peripheral side of the gasket main body 10 centered on the narrow-width annular seal part 46 makes pressure contact with and seals this diameter-increased seal surface 21b, thereby decreasing the contact area and increasing the surface pressure.

From these, on the GF-shape flange surface 21 side, the annular seal surface 32 of the gasket main body 10 and the flange surface 21 are adhered and sealed with small contact areas on the inner peripheral side and the outer peripheral side across the annular groove 23, thereby improving sealability. Here, in particular, high seal surface pressure can be ensured with the diameter-increased seal surface 21b on the outer peripheral side, thereby reliably preventing water leakage.

On the other hand, on the RF-shape flange surface 20 side after flange connection, the annular protrusion 40 of the gasket main body 10 is elastically deformed from a state indicated by a two-dot-chain line to be compressed and sealed to the flange surface 20, and can thereby locally increase these surface pressures and improve sealing performance. Here, with the elastically-deformed annular protrusion 40 relieved into the recessed parts 43 and 44 on both sides of the annular protrusion 40, an occurrence of cracking and rapture of the annular protrusion 40 can be prevented and, by extension, deterioration of the entire coating part 31 can be prevented and sealing performance by the gasket main body 10 can be maintained.

Furthermore, as with the GF-shape flange surface 21 side, the outer peripheral side of the gasket main body 10 centered on the annular seal part 46 makes pressure contact with and seals the diameter-increased seal surface 21b with a small contact area, thereby providing high sealability.

With the extended mounting part 33 provided via the step part 39 so as to be thinner than the annular seal surface 32, a contact between the extended mounting part 33 and the flange surfaces 20 and 21 is prevented by taking the step part 39 as a boundary, and the contact areas (seal areas) between the annular seal surface 32 and the flange surfaces 20 and 21 are restricted to a predetermined size. This small contact area allows uniform sealing between both surfaces of the gasket main body 10 and the flange surfaces 20 and 21 with high surface pressure force and, even when the FF-shape flange surfaces 22 are connected, a water cutoff function equivalent to that of pressure contact and sealing to the RF-shape flange surface 20 is provided.

As depicted in FIG. 9, in the extended mounting part 33 of the gasket main body 10, the outer edge of the lug parts 50 as the indicating part 53 is matched with the outer periphery of the RF-shape flange surface 20 and the GF-shape flange surface 21 for the use pressure of 0.75 MPa indicated by a two-dot-chain line, and the gasket main body 10 can thus be arranged as being aligned with the center of each of the flange surfaces 20 and 21. In this state, the gasket main body 10 is caught by the other flange surface 20 (21) and fastened with the bolts/nuts 12, and flange connection can be made while the gasket main body 10 is arranged as being in a centered state. Thus, a deviation of the gasket main body 10 can be prevented even if the bolt holes 34 to 36 are provided so as to have a diameter larger than that of the bolt hole 11 to have a backlash.

The same goes for the flange surfaces 20 and 21 for the use pressure of 1.0 MPa indicated by a broken line and the flange surfaces 20 and 21 for the use pressure of 1.6 MPa indicated by a one-dot-chain line. With the indicating parts 51 and 52 of the lug part 50 each matched with the outer periphery of the flange surfaces 20 and 21, the gasket main body 10 can be arranged as being in a centered state, and flange connection can be made while sealing is reliably made in this state.

With an outer diameter DS of the core 30 being set as an outer diameter slightly smaller than the minimum outer diameter of the flange surface of the RF-shape flange surface 20 and the GF-shape flange surface 21 for the use pressure of 1.0 MPa, connection can be made for any of the use pressures of 0.75 MPa, 1.0 MPa, and 1.6 MPa, with the core 30 interposed between the flange surfaces 20 (21). After flange connection, the annular seal surface 32 can be sealed to the flange surfaces 20 and 21 as being reinforced by the core 30, and deformation of the GF-shape flange surface 21 to the annular groove 23 side is prevented. Sealability by the annular seal surface 32 with respect to the flange surfaces 20 and 21 is ensured, and also an unnecessary step-shaped lug part 50 extending off the outer diameter of the flange surfaces 20 and 21 is cut off, thereby supporting flange surfaces with a plurality of use pressures.

In addition to this, by cutting off the lug part 50, a flange heat insulator, a flange fixture, and so forth not depicted can be easily mounted.

In FIG. 10, flange connections with combinations other than RF-shape-GF-shape are depicted.

Figure 10A:
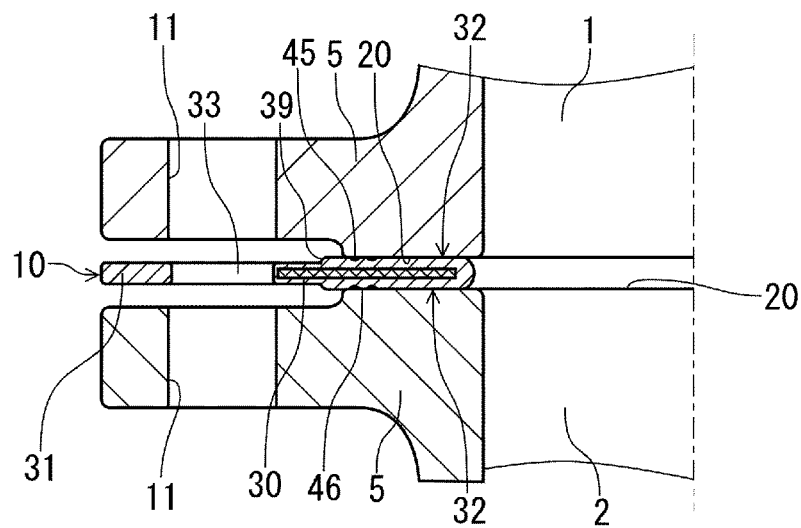
FIG. 10(a) is an enlarged sectional view of main parts depicting a state of RF-shape-RF-shape flange connection.

In FIG. 10(a), for flange connection by RF-shape-RF-shape, the above-described lug parts 50 are matched with the outer diameter of the RF-shape flange surface 20, thereby allowing connection between these flange surfaces 20 and 20 in a centered state via the gasket main body 10. After flange connection, the annular protrusions 40 are compressed by the flange surfaces 20 and 20 on both sides to increase the surface pressure on the inner peripheral side, and the surface pressure with respect to the outer peripheral side of the flange surface 20 is increased by the annular seal part 46, thereby allowing sealability to be enhanced on the inner and outer peripheral sides of the flange surface 20.

Figure 10B:
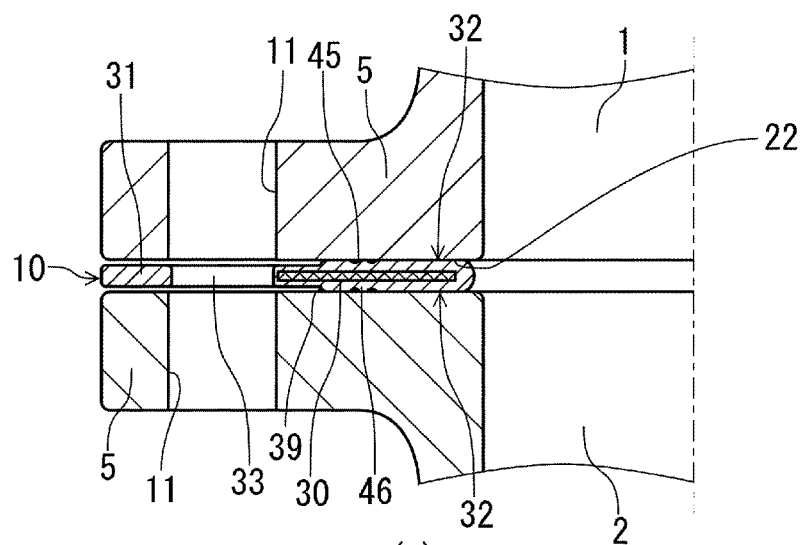
FIG. 10(b) is an enlarged sectional view of main parts depicting a state of FF-shape-FF-shape flange connection.

In FIG. 10(b), also for flange connection by FF-shape-FF-shape, as with RF-shape-RF-shape, centering can be made by matching the lug parts 50 with the outer diameter of the FF-shape flange surfaces 22. After flange connection, the surface pressure with respect to the flange surfaces 22 is increased by the annular protrusions 40 and the annular seal part 46 to enhance sealability, thereby allowing an improvement in water cutoff performance.

Figure 10C:
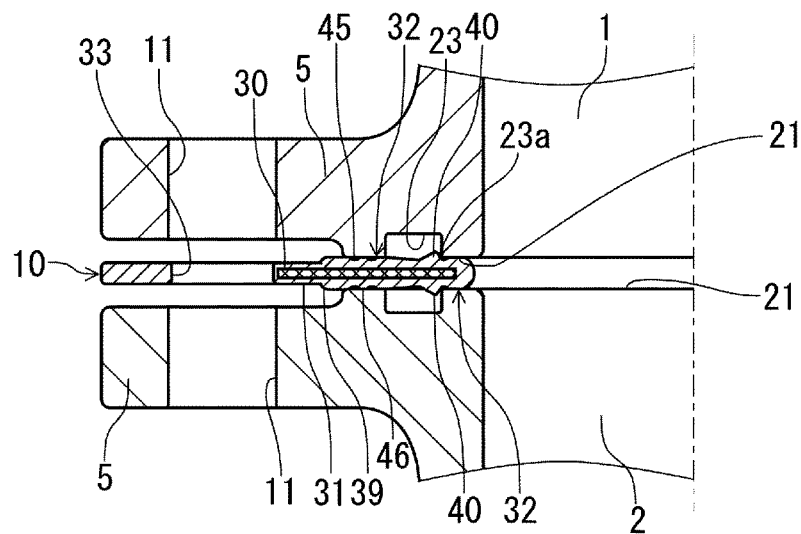
FIG. 10(c) is an enlarged sectional view of main parts depicting a state of GF-shape-GF-shape flange connection.

In FIG. 10(c), for flange connection by GF-shape-GF-shape, the annular protrusions 40 of the gasket main body 10 on both surfaces each fit in the annular groove 23 as making contact with the inner edge 23a, thereby allowing the gasket main body 10 to be attached in a centered state between the GF-shape flange surfaces 21, 21. After flange connection, the diameter-decreased seal surface 21a and the diameter-increased seal surface 21b on the inner and outer peripheral sides of the flange surface 21, and the inner peripheral side and the outer peripheral side including the annular seal part 46 of the gasket main body 10 are respectively pressure-contacted and sealed with a small contact area, thereby allowing an increase in surface pressure force.

From the above, the gasket main body 10 can be used in a shared manner and attached for any of the RF-shape flange surface 20, the GF-shape flange surface 21, and the FF-shape flange surface 22. Furthermore, the gasket main body 10 can be used in a shared manner when these are connected in different combinations. In either case, since the both surfaces of the gasket main body 10 have a symmetrical shape, attachment can be made irrespectively of the front/back orientation. This allows a worker to perform quick operation without confusion at the time of installation and reliably perform water cutoff.

Figure 11A:
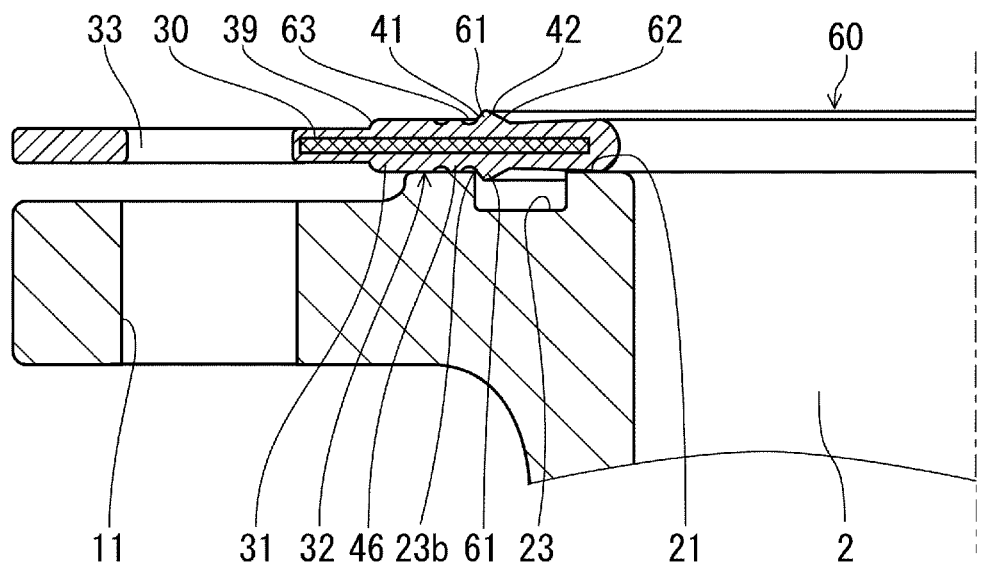
FIG. 11(a) is a partially enlarged sectional view depicting a second embodiment of the gasket.
Figure 11B:
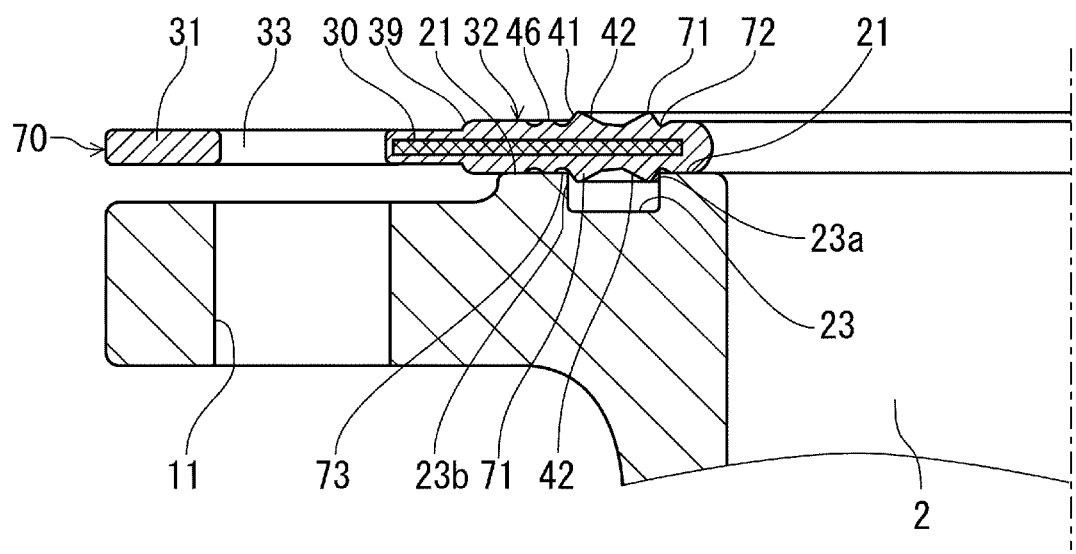
FIG. 11(b) is a partially enlarged sectional view depicting a third embodiment of the gasket.

In FIG. 11(a), a second embodiment of the gasket in the present invention is depicted. In FIG. 11(b), a third embodiment is depicted. Note that a portion identical to that of the above-described embodiment is represented by the same reference sign, and its description is omitted.

In FIG. 11(a), annular protrusions 61 on both surfaces of a gasket main body 60 are provided so as to be able to fit as making contact with the outer edge 23b of the annular groove 23 of the GF-shape flange surface 21, and the annular protrusions 61 are provided in a sectional shape symmetrical to that of the above-described annular protrusions 40. This gasket main body 60 is particularly effective for the GF-shape flange surface 21 formed with the outer edge 23b of the annular groove 23 as a dimensional reference, and the gasket main body 60 can be centered as being positioned with the outer edge 23b to be accurately attached.

In FIG. 11(b), annular protrusions 71 on both surfaces of a gasket main body 70 is provided at positions so as to be able to fit as making contact with the inner and outer peripheral sides of the annular groove 23 of the GF-shape flange surface 21. The annular protrusions 71 are provided to form a sectional shape symmetrical in a horizontal direction in the drawing. In this case, the gasket main body 70 can be attached as being positioned with the inner edge 23a and the outer edge 23b of the annular groove 23 and accurately centered.

In either case, as with the annular protrusion 40 of FIG. 5, the tapered surfaces 41 and 42 are formed by setting the relation between the angle α and the angle depicted in FIG. 7 as the relation of the angle α≤the angle β, and recessed parts 62 and 63 or recessed parts 72 and 73 serving as relief margins are provided to the inner and outer periphery of the annular protrusion 61 and 71, respectively, thereby allowing sealing while providing a function similar to that of the gasket main body 10 of FIG. 5.

Figure 12:
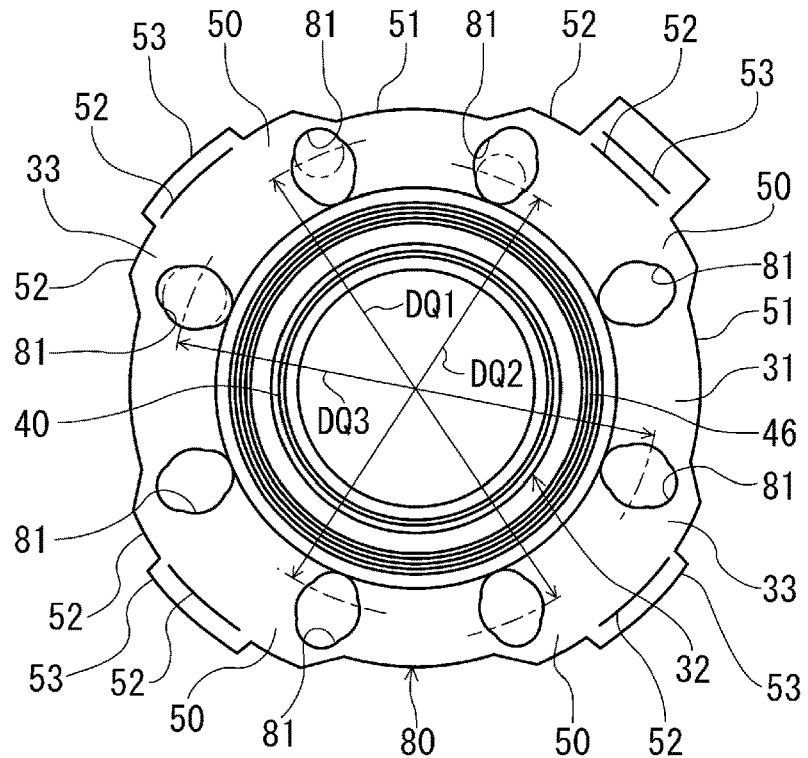
FIGS. 12(a) and 12(b) are descriptive diagrams depicting a fourth embodiment of the gasket.
Figure 12:
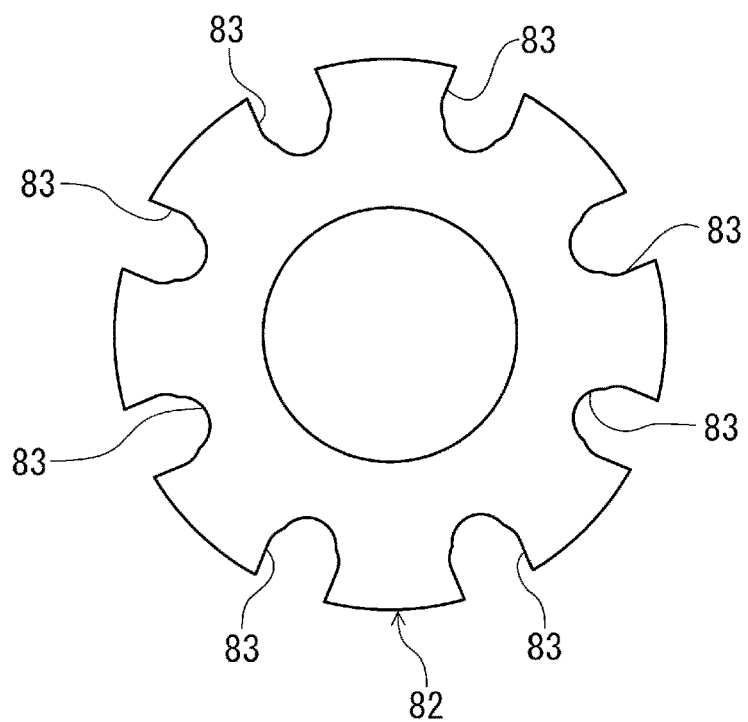

In FIG. 12, a fourth embodiment of the gasket having a nominal diameter of 75 in the present invention is depicted.

In this gasket main body 80, bolt holes 81 formed by superposing pitch circles with a plurality of use pressures and bolt holes with different hole diameters and hole counts on the same center line are arranged in a rotationally symmetrical manner. The bolt holes 81 supporting use pressures of 0.75 MPa, 1.0 MPa, and 1.6 MPa are aggregated to one set. As depicted in FIG. 12(a), while the bolt holes 81 are formed by a pattern of one type, they can be used in a shared manner for different outer diameters of flange surfaces. In this case, as the gasket main body 80 of FIG. 12(a) and a core 82 provided in the gasket main body 80 depicted in FIG. 12(b), the bolt holes 81 and notched parts 83 of the core 82 are formed with pitch circles DQ1, DQ2, and DQ3 with different diameters at the same pitch angle, and are provided so as to be able to be fastened and fixed with eight sets of bolts and nuts not depicted.

This can improve the strength of the core 82 with the minimum number of bolt holes 81 and notched parts 83, and also allows easy machining of these bolt holes 81 and notched parts 83. Also, erroneous selection of the bolt hole 81 for use can be prevented.

Figure 13:
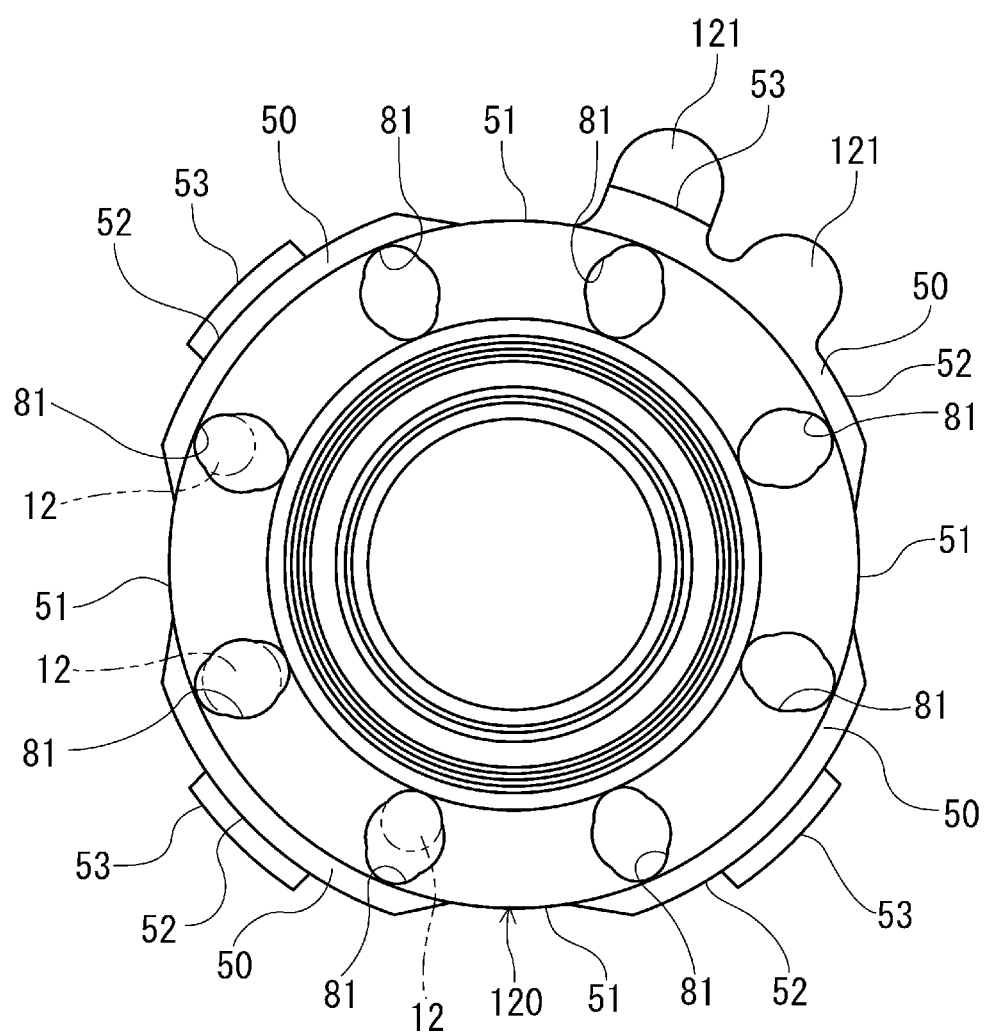
FIG. 13 is a descriptive diagram depicting a fifth embodiment of the gasket.

In FIG. 13, a fifth embodiment of the gasket having a nominal diameter of 75 in the present invention is depicted.

In this gasket main body 120, as with the gasket main body 80 of FIG. 12, the bolt holes 81 formed by superposing pitch circles with a plurality of use pressures and bolt holes with different hole diameters and hole counts on the same center line are arranged in a rotationally symmetrical manner, and these bolt holes 81 can be used in a shared manner.

Furthermore, in this gasket main body 120, a plurality of tab parts 121 are provided at positions where the bolt holes 81 can be matched with the positions of the bolt holes 11 in the flange surfaces. To attached the gasket main body 120 to a horizontally-piped flange surface, with any of the plurality of tab parts 121 in accordance with the use pressure being pinched and sagged, the positions of the bolt holes 81 can be matched with the bolt holes 11 in accordance with the use pressure formed in the flange surface as an attachment target surface.

With this, by pinching the appropriate tab part 121 to sag the gasket main body 120, this gasket main body 10 can be accurately arranged onto the flange surface, and can be easily mounted with bolts/nuts without errors about the fastening positions. Therefore, erroneous attachment of the gasket main body 120 and uneven clamping can be avoided, and high sealability can be provided.

Figure 14A:
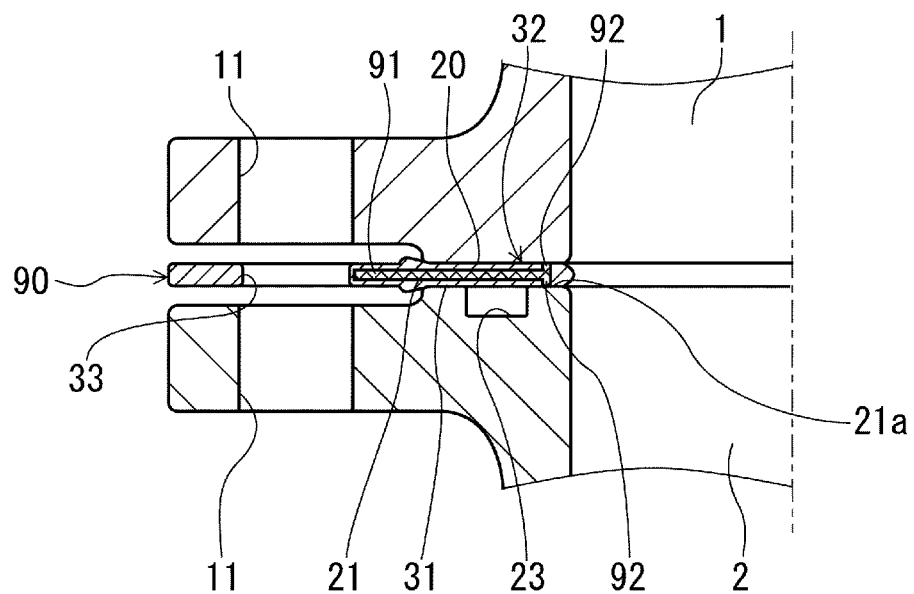
FIGS. 14(a) and 14(b) are descriptive diagrams depicting a sixth embodiment of the gasket.
Figure 14B:
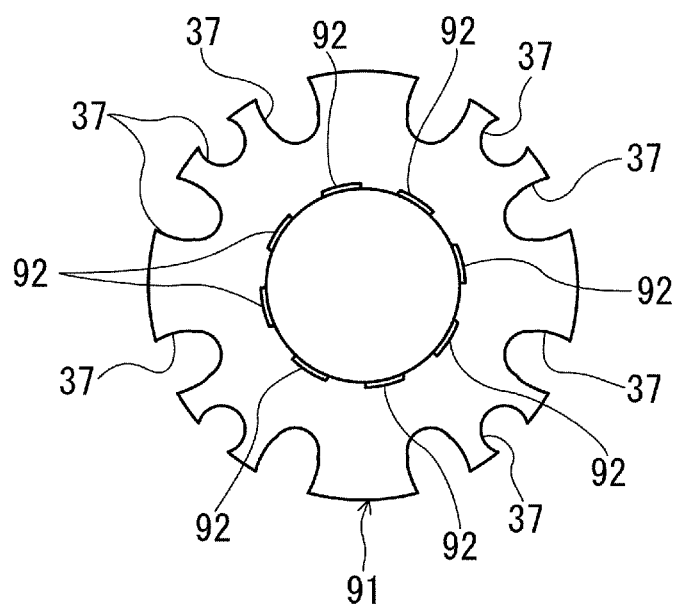

In FIG. 14, a sixth embodiment of the gasket in the present invention is depicted.

In a gasket main body 90, as depicted in FIG. 14(a), ridge parts 92 are formed on both surfaces of a core 91. These ridge parts 92 is formed by alternately folding the inner edge of the core 91 to front and rear surfaces by folding. In this case, to provide the coating part 31 to the core 91, the seal surface by the coating part 31 is formed in a flat shape, and sealability can be thereby ensured. By providing the ridge parts 92, a crush margin at the time of flange connection is restricted, and breakage of the coating part 31 and uneven clamping at the time of installation can be prevented.

In FIG. 15, a seventh embodiment of the gasket in the present invention is depicted.

Figure 15A:
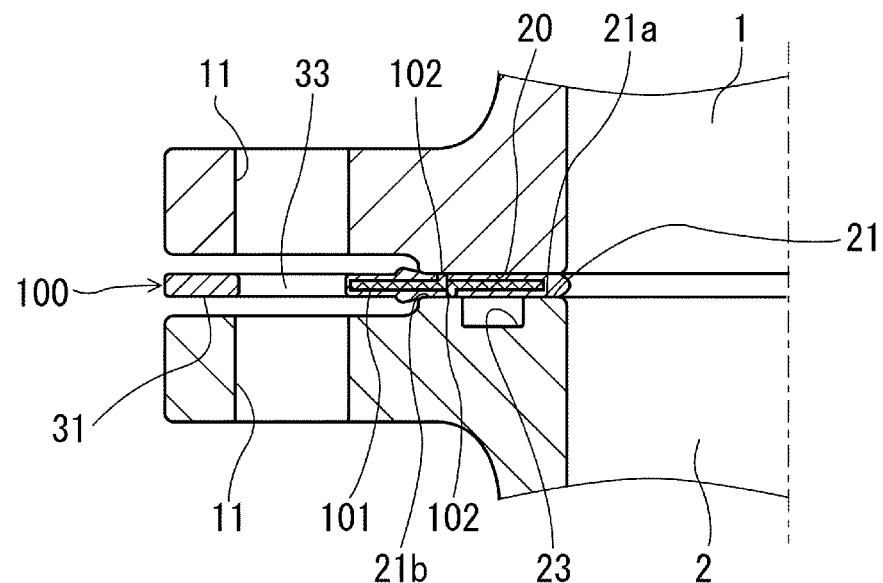
FIGS. 15(a) and 15(b) are descriptive diagrams depicting a seventh embodiment of the gasket.
Figure 15B:
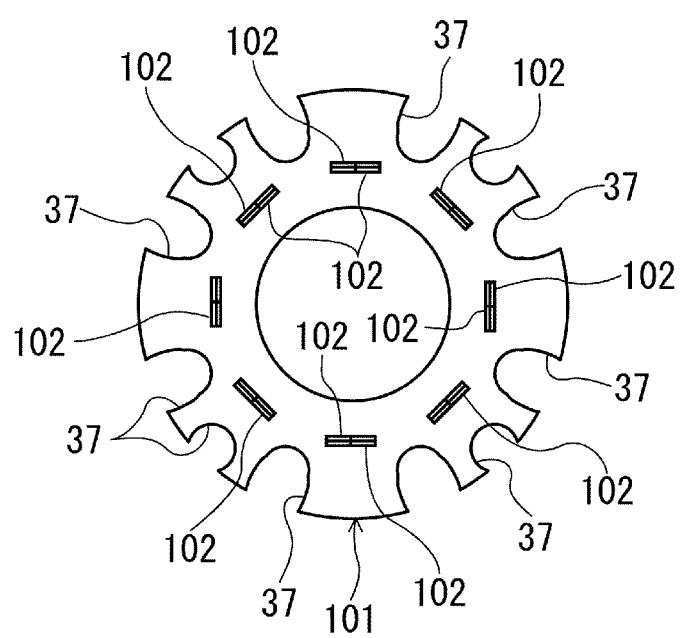

In a gasket main body 100, as depicted in FIG. 15(a), ridge parts 102 are formed on both surfaces of a core 101. These ridge parts 102 are provided by, as depicted in FIG. 15(b), forming a plurality of long-hole-shaped folding portions concentrically on the core 101 and folding each folding portion to front and rear surface sides. Also in this case, as with the gasket main body 90 of FIG. 14, the seal surface of the coating part 31 near the ridge parts 102 is formed in a flat shape, and sealability can be ensured. By the ridge parts 102, a crush margin at the time of flange connection is restricted, and breakage of the coating part 31 and uneven clamping at the time of installation can be prevented.

In FIG. 16, an eighth embodiment of the gasket in the present invention is depicted.

Figure 16A:
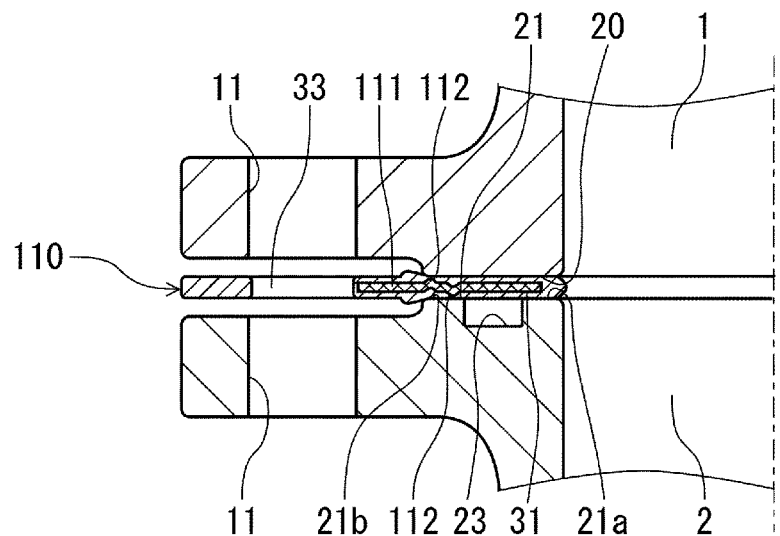
FIGS. 16(a), 16(b) and 16(c) are descriptive diagrams depicting an eighth embodiment of the gasket.
Figure 16B:
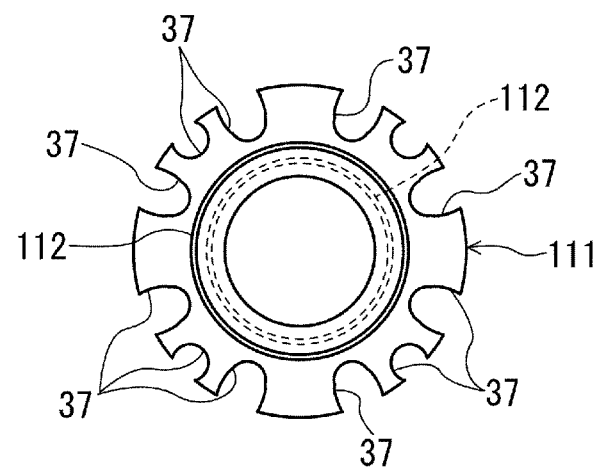
Figure 16C:
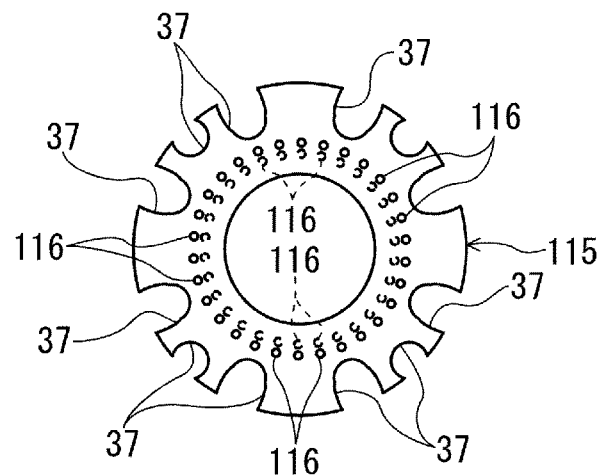

In a gasket main body 110, as depicted in FIG. 16(a), ridge parts 112 are formed on both surfaces of a core 111. These ridge parts 112 are provided by, as depicted in FIG. 16(b), performing half blanking on both surfaces of the core 111. Also in this case, as with the gasket main bodies of FIG. 14 and FIG. 15, the flat state of the coating part 31 near the ridge parts 112 is ensured, and sealability and a function of preventing uneven clamping are provided. In FIG. 16(c), a plurality of hemispherical annular protrusions 116 are formed by half blanking on both surfaces of the core 115. Also in this case, a function similar to that of FIG. 16(b) is provided.

As described above, irrespectively of the processing means and processing positions of the annular protrusions, various processing means other than these can form annular protrusions that can be pressure-contacted and sealed at any position on the flange surface.

In FIG. 17, a ninth embodiment of the gasket in the present invention is depicted.

This gasket main body 130 is a gasket supporting a 7.5 K flange. A core 131 depicted in FIG. 17(a) is provided inside the gasket main body 130 depicted in FIG. 17(b), and bolt holes 133 supporting the 7.5 K flange are provided at four locations.

Since the gasket main body 130 supports the 7.5 K flange, the diameter of the core 131 is matched with the outer diameter of this flange surface. As depicted in FIG. 17(a), the core 131 is provided with notched parts 132 corresponding to four bolts for use in the 7.5 K flange in a rotationally symmetrical manner at four locations. The width of this notched part 132 is formed larger than the outer diameter of a M16 bolt for use in the 7.5 K flange, the arc surface forming the bottom of the notched part 132 has its center identical to the center of a bolt hole 133 and is formed so as to have its diameter concentrically enlarged.

When the core 131 formed as described above is coated with the coating part 31 to configure the gasket main body 130, as depicted in FIG. 17(b) the bolt holes 133 of the gasket main body 130 are formed in a rubber lining part integrally extended from the coating part 31, and each have a shape that is not a perfect circle but are each formed, as depicted in FIG. 17(c), with the coating part on an open side of the notched part 132 placed closer to the center direction of the core 131. In this manner, the diameter of the bolt hole 133 formed in the rubber lining part can be easily increased to substantially the width of the notched part 132. Also, as depicted in FIG. 17(b), the notched part 132 is formed by opening the outer peripheral side of the core 131, and therefore the core 131 does not penetrate through the extended mounting part 33 as the outer peripheral side with respect to the bolt holes 133. Therefore, the bolt holes 133 can be extended more than the above-described diameter-increased amount and deformed with respect to the direction of the opening parts of the notched parts 132. Therefore, not only when the bolts for use are normal bolts but also when they are insulating bolts each with an insulating sleeve thicker than a standard screw diameter, the bolts can be easily inserted into the bolt holes 133. Furthermore, the outer diameter shape is not particularly restrictive, and the present embodiment can be applied not only to a gasket with an outer shape configuring a different extended mounting part but also to a gasket with a simple circular outer shape and so forth.

Next, an effect of providing the notched parts 132 to the core 131 and forming the bolt holes 133 of the gasket main body 130 in a rubber lining part integrally extended from the coating part 31 is described.

Figure 18:
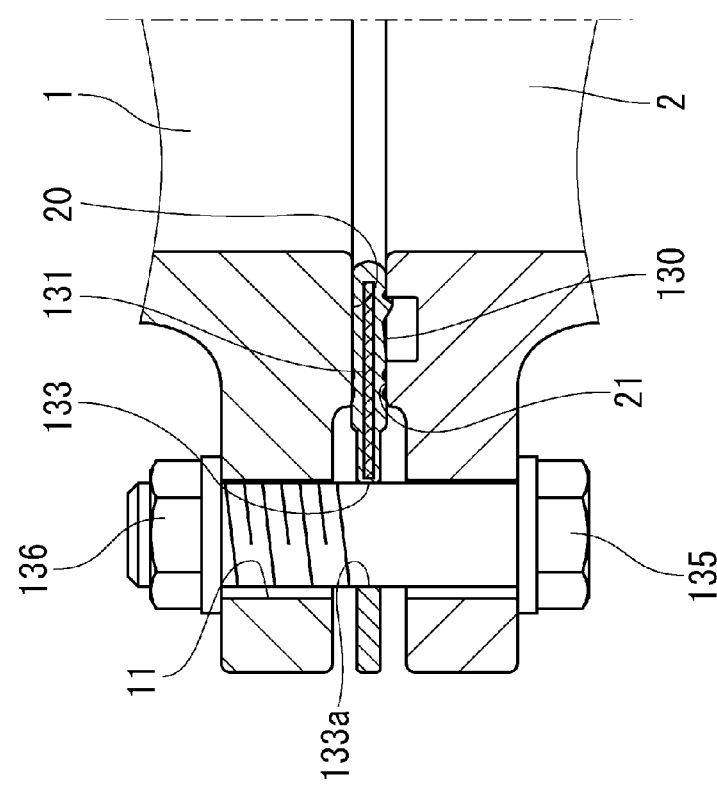
FIG. 18(a) is an enlarged sectional view of main parts depicting a state before RF-shape-GF-shape flange connection having the gasket of FIG. 17(b) attached thereto.
FIG. 18(b) is an enlarged sectional view of main parts depicting a state after flange connection of FIG. 18(a).
Figure 18:
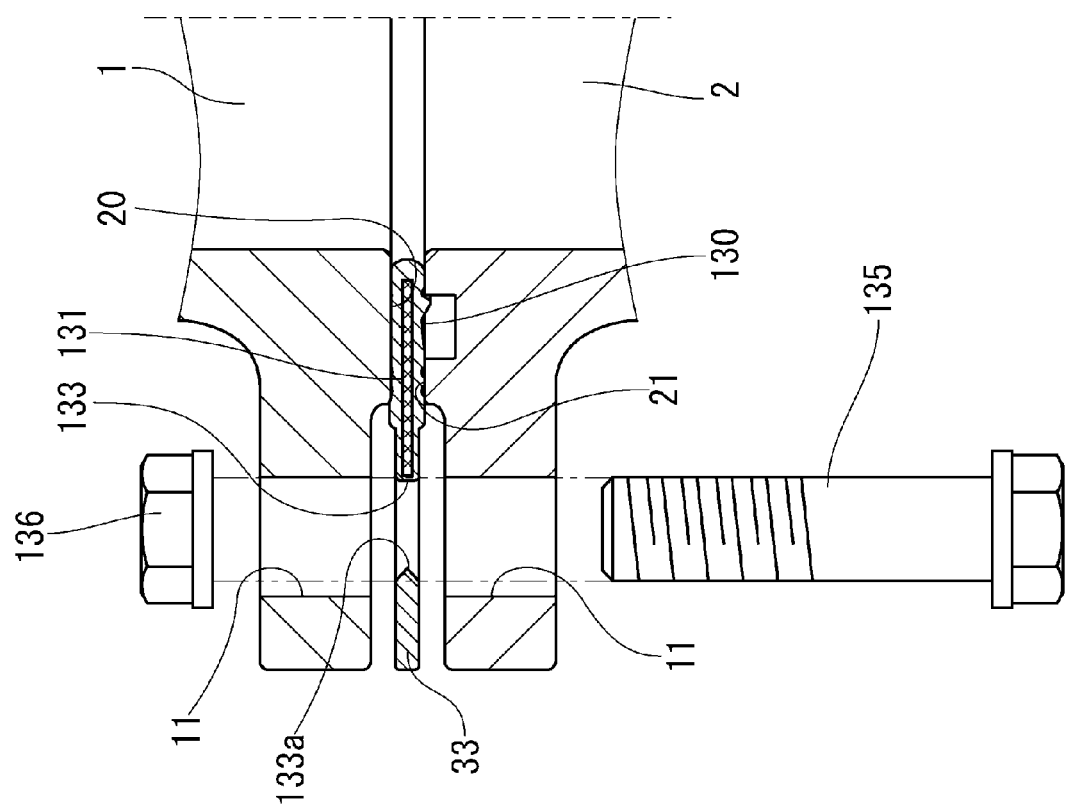

FIG. 18(a) is an enlarged sectional view of main parts depicting a state before connection of RF-shape flange 1 and the GF-shape flange 2 having the gasket main body 130 attached thereto. The bolt hole 133 of the gasket main body 130 has a shape that is not a perfect circle but is formed with the coating part on the open side of the notched part 132 placed closer to the center direction of the core 131. Therefore, an inner peripheral surface 133a of the bolt hole 133 as the open side of the notched part 132 is in a state of being placed closer to the center side of the flange with respect to the diameter of a bolt 135 indicated by a two-dot-chain line in the drawing.

FIG. 18(b) is an enlarged sectional view of main parts depicting a state after connection of an RF-shape flange 1 and a GF-shape flange 2 having the gasket main body 130 attached thereto. When the RF-shape flange 1 and the GF-shape flange 2 are connected, the gasket main body 130 is attached between an RF-shape flange surface 20 and a GF-shape flange surface 21, and the bolt 135 is inserted from below into the GF-shape flange 2, the gasket main body 130, and then the RF-shape flange 1 in this order. When the bolt 135 is inserted into the bolt hole 133 of the gasket main body 130, as described above, the inner peripheral surface 133a of the bolt hole 133 as the open side of the notched part 132 is aligned to the center side of the flange with respect to the diameter of the bolt 135. Therefore, when the bolt 135 is inserted, the extended mounting part 33 is required to be stretched out to the outer peripheral side of the gasket main body 130 to increase the diameter, thereby causing the bolt 135 to be inserted. As a result, the stretched extended mounting part 33 generates, as depicted in FIG. 17(c) a pressing force PF for pressing the bolt 135 to the center direction of the flange by contractive force of rubber. With this, the bolt 135 is positionally fixed as being pressed onto a wall surface of the bolt hole 11 in the center direction of the flange. Also, on the inner peripheral side of the bolt hole 123 of the gasket main body 120, the core 131 is provided, unlike on the outer peripheral side. Therefore, the pressing force acting on the gasket main body 130 from the stretched extended mounting part 33 via the bolt 135 presses the gasket main body 130 to the center direction of the flange.

This phenomenon occurs every time the bolt 135 is inserted into the GF-shape flange 2, the gasket main body 130, and the RF-shape flange 1. Therefore, when insertion of the bolts 135 into all bolt holes 11 of the flanges 1 and 2 is completed, the positions of all of the bolts 135 are fixed, as being each pressed onto the wall surface of the bolt hole 11 in the flange center direction, and forces pressing the gasket main body 130 to the flange center direction are balanced to make the center of the gasket main body 130 and the center of the flanges matched. Thus, after all of the bolts are inserted into the RF-shape flange 1, the gasket main body 130, and the GF-shape flange 2, works such as centering for these are not required. Only simply by fastening nuts 136 to the bolts 135, the gasket main body 130, the RF-shape flange 1, and the GF-shape flange 2 are connected as being center-adjusted, and a connection state depicted in FIG. 18(b) can be achieved.

Also, as described above, when the bolts 135 are inserted into the bolt holes 11 of the flanges 1 and 2, the stretched extended mounting part 33 generates a pressing force pressing the bolts 135 to the flange center direction, and fixes the bolts 135 as being each pressed onto the wall surface of the bolt hole 11 in the flange center direction. Therefore, the bolts 135 do not fall even before the nuts 136 are fastened, the bolts 135 do not fall, and workability is improved.

In FIG. 19(a), a tenth embodiment of the gasket having a nominal diameter of 75 in the present invention is depicted.

A difference between the gasket main body 140 of the present drawing and the gasket main body 120 of FIG. 13 is that while the indicating parts are provided to the lug parts 50 and the tab parts 121 of the gasket main body 120, a recessed slit parts are provided to the lug parts 50 and the tab parts 121 of the gasket main body 140. Other portions are exactly identical and, therefore, described in the following is the difference, that is, the recessed slit parts provided to the lug parts 50 and the tab parts 121 of the gasket main body 140.

As depicted in FIG. 19(a), the extended mounting part 33 has an outer edge indicating a flange diameter for the use pressure of 1.0 MPa, and a recessed slit part 141 provided at a boundary between the lug parts 50 and the extended mounting part 33 matches the flange surface for the use pressure of 1.0 MPa. A portion with its diameter increased by one step more than the extended mounting part 33 in the lug part 50 is provided with a recessed slit part 142 indicating a flange diameter for the use pressure of 1.6 MPa, and this recessed slit part 142 matches the flange surface for the use pressure of 1.6 MPa. On a diameter-increased side with respect to the recessed slit part 142 of the tab part 121, a recessed slit part 143 indicating a flange diameter for the use pressure of 0.75 MPa is provided, and this recessed slit part 143 matches the flange diameter for the use pressure of 0.75 MPa.

Figure 20A:
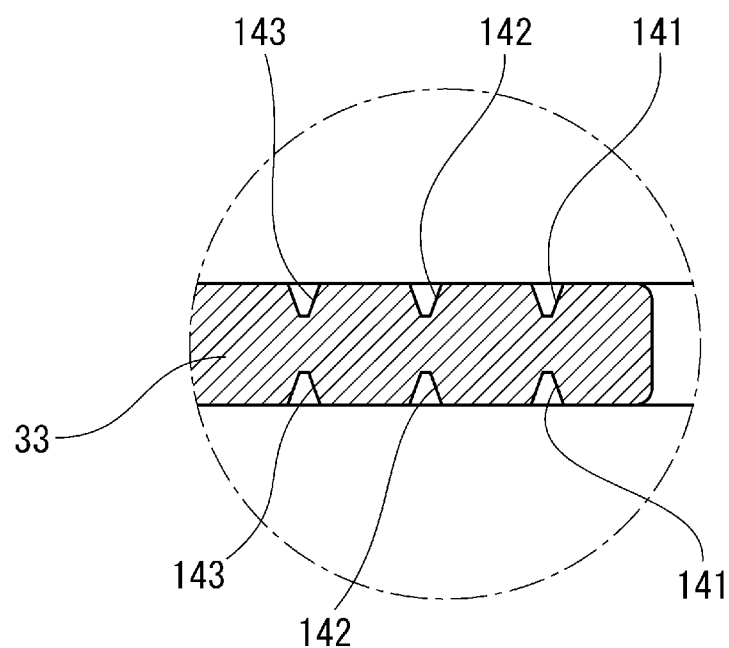
FIG. 20(a) is an enlarged sectional view of a C portion of FIG. 19(b)
Figure 20B:
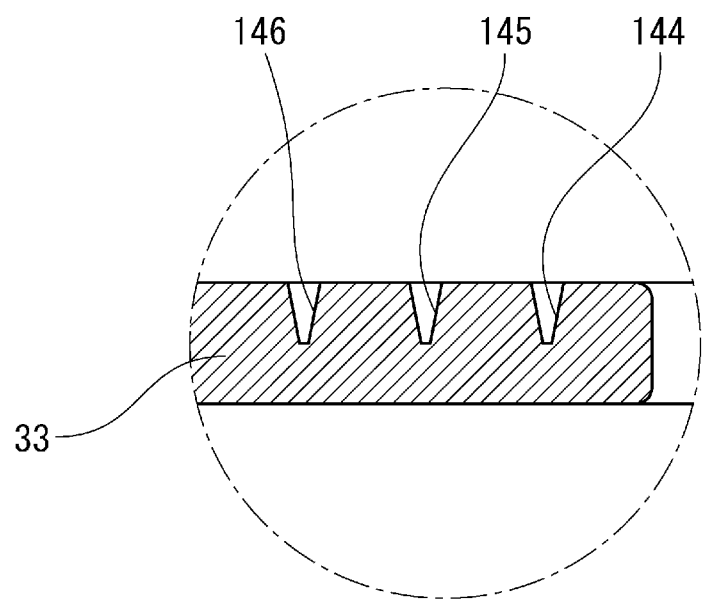
FIG. 20(b) is an enlarged sectional view depicting a state in which slit parts are provided from one side of a gasket surface.

As depicted in FIG. 19(b) and FIG. 20(a), the slit parts 141, 142, and 143 are provided to be recessed from both surface sides of the extended mounting part 33 formed of only an elastic material such as rubber, and therefore form portions thinner than the material thickness of the extended mounting part 33. With this, the lug parts 50 or the tab parts 121 positioned outside these slit parts 141 to 143 can be easily pulled and torn away by hand or the like along these slit parts 141 to 143. As depicted in FIG. 20(a), when the slit parts 141, 142, and 143 are provided on both surfaces of the gasket 140, the slit parts can be visually recognized from the gasket on either side. As depicted in FIG. 20(b), slit parts 144, 145, and 146 may be provided more deeply from one side of the gasket surface to form portions thinner than the material thickness of the extended mounting part 33.

Therefore, for example, when the flange for the use pressure of 1.0 MPa is connected by using the gasket main body 140, the lug parts 50 positioned on the outer peripheral side with respect to the slit part 141 extend off around the flange. If a heat insulator or aseismic reinforcement fixture is required to be attached to this portion around the flange where the lug parts 50 extend off, it is required to cut off and remove the extended lug parts 50 in order to prevent interference with these. Since the slit part 141 is formed in the gasket main body 140, the lug parts 50 positioned on the outer peripheral side with respect to the slit part 141 is simply pulled and torn away by hand along the slit part 141, the extended lug parts 50 can be cut off without using a tool such as scissors or a cutter. Also, when the gasket main body 140 is used for the flange for the use pressure of 1.6 MPa, the extended lug parts 50 can be cut off and removed along the slit part 142. When the gasket main body 140 is used for the flange for the use pressure of 0.75 MPa, the tab parts 121 extending off can be cut off and removed along the slit part 142.

Note that as for the slit parts, it is not necessarily required to provide three types as depicted in FIG. 19(a) so as to correspond to the flange diameter for the use pressure of 1.0 MPa, the flange diameter for the use pressure of 1.6 MPa, and the flange diameter for the use pressure of 0.75 MPa. Only with the slit part 141 provided in accordance with the flange having the smallest flange diameter for the use pressure of 1.0 MPa, by cutting off the lug parts 50 from this slit part 141 after flange fastening to cut off the lug parts 50 from portions that do not interfere with the heat insulator or aseismic reinforcement fixture attached around the flange where component portions of the gasket 140 extend off for all flange diameters, there is no influence on the bolt holes 81 provided to the annular seal part 46 and the extended mounting part 33 of the gasket 140, as depicted in FIG. 1(a).

As described above, the gasket in the present invention can not only be used in a shared manner even for flanges of different types and sizes but also be attached as being centered in accordance with the flange to be connected. Therefore, the effect of facilitating the gasket attachment work is significant, and its use value is high.

Figure 21:
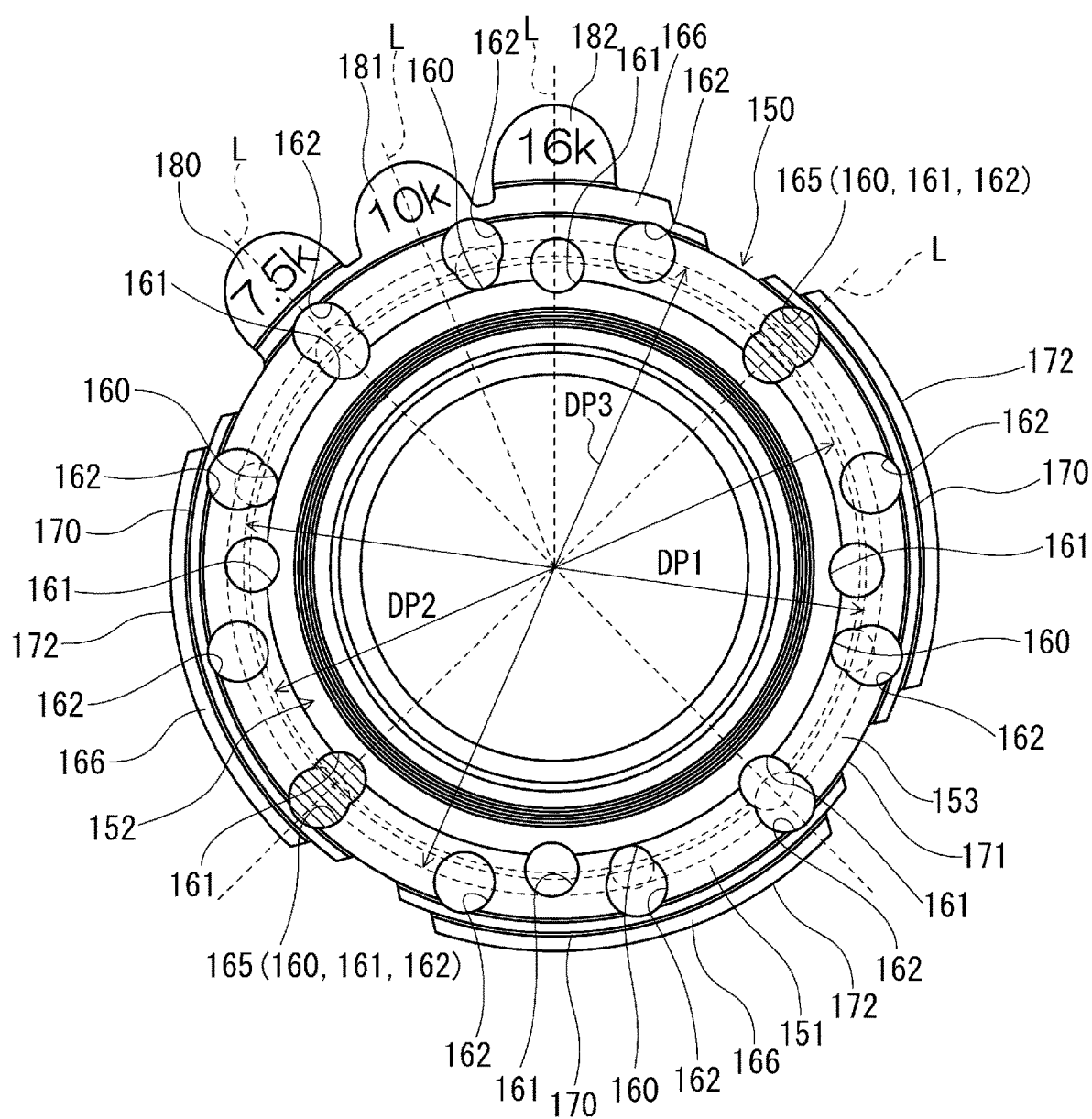
FIG. 21 is a plan view depicting an eleventh embodiment of the gasket.

In FIG. 21, an eleventh embodiment of the gasket of the present invention is depicted.

A gasket main body 150 in the present embodiment in the case of a nominal diameter of plumbing of 150 is described, and the flange of this plumbing is based on dimensions conforming to Japan Water Works Association, JWWA, G 114:2015, Ductile Deformed Pipe for Water Works, Table A. 23, Table A. 24, and Table A. 25.

The gasket main body 150 is coated with a coating part 151 made of an elastic material such as rubber from a core not depicted, and is formed in a substantially annular shape. The core may be omitted and, in that case, the gasket main body 150 is integrally molded of an elastic material.

Both surfaces of the coating part 151 of the gasket main body 150 are each provided with an annular seal surface 152. This annular seal surface 152 is provided in a shape so as to be able to make contact with flange surfaces 20, 21, and 22 of different modes, such as an RF flange surface and an FF flange surface. With this annular seal surface 152 being sealed, the gasket main body 150 is mounted.

On the outer peripheral side of the annular seal surface 152, an extended mounting part 153 for mounting on the flange surface is integrally provided. The extended mounting part 153 is configured of a plurality of different diameters in accordance with flange surfaces with a plurality of use pressures and, in the present embodiment, is formed as being extended in accordance with the outer diameter of the entire surface of the flange part 5 of an RF shape or FF shape. The extended mounting part 153 is provided to have a diameter larger than at least that of pitch circle of bolt holes 160 to 162 described below. Via this extended mounting part 153, the gasket main body 150 is mounted with the bolts/nuts 6 between the flange surfaces, and is provided as a full-flat-shape gasket so as to be able to be used in a shared manner for flange surfaces of different modes.

The extended mounting part 153 is provided with the bolt holes 160, 161, and 162 at a plurality of locations for mounting on the flange surfaces. The bolt hole 160 to 162 are disposed at a plurality of positions with the plurality of different pitch circles DP1, DP2, and DP3 on the same center line so as to allow one gasket main body 150 to be able to support the flange surfaces 20 to 22 with the plurality of use pressures.

Figure 22:
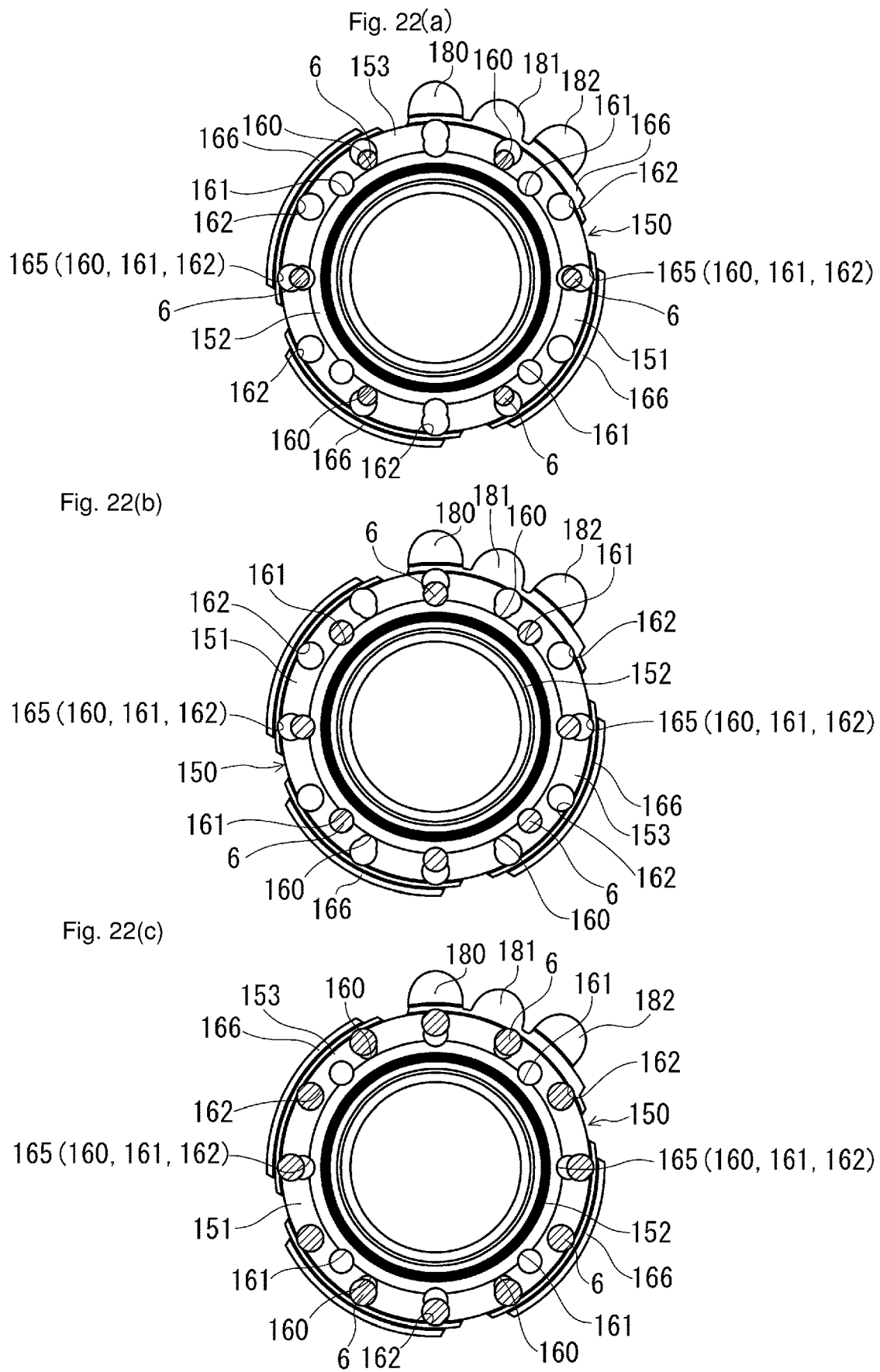
FIGS. 22(a), 22(b) and 22(c) are plan views depicting a state in which bolts are inserted into the gasket of FIG. 21.

Specifically, in FIG. 21 and FIG. 22, the bolt holes 160 are for the use pressure of 0.75 MPa (7.5 K), and are provided at six locations on the pitch circle DP1 for the bolts/nuts 6. The bolt holes 161 are for the use pressure of 1.0 MPa (10 K), and are provided at eight locations on the pitch circle DP2 for the bolts/nuts 6. The bolt holes 162 are for the use pressure of 1.6 MPa (16 K), and are provided at twelve locations on the pitch circle DP3. With this, these are provided so as to be able to be fastened and fixed with six, eight, and twelve bolts/nuts 6, respectively, FIG. 22(a) depicts a state in which the bolt/nut 6 is inserted into each of the bolt holes 160 at six locations, FIG. 22(b) depicts a state in which the bolt/nut 6 is inserted into each of the bolt holes 161 at eight locations, and FIG. 22(c) depicts a state in which the bolt/nut 6 are inserted into each of the bolt holes 162 at twelve locations.

Among the bolt holes 160, 161, and 162 on the respective pitch circles, the bolt holes 160, 161, and 162 at at least two locations are commonized as positions serving as a reference for the gasket main body 150 and are provided as bolt holes 165. With reference to these two bolt holes 165, the other bolt holes 160 to 162 are disposed at positions corresponding to flange surfaces with a plurality of use pressures. In the present example, in the state of FIG. 21, the bolt holes 165 at two locations are provided at the positions indicated by hatching on the gasket main body 150, and these positions of the bolt holes 165 at two locations are positions common to the bolt holes 160, 161, and 162 and where they are overlapped.

Furthermore, as with the above-described case, arc-shaped lug parts 166 are formed in the outer peripheral direction of the extended mounting part 153. On the surface of the extended mounting part 153 including the lug part 166, flange outer diameter indicating part 170, 171, and 172 are provided. These flange outer diameter indicating parts 170 to 172 are provided at positions indicating the positions of outer diameters in accordance with the use pressures of the flange surfaces for the plurality of use pressures.

In the present embodiment, the outer edge of the extended mounting part 153 is provided as the flange outer diameter indicating parts 170 for the use pressure of 1.0 MPa, and these flange outer diameter indicating parts 170 match the flange surface for the use pressure of 1.0 MPa. Portions with their diameter increased by one step more than the extended mounting part 153 at the lug parts 166 are provided with the flange outer diameter indicating parts 171 for a flange diameter for the use pressure of 0.75 MPa, and these flange outer diameter indicating parts 171 match the flange surface for the use pressure of 0.75 MPa. The outer edge of the lug parts 166 on the diameter-increased side with respect to the flange outer diameter indicating parts 171 is provided with the flange outer diameter indicating parts 172 for a flange diameter for the use pressure of 1.6 MPa, and these flange outer diameter indicating parts 172 match the flange surface for the use pressure of 1.6 MPa.

Near an upper portion of the gasket main body 150, three knobs 180, 181, and 182 for hanging are provided so as to be extended from the lug part 166, thereby allowing the gasket main body 150 to be positioned to the flange surface as being hung by pinching each of the knobs 180 to 182. The knobs 180 to 182 are provided on an extended line of each center line L of the gasket main body 150 and at positions where the bolt holes 165 and the bolt holes 160 to 162 are assigned to support the flange surfaces for different use pressures. That is, when the gasket main body 150 is sagged to the horizontally-piped flange surface by pinching the knobs 180 to 182, the bolt holes 160 to 162 in accordance with the respective knobs 180 to 182 match the positions of the bolt holes 11 of FIG. 5 formed in the flange surface.

Figure 23:
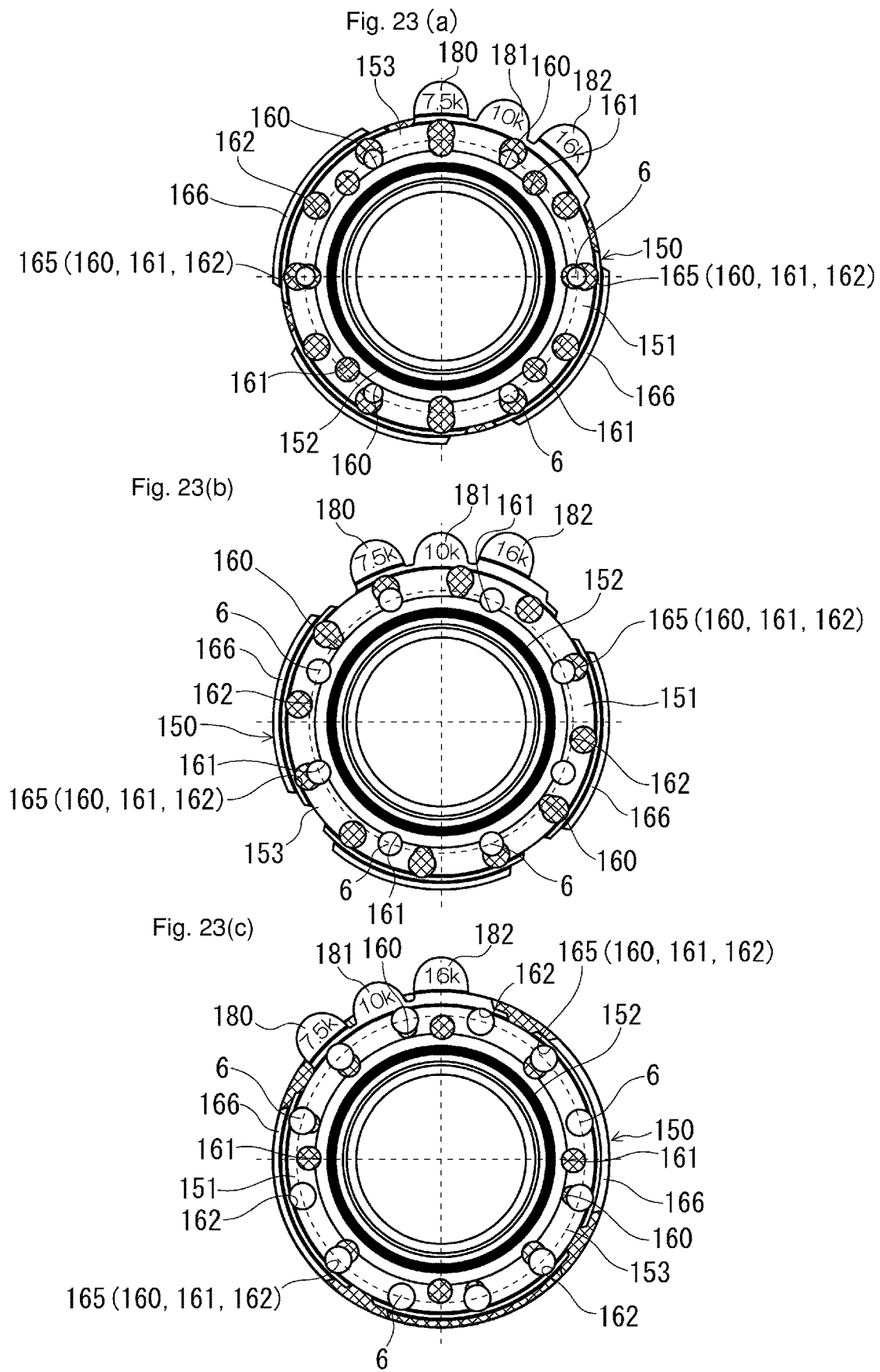
FIGS. 23(a), 23(b) and 23(c) are schematic views depicting a state in which the gasket of FIGS. 22(a)-(c) is hung.

Depicted in FIG. 22 is the arrangement of the bolt holes 165, 160, 161, and 162 corresponding to the bolt holes 11 in a flange surface of a horizontally-piped RF-type flange with a nominal diameter of 150. FIG. 22(*a*) depicts a state when the gasket main body 150 is attached to the flange surface for the use pressure of 0.75 MPa. In this case, as depicted in FIG. 23(*a*), if the knob 180 is pinched for hanging, the bolt holes 165 at two locations at positions serving as a reference among the bolt holes for the use pressure of 0.75 MPa overlap the bolt holes 11 in the flange surfaces. With the bolt holes 160 at a total of six locations on the pitch circle DP1 with reference to the bolt holes 165 fastened and fixed with the bolts/nuts 6, the gasket main body 150 is attached at a predetermined position, and two flange surfaces can be connected in a sealed state.

FIG. 22(*b*) depicts a state in which the gasket main body 150 is attached to a flange surface for the use pressure of 1.0 MPa. In this case, as depicted in FIG. 23(*b*), if the knob 181 is pinched for hanging, the bolt holes 165 at two locations at positions serving as a reference among the bolt holes for the use pressure of 1.0 MPa overlap the bolt holes 11 in the flange surfaces. With the bolt holes 161 at a total of eight locations on the pitch circle DP2 with reference to the bolt holes 165 fastened and fixed with the bolts/nuts 6, the gasket main body 150 is attached at a predetermined position, and two flange surfaces can be connected in a sealed state.

FIG. 22(*c*) depicts a state in which the gasket main body 150 is attached to a flange surface for the use pressure of 1.6 MPa. In this case, as depicted in FIG. 23(*c*), if the knob 182 is pinched for hanging, the bolt holes 165 at two locations at positions serving as a reference among the bolt holes for the use pressure of 1.6 MPa overlap the bolt holes 11 in the flange surfaces. With the bolt holes 162 at a total of twelve locations on the pitch circle DP3 with reference to the bolt holes 165 fastened and fixed with the bolts/nuts 6, the gasket main body 150 is attached at a predetermined position, and two flange surfaces can be connected in a sealed state.

As these, by matching the bolt holes 165 at two locations of the gasket main body 150 defined as a reference in advance with the bolt holes 11 of the flange surfaces 20, 21, and 22 for the respective use pressures, all of the remaining bolt holes required for fastening can be easily matched with the bolt holes 11 of the flange surface.

Figure 24:
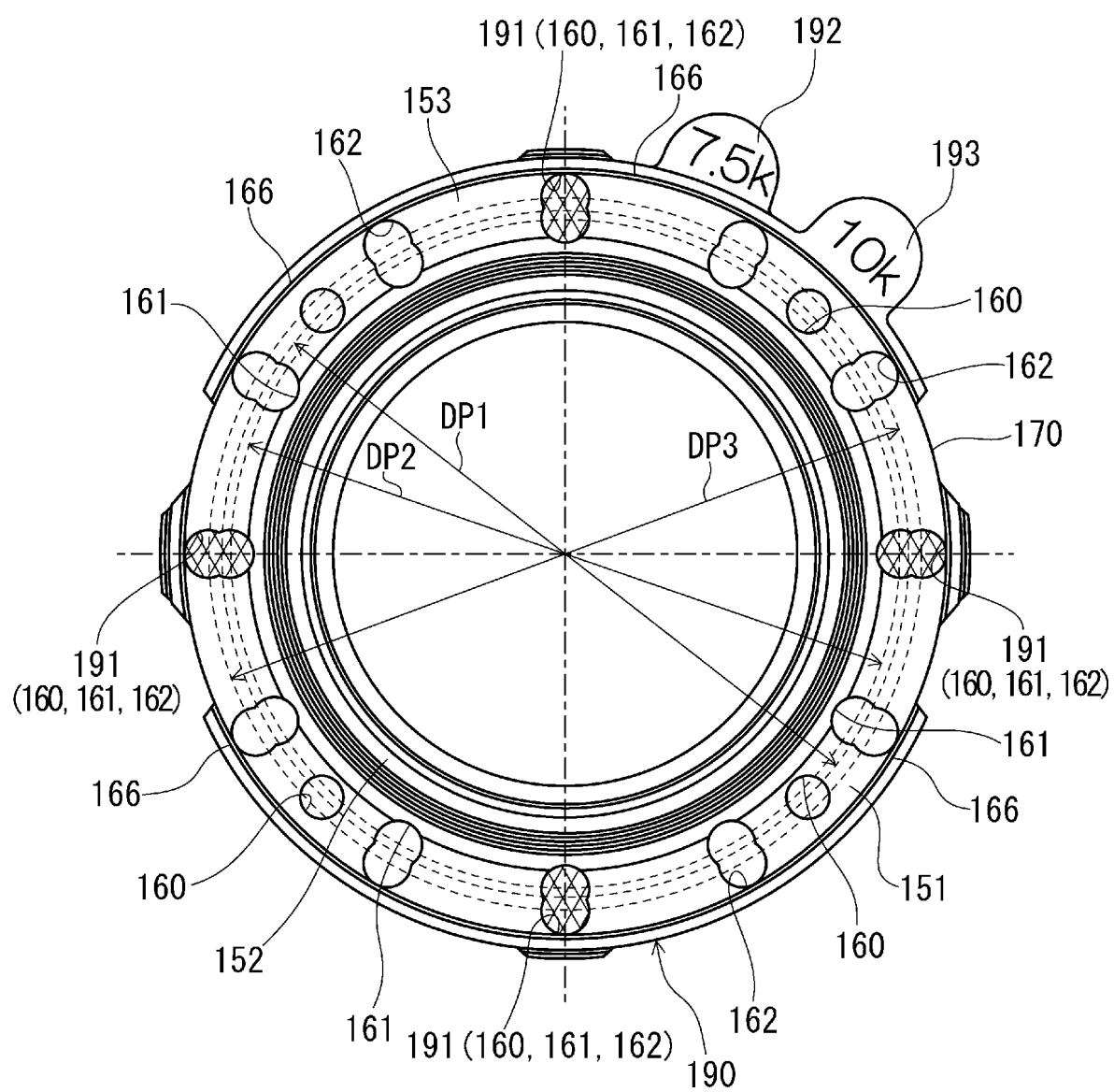
FIG. 24 is a plan view depicting a twelfth embodiment of the gasket of the present invention.

In FIG. 24, a twelfth embodiment of the gasket of the present invention is depicted.

A gasket main body 190 of this embodiment is used for flange connection of plumbing of a nominal diameter of 200. Among the bolt holes 160 to 162 provided to this gasket main body 190, bolt holes 191 at four locations indicated by cross hatching are provided at positions serving as a reference for the gasket main body 190. With reference to these bolt holes 191, the bolt holes 160 to 162 are disposed at positions corresponding to the flange surfaces for the plurality of use pressures. Also, the gasket main body 190 is provided with two knobs 192 and 193 for hanging.

Figure 25A:
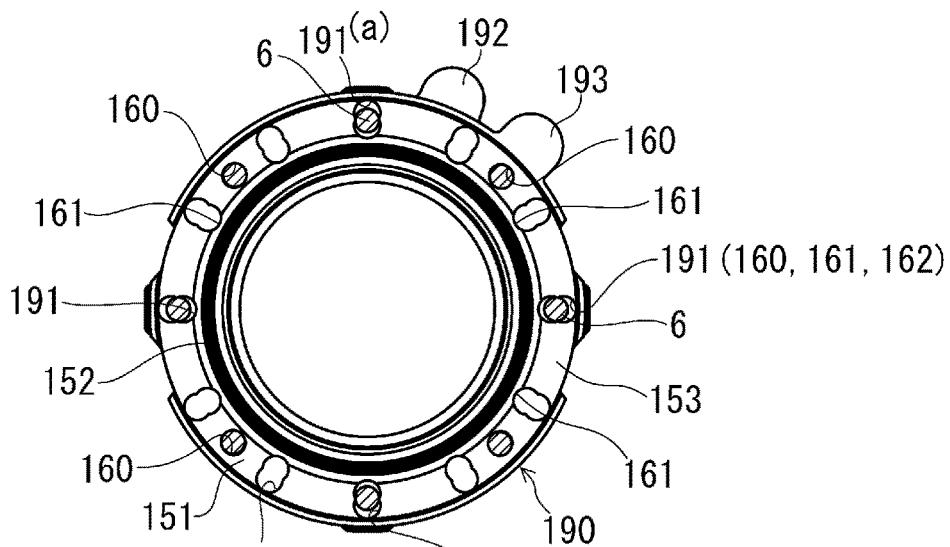
FIGS. 25(a), 25(b) and 25(c) are plan views depicting a state in which bolts are inserted into the gasket of FIG. 24.
Figure 25B:
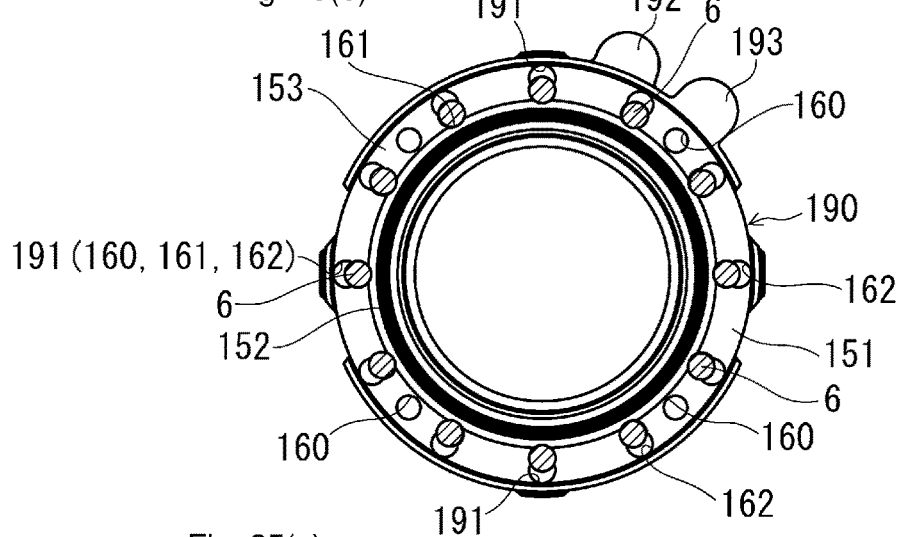
Figure 25C:
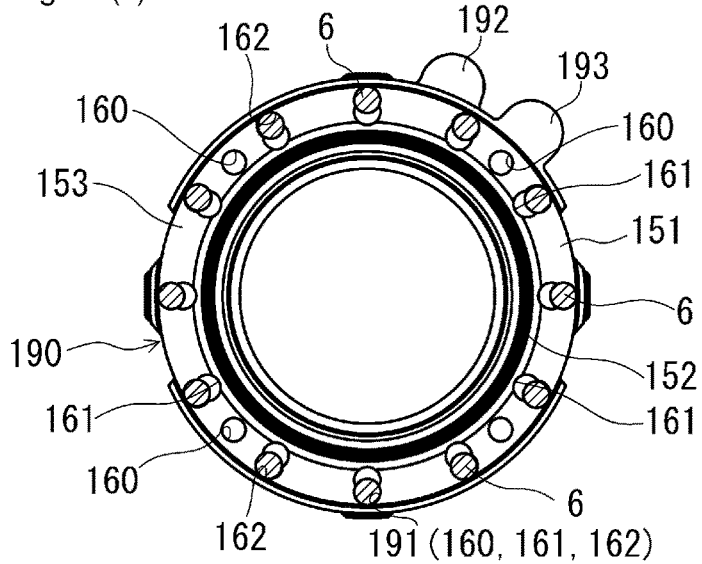

The bolt holes 160 for the use pressure of 0.75 MPa of FIG. 25(*a*) are provided at eight locations on the pitch circle DP1 for the bolts/nuts 6. The bolt holes 161 for the use pressure of 1.0 MPa of FIG. 25(*b*) are provided at twelve locations on the pitch circle DP2 for the bolts/nuts 6. The bolt holes 162 for the use pressure of 1.6 MPa of FIG. 25(*c*) are provided at twelve locations on the pitch circle DP3. In this manner, fastening and fixing are made with eight sets, twelve sets, and twelve sets of bolts/nuts 6, respectively.

Figure 26A:
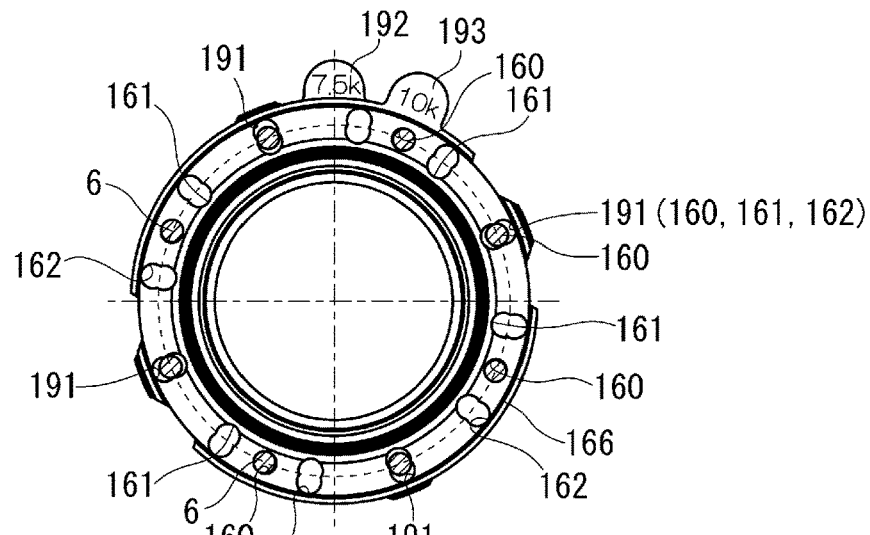
FIGS. 26(a), 26(b) and 26(c) are schematic views depicting a state in which the gasket of FIGS. 25(a)-(c) is hung.
Figure 26B:
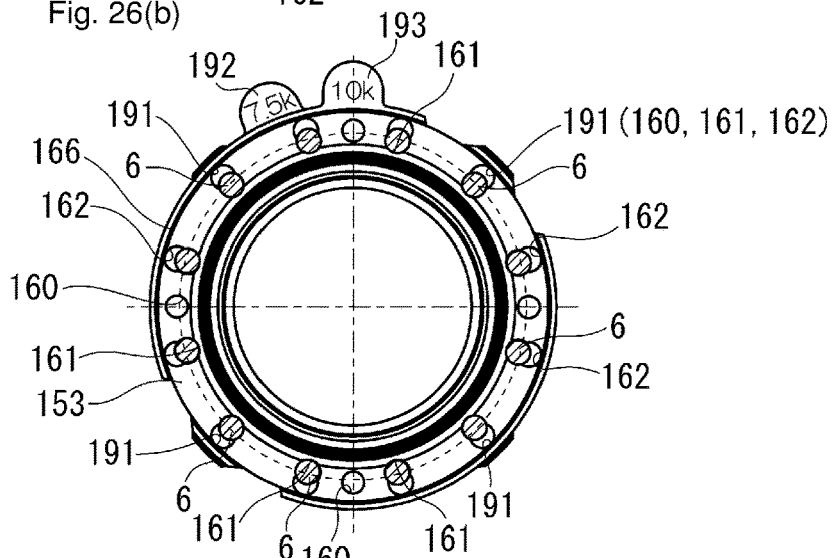
Figure 26C:
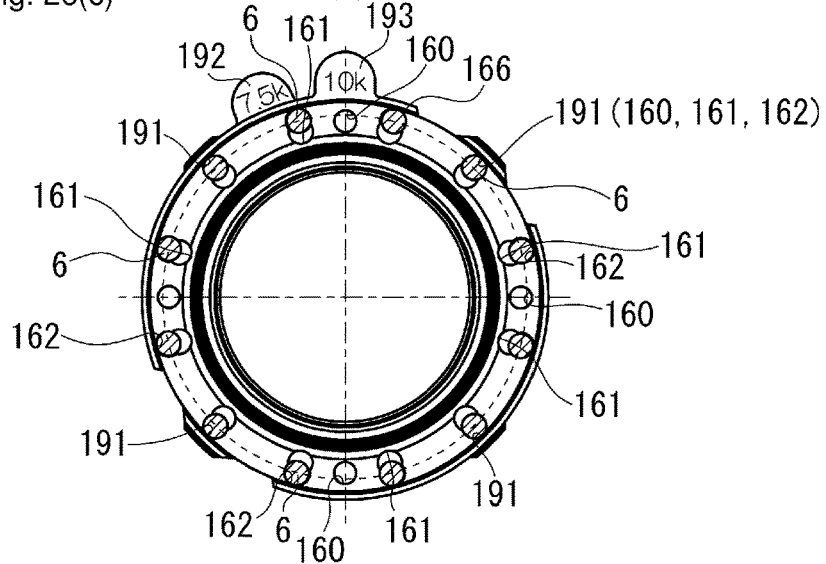

Depicted in FIG. 26 is a state in which the bolts 6 are inserted in a flange surface of a horizontally-piped RF-type flange with a nominal diameter of 200. FIG. 26(*a*) depicts a state in which the gasket main body 190 is attached to the flange surface for the use pressure of 0.75 MPa. In this case, if the knob 192 is pinched for hanging, the bolt holes 191 at four locations at positions serving as a reference among the bolt holes 160 for the use pressure of 0.75 MPa overlap the bolt holes 11 in the flange surfaces. With the bolt holes 160 at a total of eight locations on the same pitch circle DP1 with reference to the bolt holes 191 fastened and fixed with the bolts/nuts 6, two flange surfaces can be connected to each other in a state in which the gasket main body 190 is attached at a predetermined position.

FIG. 26(*b*) depicts a state in which the gasket main body 190 is attached to a flange surface for the use pressure of 1.0 MPa. In this case, if the knob 193 is pinched for hanging, the bolt holes 191 at four locations at positions serving as a reference among the bolt holes 161 for the use pressure of 1.0 MPa overlap the bolt holes 11 in the flange surfaces. With the bolt holes 161 at a total of twelve locations on the same pitch circle DP2 with reference to the bolt holes 191 fastened and fixed with the bolts/nuts 6, two flange surfaces can be connected to each other in a state in which the gasket main body 190 is attached at a predetermined position.

FIG. 26(*c*) depicts a state in which the gasket main body 190 is attached to a flange surface for the use pressure of 1.6 MPa. In this case, as with the case of the use pressure of 1.0 MPa, if the knob 193 is pinched for hanging, the bolt holes 191 at four locations at positions serving as a reference among the bolt holes 162 for the use pressure of 1.6 MPa overlap the bolt holes 11 in the flange surfaces. With the bolt holes 162 at a total of twelve locations on the same pitch circle DP3 with reference to the bolt holes 191 fastened and fixed with the bolts/nuts 6, two flange surfaces can be connected to each other in a state in which the gasket main body 190 is attached at a predetermined position.

Figure 27A:
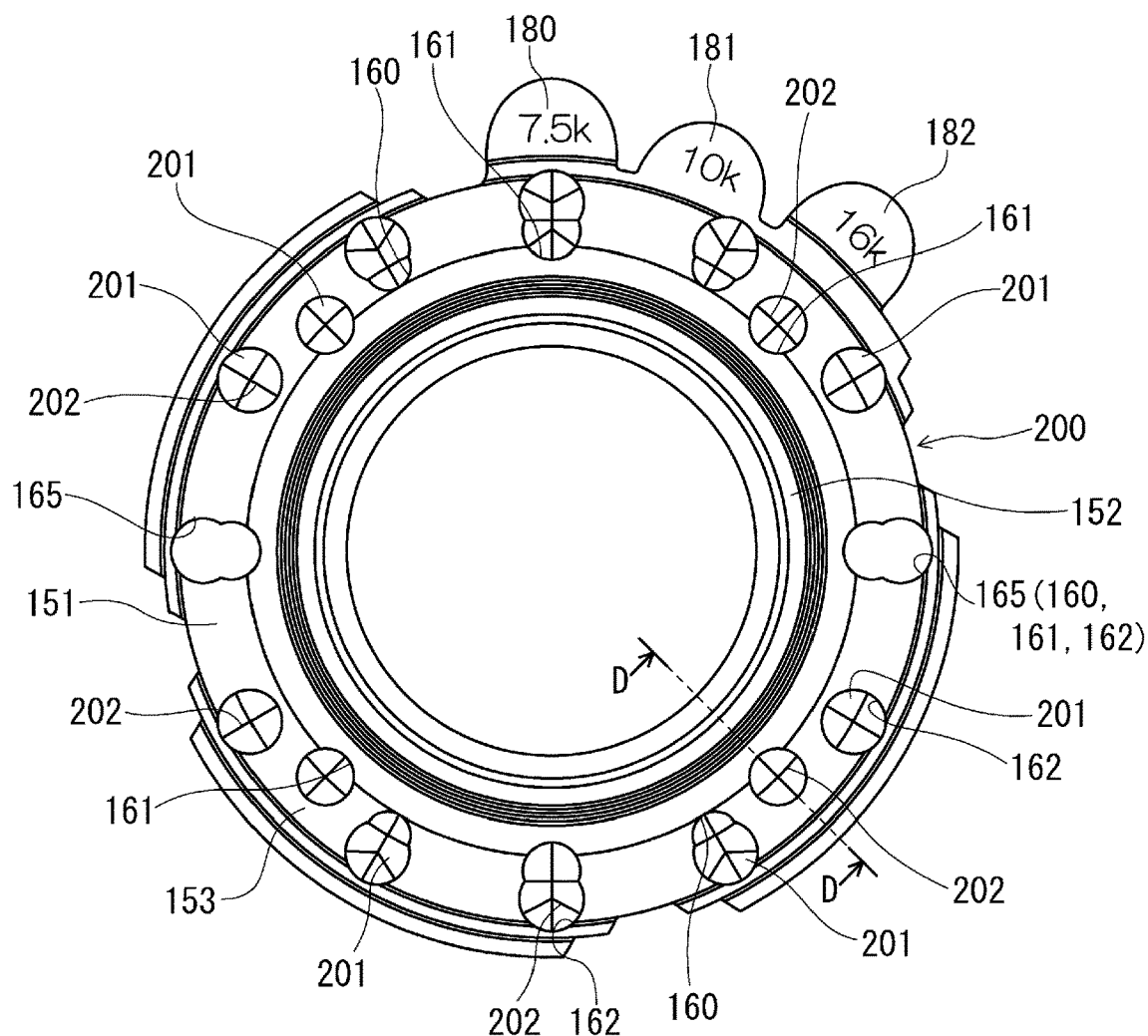

FIG. 27 depicts a thirteen embodiment of the gasket of the present invention.

In a gasket main body 200 of this embodiment, as with the gasket main body 150 of FIG. 21, bolt holes 165 serving as reference positions are provided at two locations. The bolt holes 160 to 162 other than these bolt holes 165 are shielded by a rubber-made, thin-film shieling part 201 integral with the coating part 151, and slit parts 202 for bolt insertion are formed in these shieling part 201. This allows insertion of bolts 6 into the shielding parts 201 after installation of the gasket main body 200. The shielding parts 201 can be provided simultaneously with formation of the coating part 151.

The slit parts 202 are formed with the number of slits, slit positions, and so forth allowing insertion of the bolts/nuts 6 arranged in predetermined holes in accordance with the use pressure into the respective bolt holes in a centered state.

That is, when bolt holes for a plurality of use pressures overlap into one, for the bolts/nuts 6 for the respective use pressures with different fastening positions, the slit parts 202 capable of guiding the respective bolts/nuts 6 to predetermined fastening positions as being centered is formed in one bolt hole.

On the other hand, the reference bolt holes 165 are not provided with the shielding part 201, and therefore can be easily distinguished from the bolt holes 160 to 162 when the shielding part is provided.

From these, when the gasket main body 200 is matched with the flange surface, irrespectively of the difference in nominal pressure, the bolt holes 165 at the reference positions can be matched with the bolt holes 11 in the flange surfaces as being easily visually recognized and, in this state, the gasket main body 200 can be accurately fixed between these flange surfaces with the bolts/nuts 6.

The shielding part 201 may be thickened to increase the strength, or the shapes of the slit parts 202 may be adjusted. When the slit part 202 is provided, in particular, for example, at the time of vertical piping in which the bolts 6 tend to fall, the bolt 6 inserted in the bolt hole from below the flange surface is interposed in this slip part 202 to retain that position, thereby providing a function of preventing the bolt 6 from falling.

In this case, the bolt 6 is inserted into the bolt holes 11 in the flange surfaces as being guided to the center of the bolt holes in accordance with the plurality of use pressures via the slit part 202. In this manner, the plurality of bolts 6 as concentrically arranged with respect to the centers of the flange surfaces 11 are inserted into the respective bolt holes 11. This makes the gasket main body 200 positioned to the flange surfaces so that the centers of the respective bolt holes follow the centers of the respective bolts 6.

As a result, the center of the gasket main body 200 can be adjusted via the respective bolt holes with the bolts 6 arrayed concentrically with the centers of the flange surfaces, and can be mounted as being centered at the centers of the flange surfaces. This centering function can be provided also for any of the general RF flange surface and the FF flange surface.

Furthermore, also at the time of horizontal piping, the gasket main body 200 can be attached as being centered by the above-described function. In this case, the gasket main body 200 can be prevented from being positionally shifted to a lower direction due to gravity.

When the shielding part 201 is provided with the slit part 202, the slit parts 202 are provided in the shielding part 201, in accordance with the shapes of the bolt holes used singly or in a shared manner depending on the difference in use pressure, the number of slit parts 202 is preferably increased or the positions where the slip parts 202 are formed are preferably changed. In this case, weakening resistance when the bolts 6 are inserted eliminates a fear of inhibition of insertion of the bolts 6. On the other hand, also by decreasing the number of slit parts 202, the resistance at the time of insertion of the bolts 6 can be strengthened. With this, the bolts 6 can be retained, and the falling prevention function can be enhanced. In either case, it is preferable to clarify the difference from the bolt holes 165 without the shielding part 201 provided and enhance viewability.

Figure 27B:
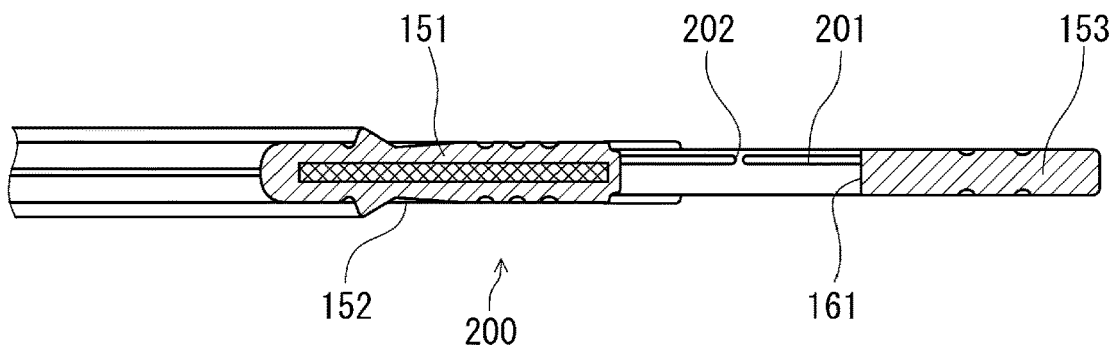

While the shielding part 201 is provided on an insertion side (upper side in the drawing) of the bolt holes 160 to 162 in FIG. 27(b), this shielding part 201 may be molded as being placed closer to the centers of the bolt holes 160 to 162 (not depicted). In this case, the shielding part 201 is at a position symmetrical with respect to the front and rear surfaces of the gasket main body 200, and the worker is not required to check the attaching direction of the gasket main body 200 for attachment to the flange surfaces.

Figure 28:
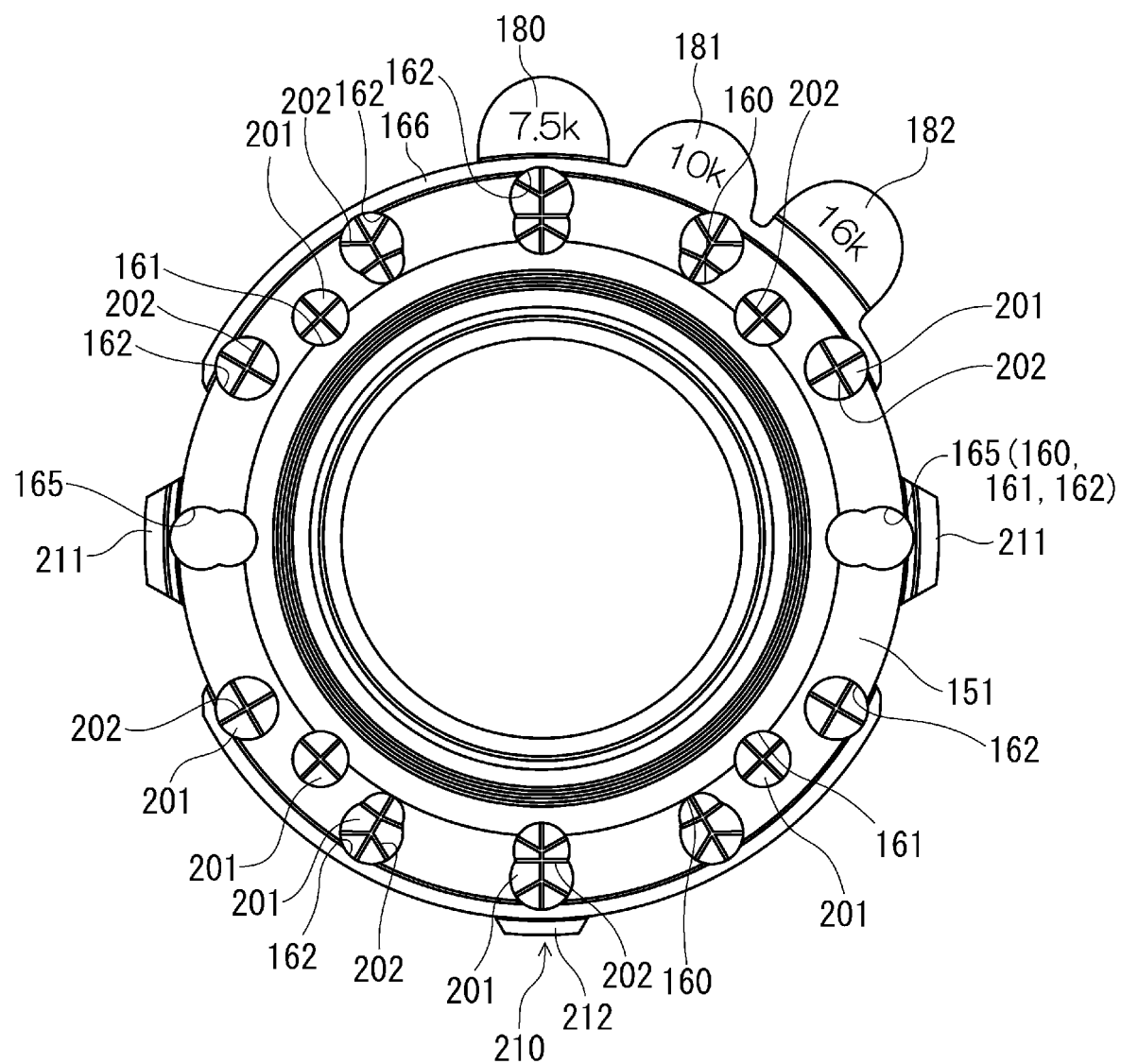
FIG. 28 is a plan view depicting a fourteenth embodiment of the gasket.

In FIG. 28, a fourteenth embodiment of the gasket of the present invention is depicted.

In a gasket main body 210 of this embodiment, the bolt holes 165 as a reference are provided at two locations, and knobs 211 also having a function of a lug part are provided at positions matching the outer diameter for the use pressure of 1.6 MPa (16 K) on the outer peripheral side of these bolt holes 165. At the time of use to vertical plumbing, positioning is performed by holding these knobs 211, and making a mistake about the positions of the reference bolt holes 165 can thus be prevented.

Furthermore, at the lowermost position in the drawing, a lug part 212 having an arc-shaped outer edge substantially identical to the outer diameter for the use pressure of 16 K is formed to protrude. At the time of attachment of the gasket main body 210, in addition to the above-described two knobs 211, 211, this lug part 212 is positioned to the outer diameter for 16 K. With positioning at these three locations on the circumference, the gasket main body 210 can be attached as being accurately centered.

On the outermost peripheral side of the gasket main body 210, the lug part 166 for the use pressure of 0.75 MPa (7.5 K) is formed over a wide range. In this manner, by increasing the lug part 166 in the range of the outer diameter portion for 7.5 K most frequently used, positioning of the gasket main body 210 for the use pressure of 7.5 K can be easily performed.

FIG. 29 is a plan view depicting a fifteenth embodiment of the gasket of the present invention.

Figure 29A:
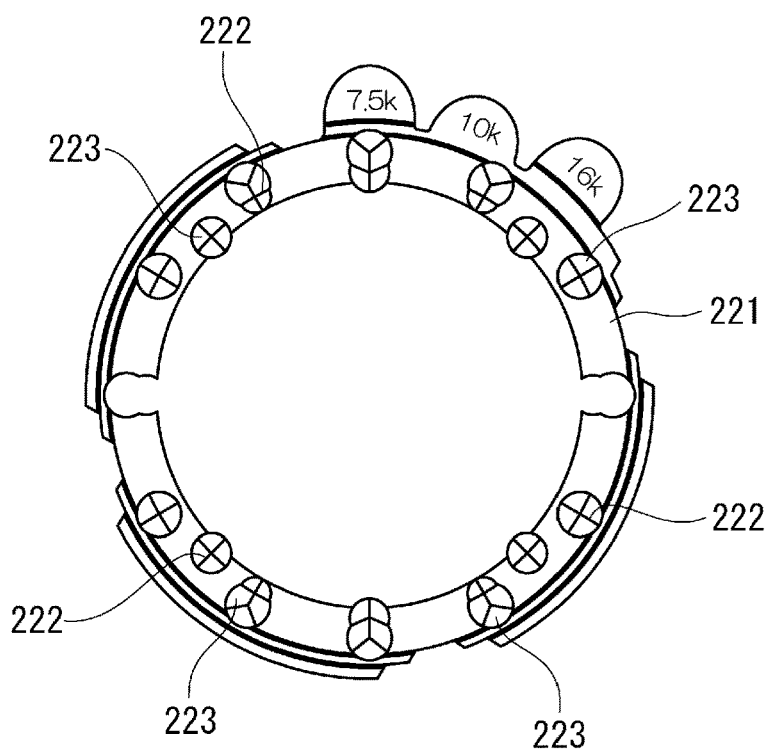
FIGS. 29(a) and 29(b) are plan views depicting a fifteenth embodiment of the gasket.
Figure 29B:
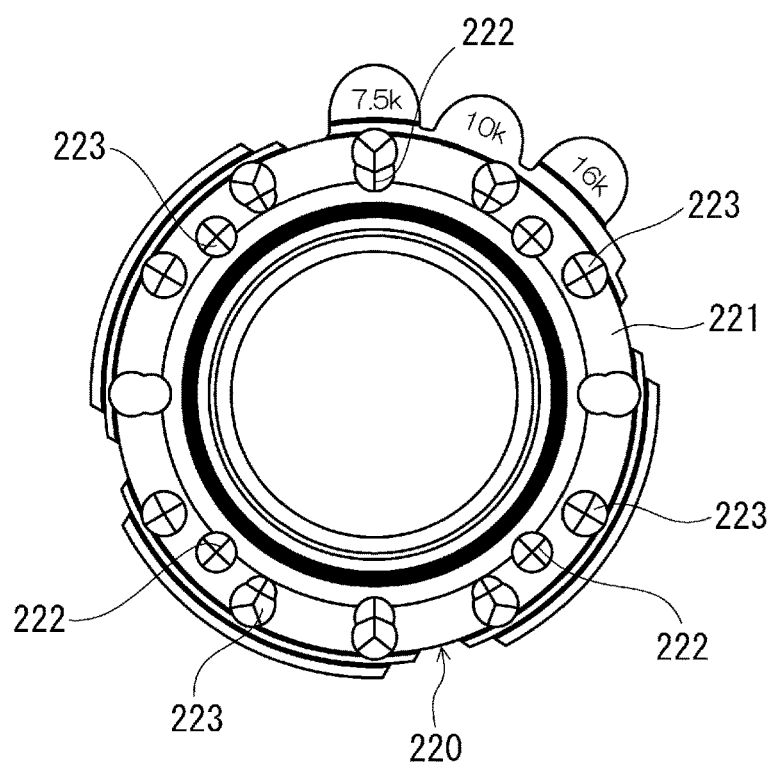

In a gasket main body 220 of this embodiment, a seal member 221 for blocking which blocks the bolt holes 160 to 162 other than the bolt holes 165 as reference positions is affixably provided. In this seal member 221, slit parts 222 for bolt insertion are formed. FIG. 29(a) depicts the seal member 221, and FIG. 29(b) depicts the gasket main body 220 having the seal member 221 affixed thereto.

In the seal member 221, a shielding part 223 is provided at the positions of the bolt holes 160 to 162 other than the bolt holes 165 at reference positions. In this shielding part 223, slit parts 222 in a shape similar to that of the gasket main body 200 of FIG. 27 are provided. With this, after the seal member 221 is affixed to the gasket main body 220 in a predetermined orientation, the bolts 6 can be inserted from the shielding part 223 via the slit parts 222.

Figure 30A:
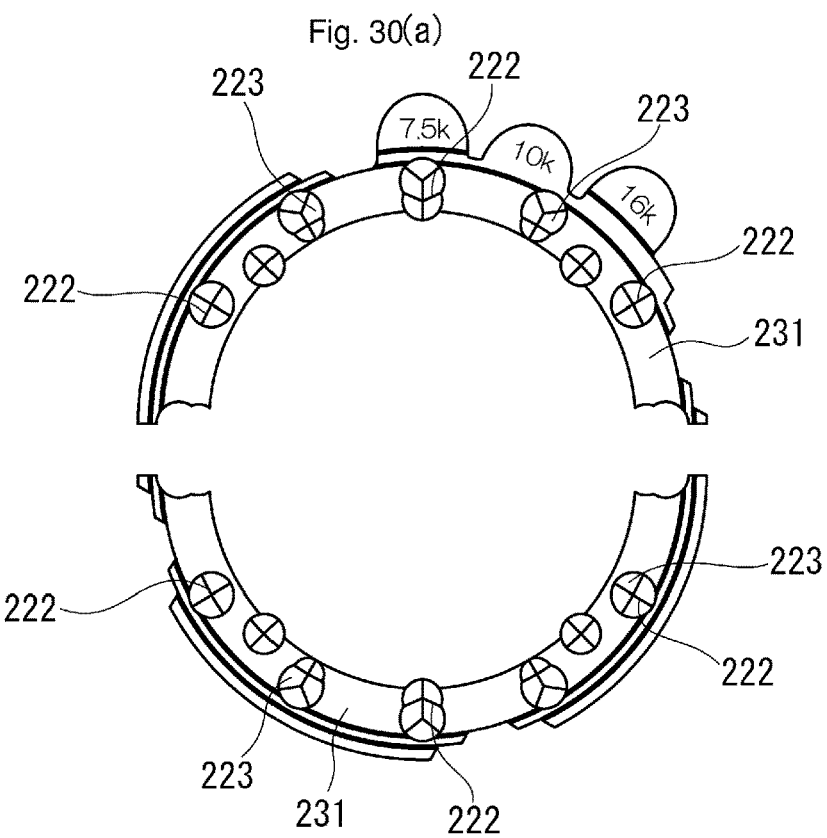
FIGS. 30(a) and 30(b) are plan views depicting a sixteenth embodiment of the gasket.
Figure 30:
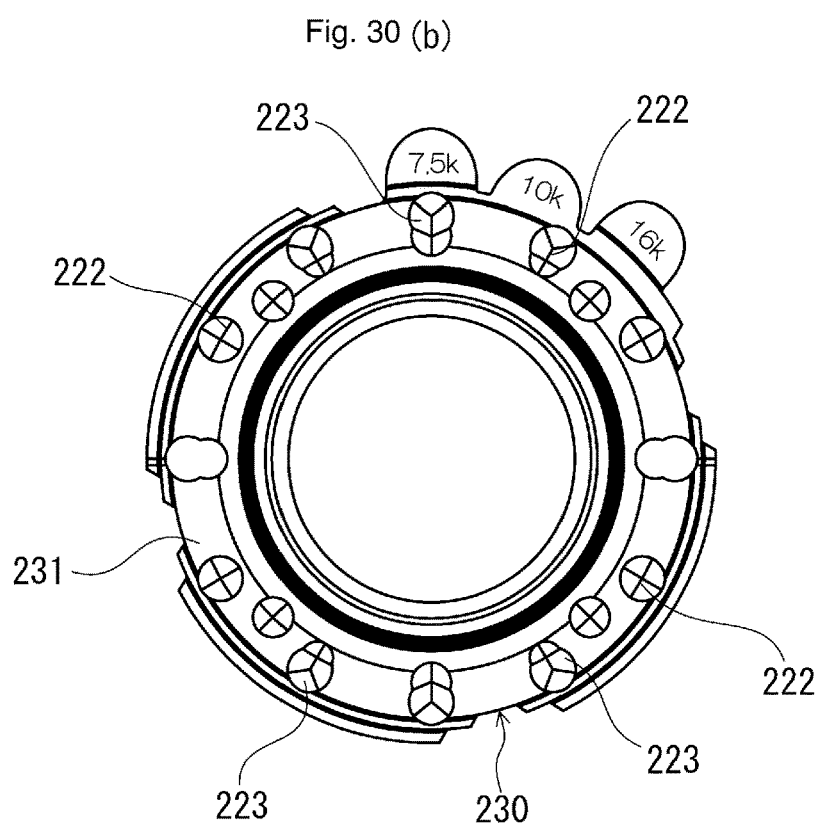

Furthermore, as depicted in a sixteenth embodiment of the gasket of the present invention depicted in FIG. 30, a seal member 231 affixable to a gasket main body 230 may be divided into two at the positions of the reference bolt holes 165. In this case, the arrangement at the time of printing to the divided seal member 231 can be easily organized, and a unwanted mortised portion on the inner peripheral side can be omitted compared with the case in which an annular seal member is provided. Thus, while a portion of a seal material as a material to be discarded is decreased to improve yields, the number of seal members 231 that can be taken from a certain seal member can be increased. Affixing to the gasket main body 230 becomes easy, and wrinkles become less likely to occur.

When the above-described seal members 221 and 231 are used, to enhance the affixing power, the surface of each of the gasket main bodies 220 and 230 is desirably coated with clear resin. Also, adhesion properties of the seal members 221 and 231 after affixing and at the time of long-term storage are maintained, and the adhesion power is required to be capable of preventing peeling off due to degradation in adhesion properties or a decrease in adhesion properties due to deterioration with time.

Figure 31A:
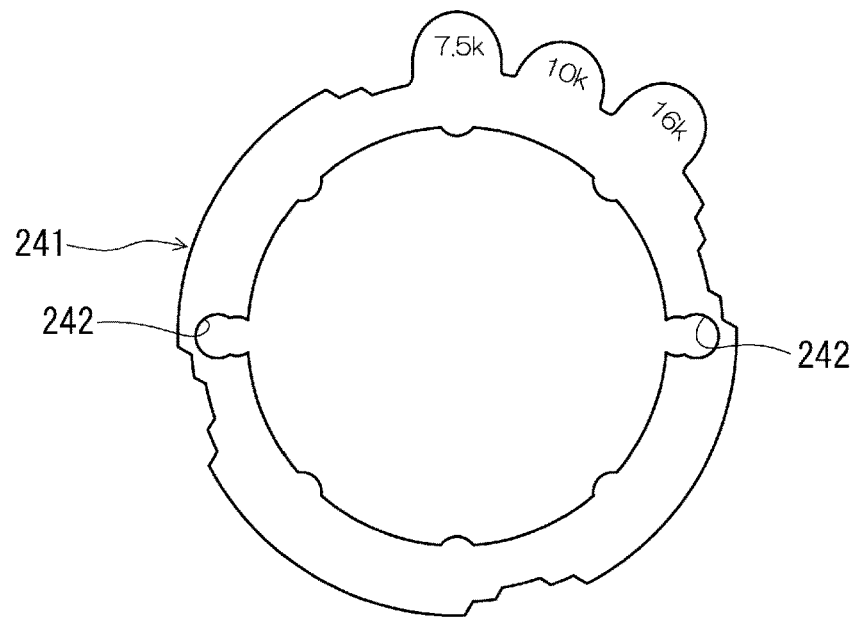
FIGS. 31(a) and 31(b) are plan views depicting a seventeenth embodiment of the gasket.
Figure 31B:
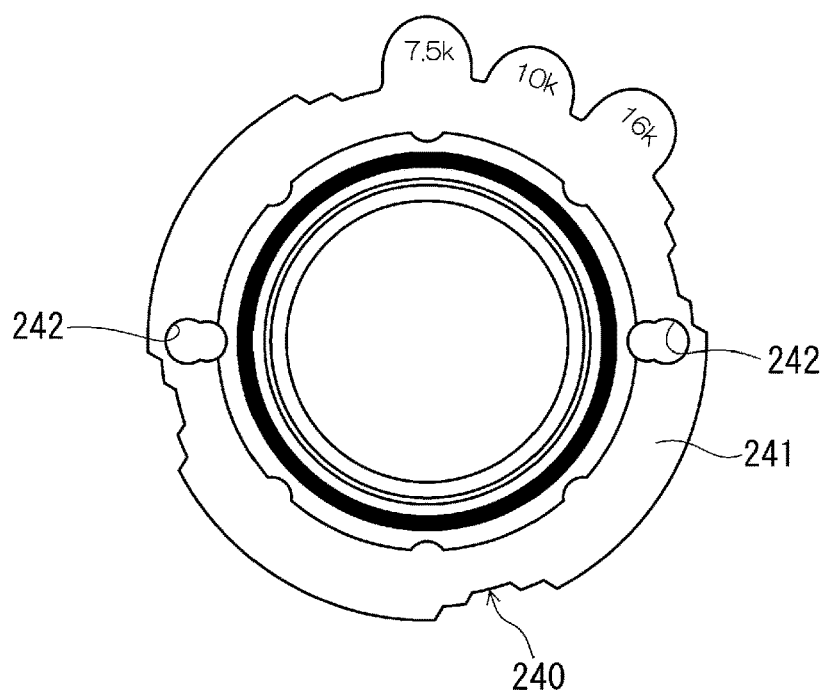

In FIG. 31, a seventeenth embodiment of the gasket of the present invention is depicted.

In a gasket main body 240 of this embodiment, a seal member 241 depicted in FIG. 31(a) is affixably provided. The seal member 241 is provided with notched portions 242 at the positions of the bolt holes 165 at the reference positions, and is provided peelable from the gasket main body 240, with a portion where the bolt holes 160 to 162 other than the bolt holes 165 shielded. With this, after affixing of the seal member 214, at the time of using the gasket main body 240, the notched portions 242 are matched with the bolt holes 165 at the reference positions, the bolts 6 can be inserted with accurate matching with the flange surfaces. Then, when the seal member 241 is peeled off, the bolts 6 can be inserted also in the bolt holes 160 to 162 other than the bolt holes 165 at the reference positions. It is only required that, as with the above-described case, the shape of the notched part 242 is such that the bolt holes 165 at the reference positions open.

Figure 32A:
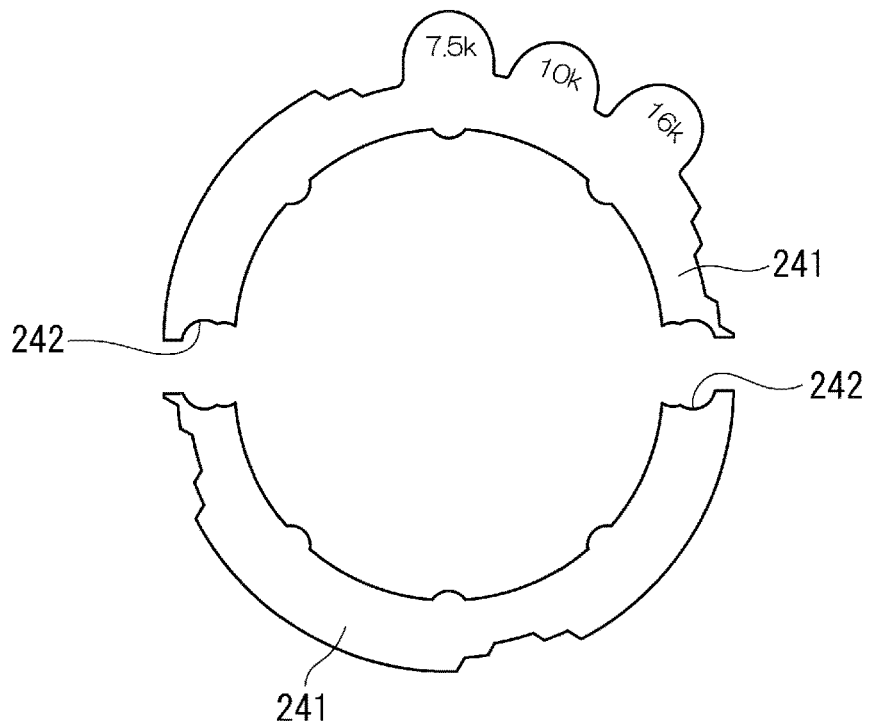
FIGS. 32(a) and 32(b) are plan views depicting a eighteenth embodiment of the gasket.
Figure 32B:
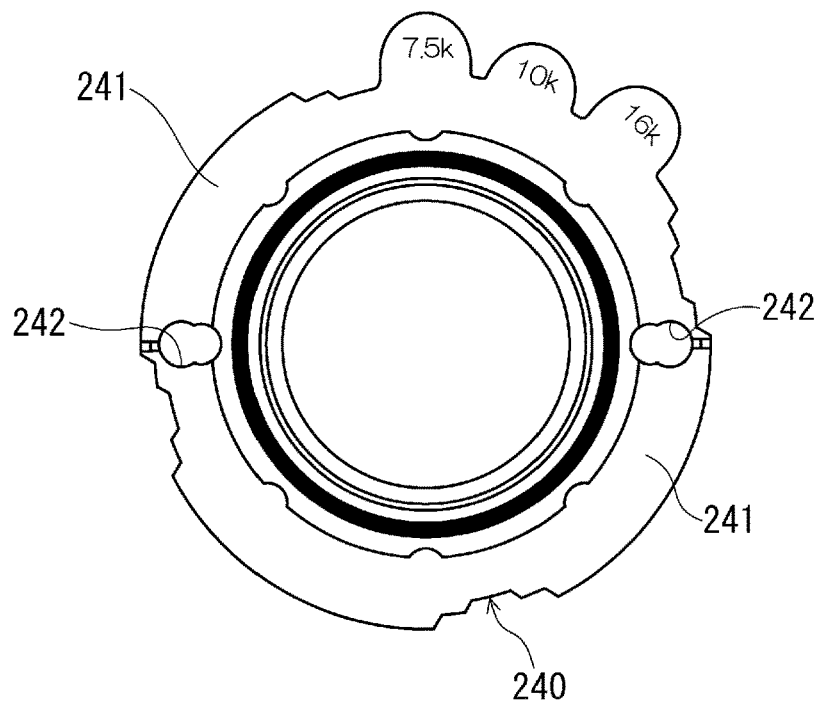

Furthermore, as depicted in an eighteenth embodiment of the gasket of the present invention in FIG. 32(a) and FIG. 32(b), for affixing to the gasket main body 240, the seal member 241 of FIG. 31 may be the seal member 241 configured by division into two at the positions of the bolt holes 165 at the reference positions. In this case, a function similar to that of the seal member 230 of FIG. 30 can be provided. When the seal member 241 is used, as with the above-described case, it is preferable to coat the gasket main body 240 and also set high adhesion properties of the seal member 241.

Figure 33:
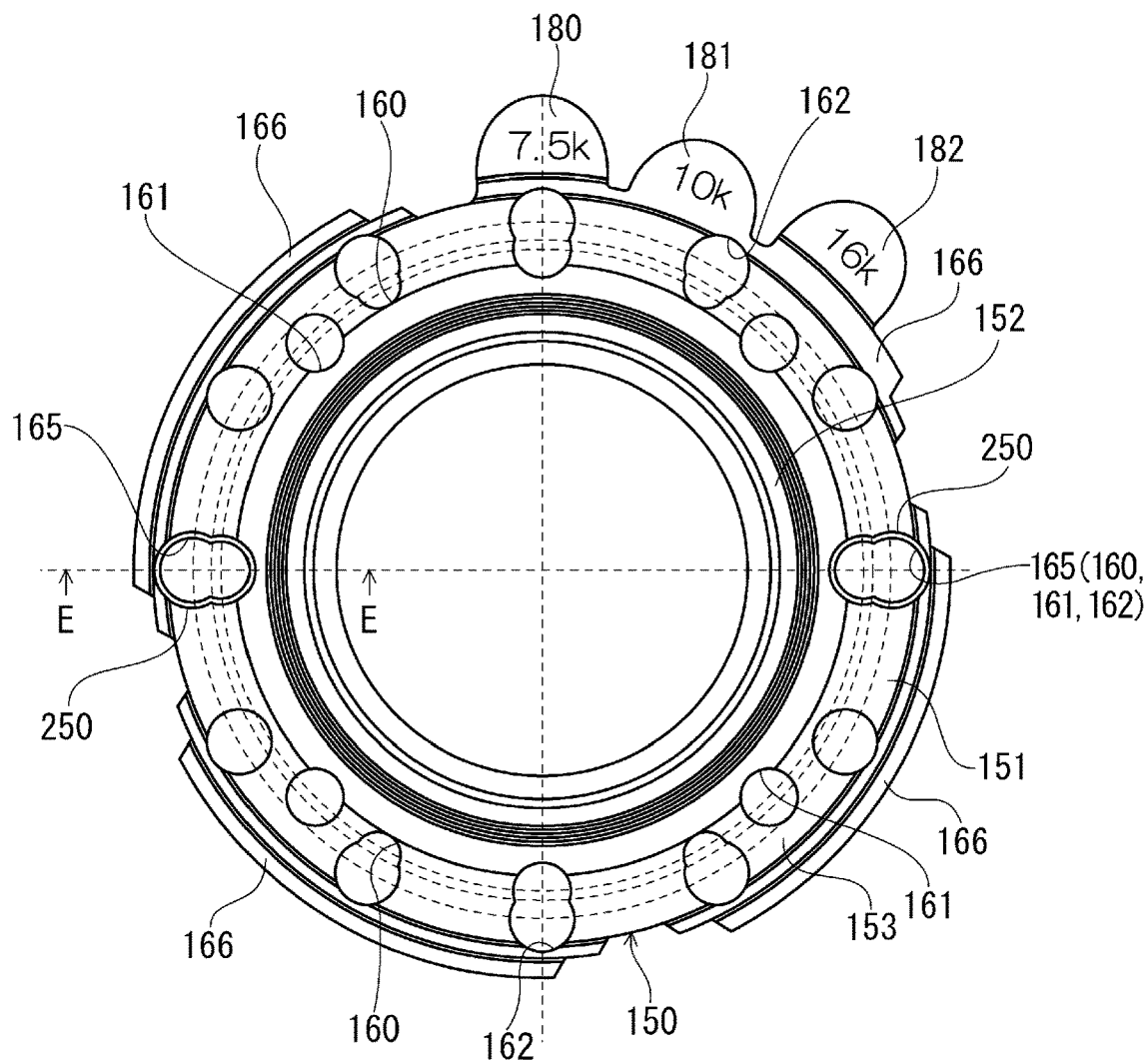
Figure 33:
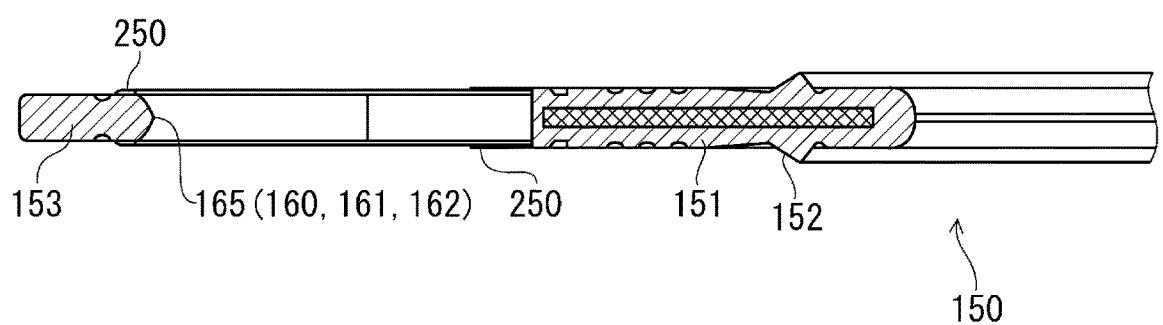

In FIG. 33, a nineteenth embodiment of the gasket of the present invention is depicted.

In this embodiment, the gasket main body 150 of FIG. 21 is provided with an annular protrusions 250 as a mark on the circumferential edge of each bolt hole 165 as a reference position.

Figure 34A:
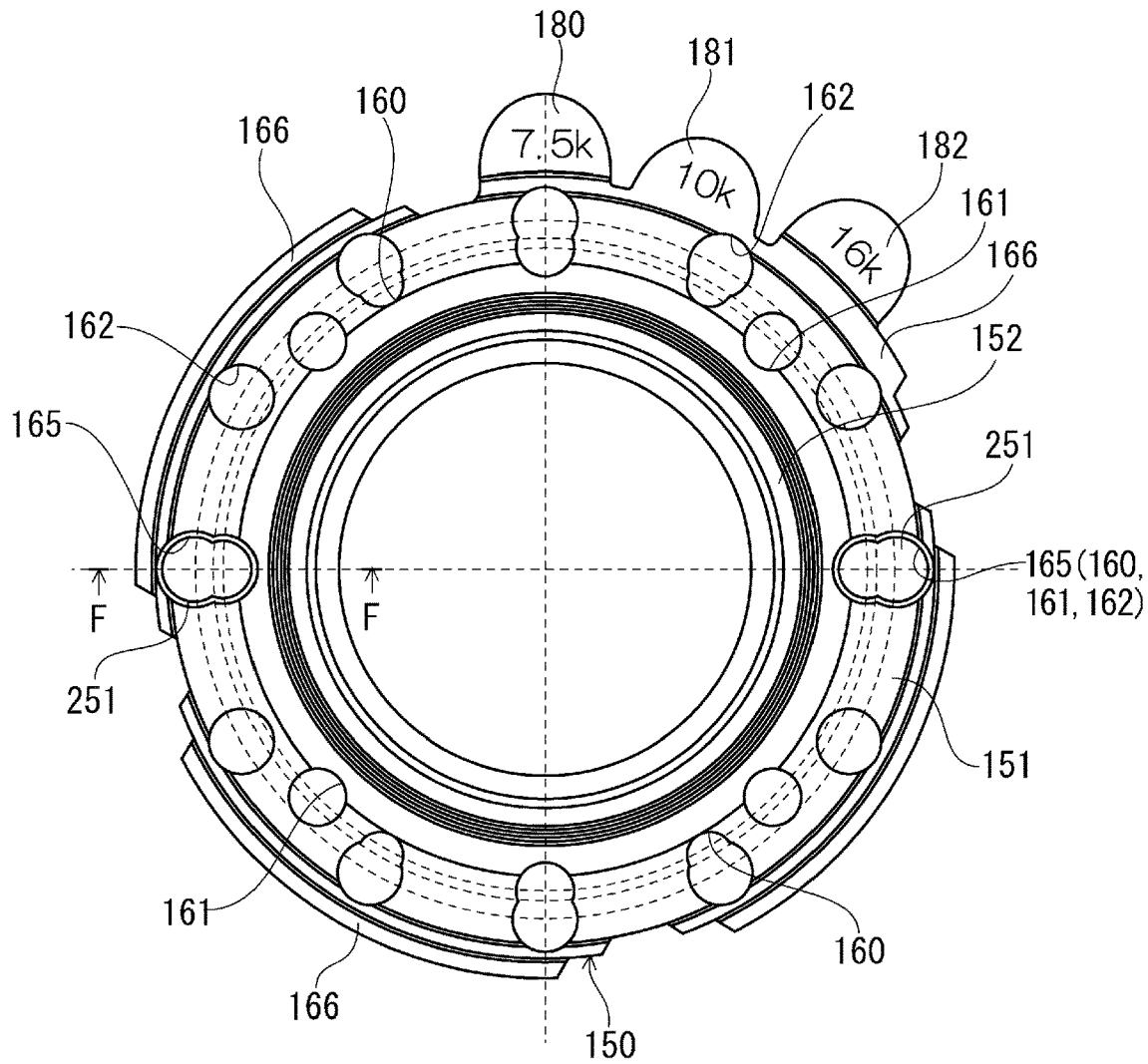
Figure 34B:
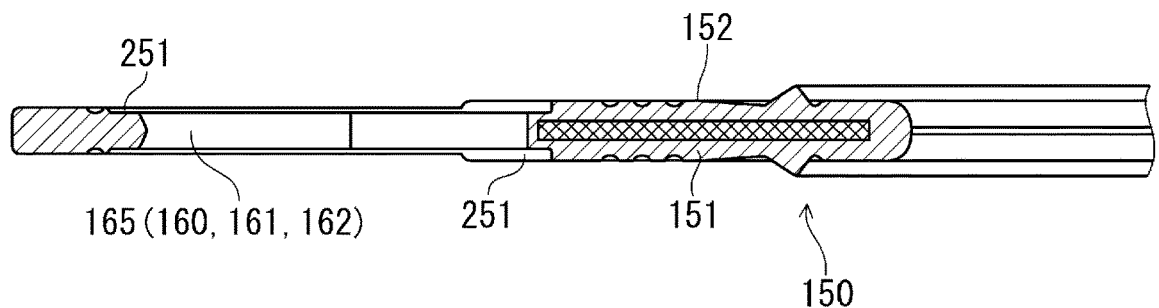

On the other hand, in FIG. 34, a twentieth embodiment of the gasket of the present invention is depicted. In this case, an annular recess 251 as a mark is provided on the circumferential edge of each bolt hole 165 as a reference position.

Like these, when the annular protrusion 250 or the annular recess 251 is provided on the circumferential edge of the bolt hole 165 as a reference, the worker can easily recognize the bolt hole 165 by visually recognizing these or based on the feeling when touching these by hand. Other than these annular protrusion 250 and annular recess 251, for example, the circumferential edge of the bolt hole 165 may be colored with ink or the like not depicted.

Figure 35:
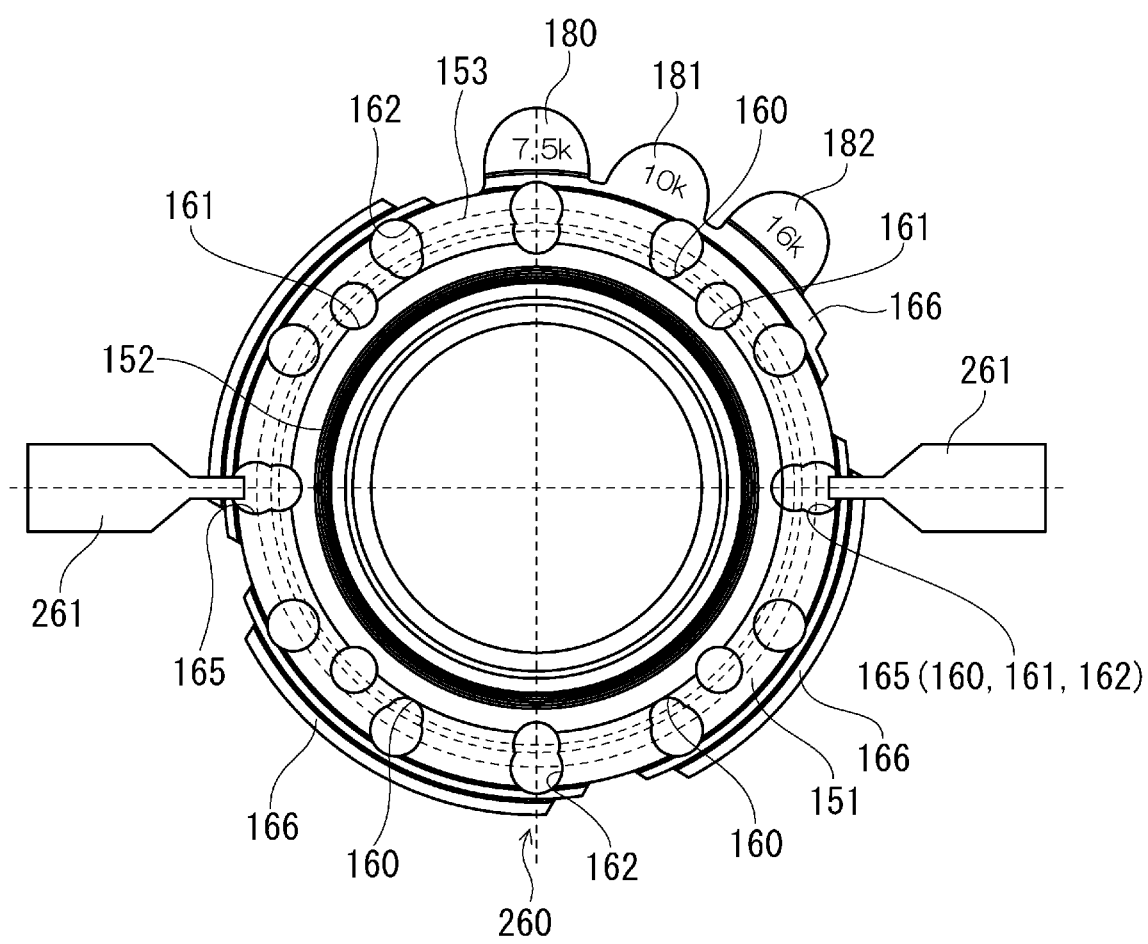
FIG. 35 is a plan view depicting a twenty-first embodiment of the gasket.

In FIG. 35, a twenty-first embodiment of the gasket of the present invention is depicted.

In a gasket main body 260 of this embodiment, tags 261 as marks, which are members separate from the gasket main body 260 and can be visually recognized from outside, are removably mounted to the bolt holes 165 at two locations as reference positions. When these tags 261 are provided to the reference bolt holes 165, the worker can easily recognize the reference bolt holes 165. The tags 261 are formed of an easily-removable material such as paper and, furthermore, are each preferably provided with a slit not depicted near the root of the tag 261. When the tag 261 is provided, it is required to consider an installation space for this tag 261 in advance, prevent the tag 261 from falling off at the time of transportation, and also prevent inhibition of insertion of the bolt 6. The tag 261 can be easily mounted by retrofitting after molding of the gasket main body 260.

Figure 36:
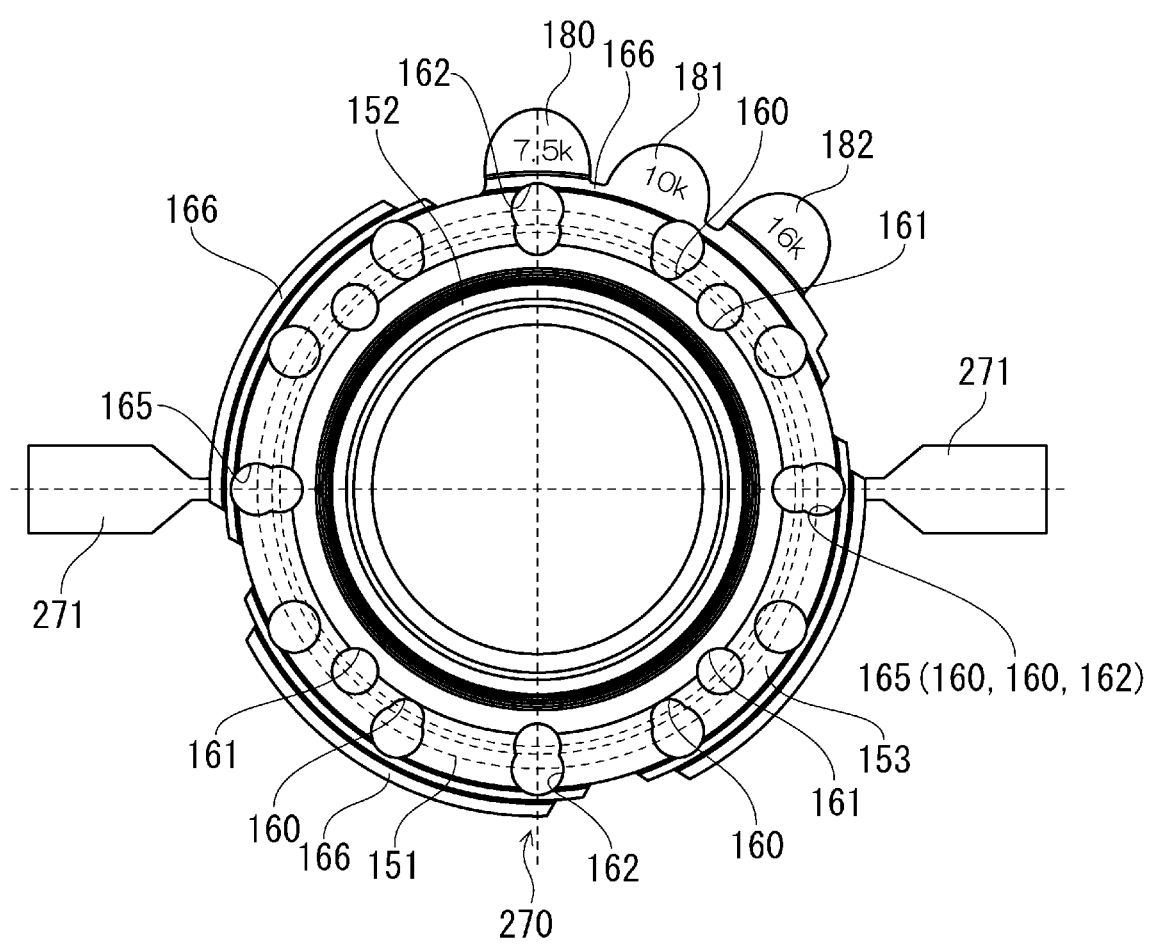
FIG. 36 is a plan view depicting a twenty-second embodiment of the gasket.

In FIG. 36, a twenty-second embodiment of the gasket of the present invention is depicted.

In a gasket main body 270 of this embodiment, tags 271 as marks are integrally formed with the gasket main body 270 near the bolt holes 165 at two locations as reference positions. Also in this case, as with the gasket main body 260 of FIG. 35, the reference bolt holes 165 can be easily recognized via the tags 271. Moreover, since the tags 271 are integrally molded with the gasket main body 270, an increase in the number of components is prevented, and no mounting work on the gasket main body 270 is required.

Note that while the gasket with bolt holes as reference positions at two locations has been described in each of the above-described embodiments, various modifications can be made similarly on a gasket with bolt holes at reference positions at four locations.

Also, the bolt holes at the reference positions can also be recognized by recognition means other than the above, and any bolt-hole recognition means can be used.

While the embodiments of the present invention have been described in detail, the present invention is not limited to the description of the above embodiments, and can be variously modified in a range not deviating from the spirit of the invention described in claims in the present invention.

REFERENCE SIGNS LIST 1 repair valve main body (plumbing instrument)
2 riser pipe
3 air valve (fire hydrant, short pipe)
5 coupling part
10 gasket main body
11 bolt hole
12 bolt/nut
20 RF-shape (Raised Face Type) flange surface
21 GF-shape (Grooved Face Type) flange surface
22 FF-shape (Flat Face Type) flange surface
23 annular groove
30, 131 core
31 coating part
32 annular seal surface
33 extended mounting part
34, 35, 36 133 bolt hole
37, 132 notched part
39 step part
40 annular protrusion
43, 44 recessed part
45 groove part
46 annular seal part
50 lug part
51, 52, 53 indicating part
55 tab part
88 notched part
141, 142, 143 recessed slit part
152 annular seal surface
160, 161, 162 bolt hole
165 bolt hole at a reference position
180, 181, 182 knob
201 shielding part
202 slit part
DS outer diameter of a core
L center line

The invention claimed is:

1. A gasket including a gasket main body having a substantially annular core coated with a coating part and formed with annular seal surfaces on both surfaces, these annular seal surfaces being provided so as to be capable of making sealed contact with a flange surface of any of flange surface of a flat seat shape flange, a full-flat seat shape flange, and a grooved-shape flange for allowing shared use,
annular seal surfaces and annular protrusions protruding from the annular seal surfaces being provided on both surfaces of the gasket main body, the annular protrusions being fit-in portions that can be fit in an annular groove so as to make contact with at least either one of an inner edge and an outer edge of the annular groove formed in a flange surface of the grooved-shape flange,
wherein a plurality of groove parts are concentrically formed on an outer peripheral side with respect to recessed parts provided on an outer peripheral side of the annular protrusions, and an annular seal part capable of making pressure contact with the flange surface of the flat seat shape flange, the full-flat seat shape flange, or the grooved-shape flange is provided between the plurality of groove parts.

2. The gasket according to claim 1, wherein recessed parts are provided on both sides of the annular protrusions.

3. The gasket according to claim 1, wherein an extended mounting part to the flange surface is integrally provided on the outer peripheral side of the annular seal surface, and a step part is formed between this extended mounting part and the annular seal surface, and the extended mounting part is provided to be thinner than the annular seal surface.

4. The gasket according to claim 1, wherein the both surfaces of the gasket main body are provided in a symmetrical shape.

5. A flange connection structure for a plumbing instrument in which connection is made with a gasket according to claim 1 attached between opposing flange surfaces of coupling parts of the plumbing instrument.

6. The gasket according to claim 1 being configured of an extended mounting part having a plurality of different diameters in accordance with outer diameters of various flange surfaces on an outer peripheral side of these annular seal surfaces.

7. The gasket according to claim 6, wherein a core has an outer diameter that matches a minimum outer diameter of a flange surface.

8. The gasket according to claim 6, wherein the extended mounting parts are provided with bolt holes with different pitch circles in accordance with a plurality of use pressures.

9. The gasket according to claim 8, wherein bolt holes with different pitch circles in accordance with the plurality of use pressures are arranged so as to be overlapped on a same center line, and the respective bolt holes can be used in a shared manner.

10. The gasket according to claim 8, wherein hole with one of bolt holes with a different pitch circle and number of holes in accordance with the plurality of use pressures overlapped on a same center line are arranged in a rotationally symmetrical manner, and the respective bolt holes can be used in a shared manner.

11. The gasket according to claim 6, wherein portions of a core corresponding to the bolt holes of the gasket main body are each provided with a notched part having an outer peripheral side of the core being open.

12. The gasket according to claim 11, wherein the bolt holes formed in the notched parts are such that the bolt holes are subjected to rubber lining with a coating part which coats the core.

13. The gasket according to claim 12, wherein a step-shaped lug part in a state of being extended from the extended mounting part is provided, and indicating parts are provided on a surface of the extended mounting part, the indicating parts being configured to indicate positions of outer diameters of flange surfaces for a plurality of use pressures.

14. The gasket according to claim 13, wherein a tab part is provided as extended from the step-shaped lug part and, when the gasket main body is attached to the flange surfaces horizontally piped, in a state in which the tab part is pinched to sag the gasket main body, bolt holes formed in the flange surface as a mounting target surface and the bolt holes are matched in position.

15. The gasket according to claim 14, wherein as for the tab part provided as extended from the lug part, a plurality of said tab parts in accordance with the use pressures are provided and, in a state in which the gasket main body is sagged to the horizontally-piped flange surfaces, the bolt holes formed in the flange surface as the mounting target surface in accordance with the use pressures and the bolt holes of the gasket are matched in position.

16. The gasket according to claim 6, wherein the extended mounting part of the gasket includes a recessed slit part, and an unwanted outer peripheral portion of the gasket is removed by being pulled and torn away along this slit part.

17. The gasket according to claim 1 having a plurality of bolt holes corresponding to flange surfaces for a plurality of use pressures disposed on an outer peripheral side of these annular seal surfaces, bolt holes at at least two locations among the bolt holes being provided at positions as a reference for the gasket main body and, with reference to these bolt holes, the bolt holes being disposed at positions corresponding to the flange surfaces for the plurality of use pressures.

18. The gasket according to claim 17, wherein the gasket main body has a plurality of knobs for hanging, and these knobs are provided on an extended line of a center line of the gasket main body and at positions where the bolt holes are assigned to support the flange surfaces for different use pressures.

19. The gasket according to claim 17, wherein bolt holes other than the bolt holes as reference positions are coated with a thin-film shielding part, and slit parts for bolt insertion are formed in this shielding part.

* * * * *